(12) United States Patent
Salmenkaita et al.

(10) Patent No.: US 10,291,760 B2
(45) Date of Patent: May 14, 2019

(54) SYSTEM AND METHOD FOR MULTIMODAL SHORT-CUTS TO DIGITAL SERVICES

(71) Applicant: Nokia Technologies Oy, Espoo (FI)

(72) Inventors: Jukka-Pekka Salmenkaita, Helsinki (FI); Antti Sorvari, Itäsalmi (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 15/352,370

(22) Filed: Nov. 15, 2016

(65) Prior Publication Data

US 2017/0201609 A1    Jul. 13, 2017

Related U.S. Application Data

(63) Continuation of application No. 15/169,051, filed on May 31, 2016, now Pat. No. 9,497,311, which is a
(Continued)

(51) Int. Cl.
*G06F 3/048* (2013.01)
*H04M 1/60* (2006.01)
(Continued)

(52) U.S. Cl.
CPC ..... *H04M 1/6041* (2013.01); *H04M 1/72522* (2013.01); *H04M 1/72561* (2013.01); *H04M 1/72569* (2013.01); *H04M 1/72572* (2013.01); *H04M 3/4938* (2013.01); *H04L 67/306* (2013.01); *H04M 2201/40* (2013.01); *H04M 2203/251* (2013.01); *H04M 2203/253* (2013.01);
(Continued)

(58) Field of Classification Search
CPC ............ H04M 1/6041; H04M 1/72569; G06F 3/0482; G06F 3/0481; G06F 3/04817
See application file for complete search history.

(56) References Cited

U.S. PATENT DOCUMENTS 5,594,784 A    1/1997  Velius
5,877,766 A *  3/1999  Bates .................... G06F 3/0481
                                                  707/E17.013
(Continued)

FOREIGN PATENT DOCUMENTS

DE       196 39 492 A1    5/1994
EP          0847179 A2    6/1998
(Continued)

OTHER PUBLICATIONS

Office Action for corresponding European Patent Application No. 03 100 209.0-1972, dated May 26, 2017, 5 pages.
(Continued)

*Primary Examiner* — Nicholas Augustine
(74) *Attorney, Agent, or Firm* — Ditthavong & Steiner, P.C.

(57) ABSTRACT

A method and system for facilitating user access to services through a wireless device of a user, involves recommending to a user a subset of services from a plurality of services available to the user in which each recommended service of the subset has at least one voice short-cut associated therewith, and selecting a service to be accessed through the user's wireless device from the subset of services according to a voice command by the user corresponding to the voice short-cut of the service.

9 Claims, 28 Drawing Sheets

Related U.S. Application Data continuation of application No. 10/061,277, filed on Feb. 4, 2002, now Pat. No. 9,374,451.

(51) Int. Cl.
  *H04M 1/725* (2006.01)
  *H04M 3/493* (2006.01)
  *G06F 3/01* (2006.01)
  *H04L 29/08* (2006.01)
  *H04W 8/18* (2009.01)

(52) U.S. Cl.
  CPC .... *H04M 2250/12* (2013.01); *H04M 2250/74* (2013.01); *H04W 8/183* (2013.01)

(56) References Cited

U.S. PATENT DOCUMENTS

| | | | |
|---|---|---|---|
| 5,884,262 | A | 3/1999 | Wise et al. |
| 5,890,122 | A | 3/1999 | Van Kleeck et al. |
| 5,963,207 | A | 10/1999 | Brewer et al. |
| 6,167,255 | A | 12/2000 | Kennedy, III et al. |
| 6,501,832 | B1 | 12/2002 | Saylor et al. |
| 6,546,002 | B1 | 4/2003 | Kim |
| 6,587,547 | B1 * | 7/2003 | Zirngibl ............... G06Q 10/10 379/88.14 |
| 6,836,537 | B1 * | 12/2004 | Zirngibl ............... H04M 3/493 379/201.1 |
| 6,990,238 | B1 | 1/2006 | Saffer et al. |
| 2001/0043234 | A1 * | 11/2001 | Kotamarti ............... G06F 9/451 715/746 |
| 2002/0010585 | A1 | 1/2002 | Gachie et al. |
| 2002/0107985 | A1 * | 8/2002 | Hwang ............. G06F 17/30905 709/246 |
| 2002/0147766 | A1 | 10/2002 | Vanska et al. |
| 2003/0046401 | A1 * | 3/2003 | Abbott ............... G06F 9/451 709/228 |
| 2003/0158855 | A1 * | 8/2003 | Farnham ............... G06F 3/0481 |
| 2004/0003042 | A1 * | 1/2004 | Horvitz ............... G06Q 10/109 709/204 |
| 2004/0054670 | A1 * | 3/2004 | Noff ............... G06F 17/218 |
| 2010/0110932 | A1 * | 5/2010 | Doran ............... H04L 41/12 370/254 |
| 2010/0153482 | A1 * | 6/2010 | Kim ............... G06F 8/61 709/201 |

FOREIGN PATENT DOCUMENTS

| | | |
|---|---|---|
| WO | 94/01958 | 1/1994 |
| WO | 01/30058 A2 | 4/2001 |
| WO | 01/63942 | 8/2001 |

OTHER PUBLICATIONS

Office Action for corresponding European Patent Application No. 03 100 209.0, dated May 11, 2012, 5 Pages.

* cited by examiner

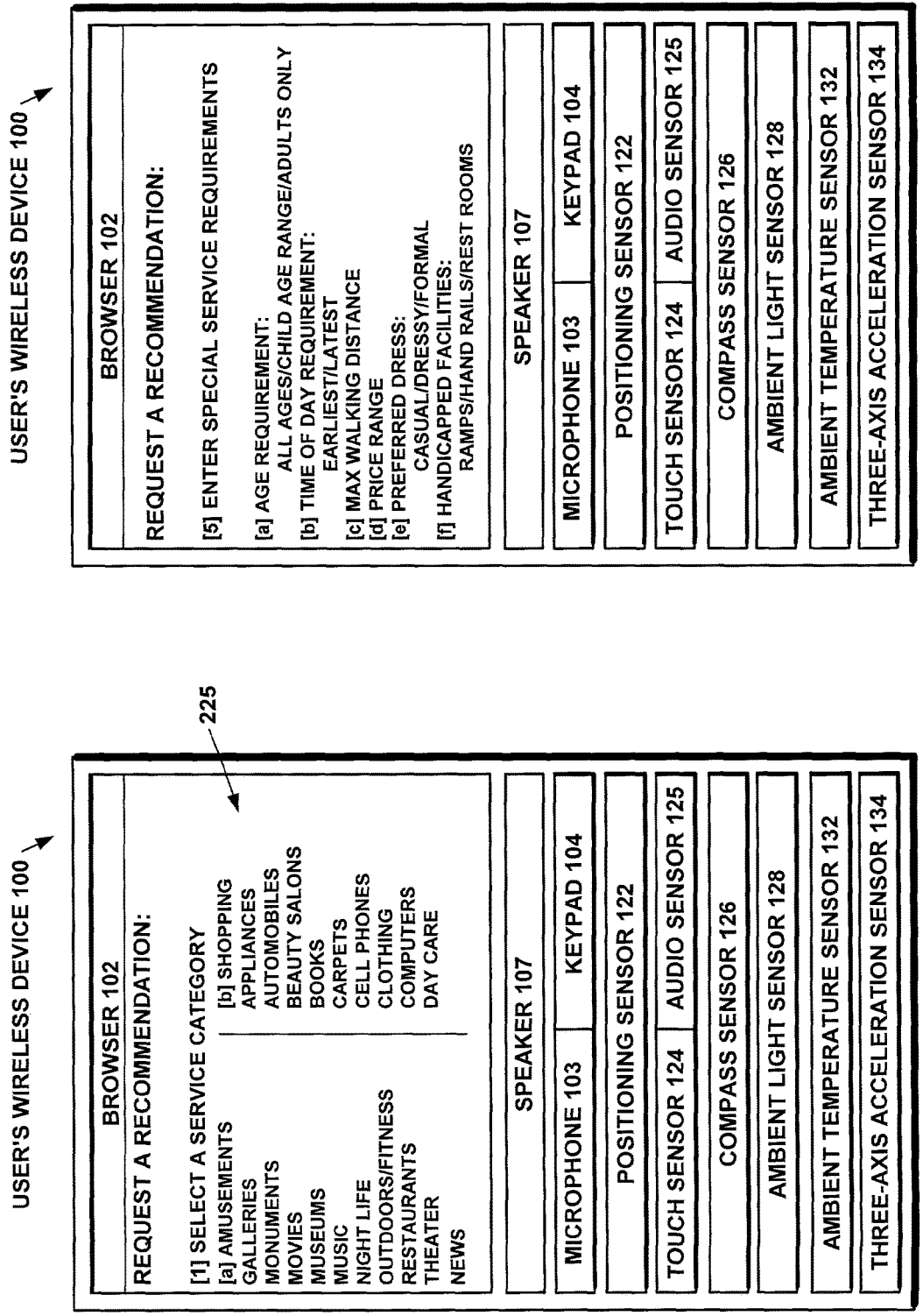

FIG. 3K

USER'S WIRELESS DEVICE 100

- BROWSER 102
- RECOMMENDATIONS
  - [1] YAHOOMOBILE.COM
  - [2] BUSINESS.COM
  - [3] F1-FORUM.COM
  - [4] WEATHERONLINE.COM
- SPEAKER 107
- MICROPHONE 103 | KEYPAD 104
- POSITIONING SENSOR 122
- TOUCH SENSOR 124 | AUDIO SENSOR 125
- COMPASS SENSOR 126
- AMBIENT LIGHT SENSOR 128
- AMBIENT TEMPERATURE SENSOR 132
- THREE-AXIS ACCELERATION SENSOR 134

FIG. 3L

USER'S WIRELESS DEVICE 100

- BROWSER 102
- RECOMMENDATIONS
  - [3] F1-FORUM.COM
    - [A] NEWS (/NEWS.WML)
    - [B] RESULTS (/RESULTS.WML)
    - [C] TABLE (/TABLE.WML)
- SPEAKER 107
- MICROPHONE 103 | KEYPAD 104
- POSITIONING SENSOR 122
- TOUCH SENSOR 124 | AUDIO SENSOR 125
- COMPASS SENSOR 126
- AMBIENT LIGHT SENSOR 128
- AMBIENT TEMPERATURE SENSOR 132
- THREE-AXIS ACCELERATION SENSOR 134

FIG. 4

SERVICE HISTORY LOG 110

PAST RECOMMENDATION & CONTEXT XML FILES 227

```
<?XML VERSION="1.0"?>
<OBJECT>
<DESCRIPTION>Past Recommendation</DESCRIPTION>
<PLACE-EVENTS>Museums</PLACE-EVENTS >
<PAST_RECOMMENTATIONS>
<NAME>
<HOSTNAME> History Museum.com</HOSTNAME>
<SERVICENAME>/exhibits.wml/</SERVICE NAME>
<VOICETAG>History</VOICETAG>
</NAME >
<CONTEXT>
<LOCATION><LAT>[Latitude]</LAT><LON>
[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_RECOMMENTATIONS>
</OBJECT>
```

```
<?XML VERSION="1.0"?>
<OBJECT>
<DESCRIPTION>Past Recommendation</DESCRIPTION>
<PLACE-EVENTS>Galleries</PLACE-EVENTS >
<PAST_RECOMMENTATIONS>
<NAME>
<HOSTNAME> Fine Art Gallery.com</HOSTNAME>
<SERVICENAME>/exhibits.wml/</SERVICE NAME>
<VOICETAG>FineArt</VOICETAG>
</NAME >
<CONTEXT>
<LOCATION><LAT>[Latitude]</LAT><LON>
[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_RECOMMENTATIONS>
</OBJECT>
```

```
<?XML VERSION="1.0"?>
<OBJECT>
<DESCRIPTION>Past Recommendation</DESCRIPTION>
<PLACE-EVENTS>Monuments</PLACE-EVENTS >
<PAST_RECOMMENTATIONS>
<NAME>
<HOSTNAME> Founders Statue.com</HOSTNAME>
<SERVICENAME>/exhibits.wml/</SERVICE NAME>
<VOICETAG>FoundersStatue</VOICETAG>
</NAME >
<CONTEXT>
<LOCATION><LAT>[Latitude]</LAT><LON>
[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_RECOMMENTATIONS>
</OBJECT>
```

PAST SERVICE USED & CONTEXT XML FILES 235

```
<?XML VERSION="1.0"?>
<OBJECT>
<DESCRIPTION>Past Services Used</DESCRIPTION>
<PLACE-EVENTS>Museums</PLACE-EVENTS >
<PAST_SERVICES_USED>
<NAME>
<HOSTNAME> Modern Art Museum.com</HOSTNAME>
<SERVICENAME>/exhibits.wml/</SERVICE NAME>
<VOICETAG>ModernArt </VOICETAG>
</NAME >
<CONTEXT>
<LOCATION><LAT>[Latitude]</LAT><LON>
[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_SERVICES_USED>
</OBJECT>
```

```
<?XML VERSION="1.0"?>
<OBJECT>
<DESCRIPTION>Past Services Used</DESCRIPTION>
<PLACE-EVENTS>Galleries</PLACE-EVENTS >
<PAST_SERVICES_USED>
<NAME>
<HOSTNAME> Artists Museum.com</HOSTNAME>
<SERVICENAME>/exhibits.wml/</SERVICE NAME>
<VOICETAG>ArtistsMusuem</VOICETAG>
</NAME >
<CONTEXT>
<LOCATION><LAT>[Latitude]</LAT><LON>
[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_SERVICES_USED>
</OBJECT>
```

```
<?XML VERSION="1.0"?>
<OBJECT>
<DESCRIPTION>Past Services Used</DESCRIPTION>
<PLACE-EVENTS>Monuments</PLACE-EVENTS >
<PAST_SERVICES_USED>
<NAME>
<HOSTNAME> War Memorial.com</HOSTNAME>
<SERVICENAME>/exhibits.wml/</SERVICE NAME>
<VOICETAG>WarMemorial</VOICETAG>
</NAME >
<CONTEXT>
<LOCATION><LAT>[Latitude]</LAT><LON>
[Longitude]</LON>
<ALT>[altitude]</ALT ></LOCATION >
<DATE>2001:01:31</ DATE ><TIME>1200</TIME>
<TEMPERATURE>10</TEMPERATURE >
</CONTEXT>
</PAST_SERVICES_USED>
</OBJECT>
```

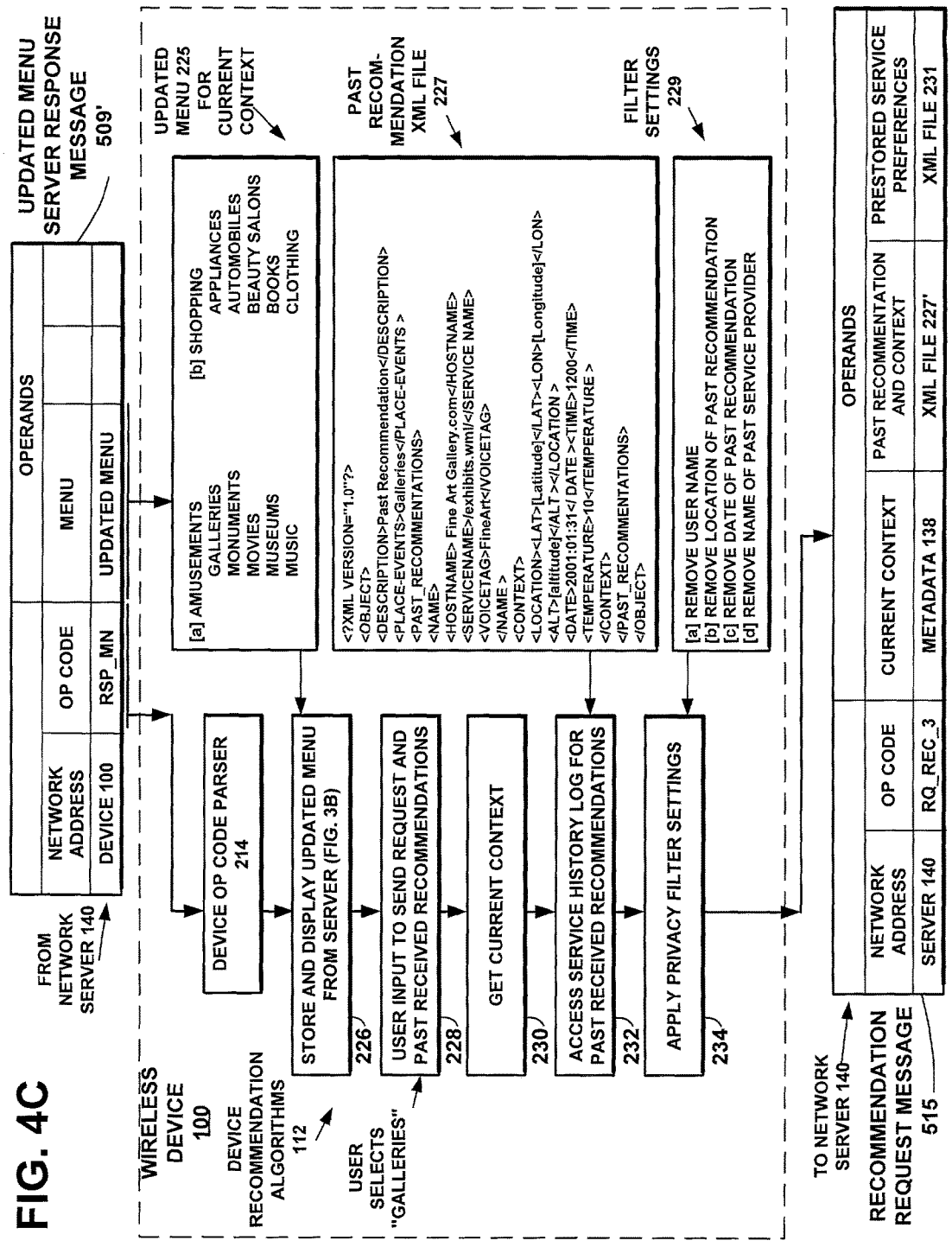

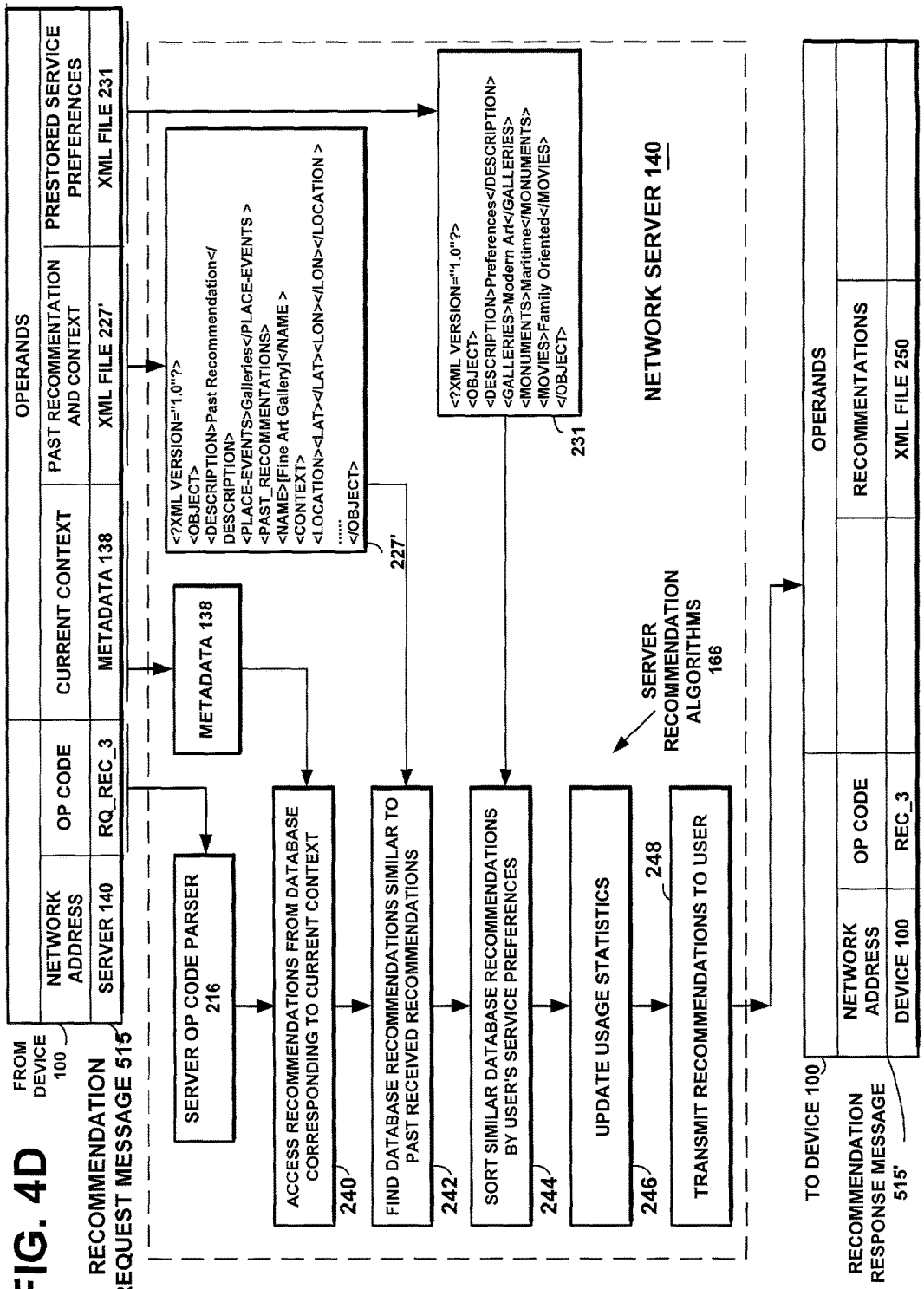

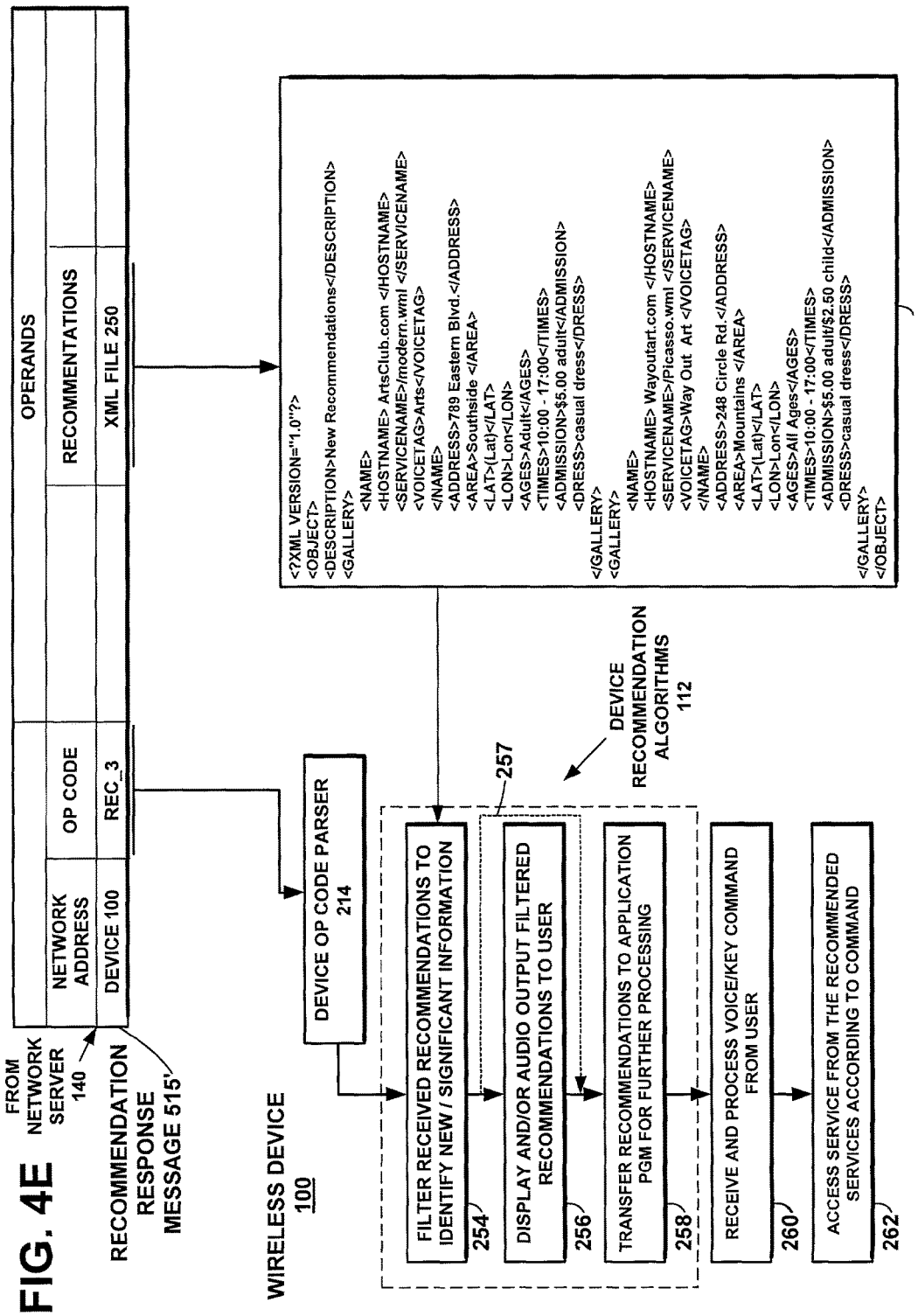

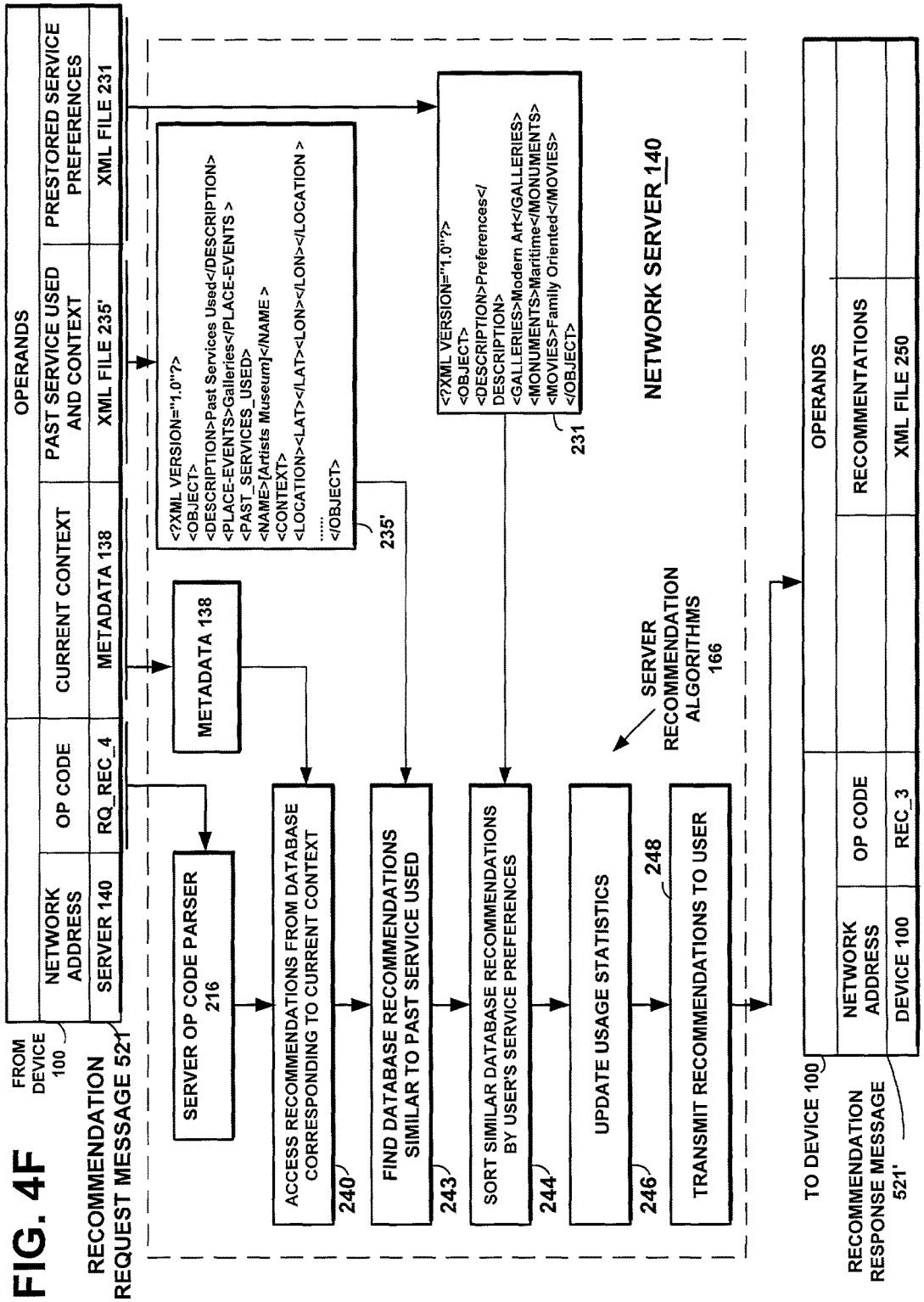

SYSTEM AND METHOD FOR MULTIMODAL SHORT-CUTS TO DIGITAL SERVICES

RELATED APPLICATION

This application is a continuation of U.S. patent application Ser. No. 15/169,051, filed May 31, 2016, entitled "SYSTEM AND METHOD FOR MULTIMODAL SHORT-CUTS TO DIGITAL SERVICES," now U.S. Pat. No. 9,497,311, which is a continuation of U.S. patent application Ser. No. 10/061,277, filed Feb. 4, 2002, entitled "SYSTEM AND METHOD FOR MULTIMODAL SHORT-CUTS TO DIGITAL SERVICES," now U.S. Pat. No. 9,374,451, which is incorporated herein by reference in its entirety.

BACKGROUND

1. Technical Field

The present invention is directed to a system and method of accessing services, such as digital services and, more specifically, to a system and method of facilitating multimodal access to services preferred by a user.

2. Art Background

Wireless devices are widely employed by people to access the growing number of available digital services. Such access typically entails the utilization of a menu structure to enable a wireless user to identify the service of interest to be accessed. This is often a slow and cumbersome process. There are also well-known methods for a user to explicitly select short-cuts, i.e., "bookmarks", to their preferred services to facilitate quicker access. However, creation of such short-cuts requires significant effort on the part of the user, and organizing and accessing the short-cuts can be difficult in digital devices with limited user interfaces (UI).

Moreover, in some situations, e.g. while driving a car, a user will be engaged in an activity which limits his or her ability to operate manually the digital device. In such situations, it would be desirable for the user to have alternative means by which to access services through the device, such as through voice command. However, speech recognition capability of existing technology suitable for wireless devices is limited in terms of different words a speech recognition engine can reliably identify. With the large number of different digital services now available to wireless users, it is not feasible to reliably recognize a voice command to access what amounts to be a practically unlimited set of services.

For example, in the case of (mobile) internet services (e.g., wml, html, xhtml pages) the amount of accessible services is almost unlimited. This means that it is generally not feasible to store the names of all the available services in mobile terminals or in a centralized server. The mobile terminals simply do not have sufficient storage capacity. On the server side the storage capacity may not be a problem but it is not plausible that all (mobile) Internet services would register their names in a centralized server. Even if all the services were registered, it would be very difficult for the user to uniquely indicate which service is requested.

For example, if the user provides a voice command, "Yahoo news", it would be impossible for the centralized server to know which service is requested since the well known service site Yahoo provides news in many countries. Furthermore, knowing the language is not enough since Yahoo provides different news services for the different English speaking countries, such as the United States, the United Kingdom, Ireland, Singapore, Australia, New Zealand, and so forth. Concerning the United States, Yahoo further provides different services for different U.S. cities.

SUMMARY

A method and system for facilitating user access to services through a wireless device of a user, involves recommending to a user a subset of services from a plurality of services available to the user in which each recommended service of the subset has at least one voice short-cut associated therewith, and selecting a service to be accessed through the user's wireless device from the subset of services according to a voice command by the user corresponding to the voice short-cut of the service.

BRIEF DESCRIPTION OF THE DRAWINGS

FIGS. 3B and 3C show an example of the user's wireless device displaying the SELECT SERVICE CATEGORY sub-menu and the ENTER SPECIAL SERVICE REQUIREMENTS sub-menu, respectively;

FIGS. 3K and 3L show examples of the user's wireless device displaying recommendation results in a hierarchical menu form;

FIG. 4 illustrates and example of the service history log 110, with past recommendation and context files 227 and with past service used and context files 235;

FIG. 4C is a flow diagram of an exemplary process in the wireless device 100 to display the updated menu on the device's browser and process the user's request for a recommendation by gathering past received recommendations from the service history log and pairing them with the current context of the device, and sending the context-activity pair in a recommendation request message to the network server 140;

FIG. 4D is a flow diagram of an exemplary process in the network server 140 to respond to the recommendation request message from the device 100, by accessing recommendations from the database corresponding to the current context, finding recommendations among those accessed from the database that are similar to the past received recommendations provided in the recommendation request message, sorting the found recommendations in accordance with the user's service preferences also provided in the recommendation request message, and returning the resultant recommendations to the device 100 in a recommendation response message;

FIG. 4E is a flow diagram of an exemplary process in the wireless device 100 to filter the recommendations received in the recommendation response message and output the filtered recommendations on the device's browser;

FIG. 4F is a flow diagram of an exemplary process in the network server 140 to respond to the recommendation request message from the device 100, by accessing recommendations from the database corresponding to the current context, finding recommendations among those accessed from the database that are similar to the past services used provided in the recommendation request message, sorting the found recommendations in accordance with the user's service preferences also provided in the recommendation request message, and returning the resultant recommendations to the device 100 in a recommendation response message;

DETAILED DESCRIPTION OF THE PREFERRED EMBODIMENTS

Figure 1:
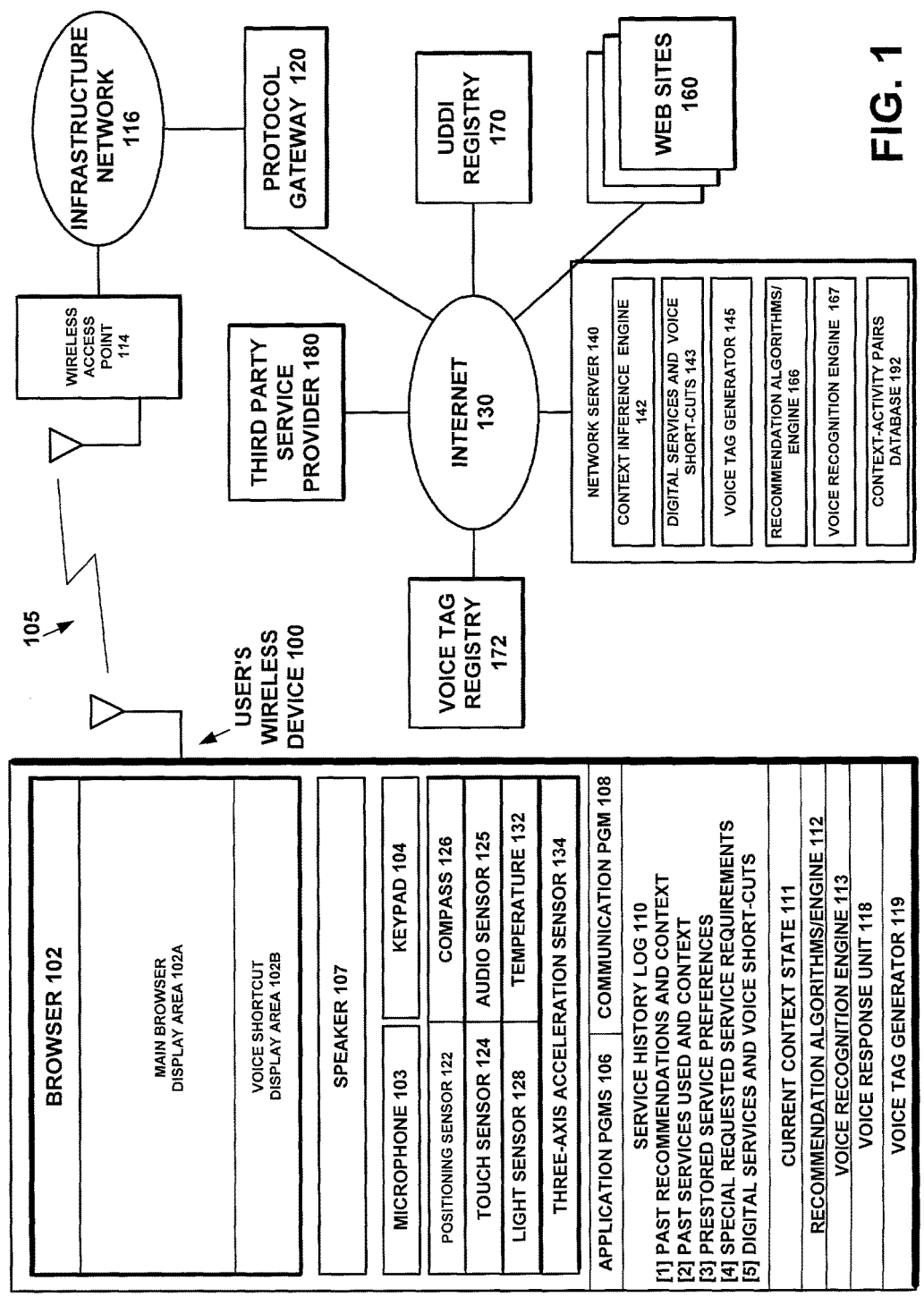
FIG. 1 is a network diagram, showing an example relationship between the user's portable wireless device, the protocol gateway to the Internet, the network server, a third party service provider, the Universal Description, Discovery and Integration (UDDI) registry, voice tag registry, and a plurality of web sites.

A method and system for facilitating user access of services via a wireless device involve the combination of a service recommendation engine with voice or speech recognition technology to provide a user with voice, speech or verbal (hereinafter "voice") short-cuts to access preferred services, such as digital services, of the user. These services may include, for example, web or WAP services, content described in XML language or other Internet-related languages (e.g., WML, HTML, XHTML, etc.), teletext or any type of service accessible by a mobile user through a wireless device.

The service recommendation engine or algorithms (used interchangeably herein) are configured to recommend or determine a subset of services from a plurality of services according to user-related filter criteria. Such criteria may be any factor unique or personal to the user or the user's wireless device which can be utilized in ascertaining or inferring possible services preferred by a particular user. Examples of user-related filter criteria may include static or dynamic factors, such as the user's service usage pattern or preference (e.g., when, where, how, a number of times, etc. that a service was used); the selected profile of the device or user (e.g., the user's or device's characteristics and preferences); the user's past and current activities; user's or device profile (e.g., the user's habits, likes-dislikes, personal characteristics, personal background, activities, etc.); temporal variables (e.g., time of day, date, day of week, year, daytime/nighttime, etc.), position variables (e.g., location, at office, at home, etc.), and/or the user's or device's current context or environment which may be inferred from the user's perceived environment through one or more sensors (e.g., a positioning sensor, a compass, a touch sensor, an audio sensor, a light sensor, and a temperature sensor) and/or other information such as noted above including, for example, the user's or device's profile, activities, etc.

Once a set of recommended services are determined, voice access to any one of these services may be accomplished through use of voice recognition technology, for example, by comparing the user's inputted voice command to voice short-cuts associated with the services. The voice short-cut(s) may be a phonetic expression (e.g., phoneme) associated with a service, and employed to enable voice short-cut to services through voice recognition comparison of a user's voice command with the voice short-cuts of the services. The voice short-cut(s) for each service may be obtained in a variety of ways, such as being generated from the attributes of the service's address (e.g., "host name" and/or "service name") or other address attribute, or being generated from metadata associated with the service, or being defined by the user, service provider, voice registry or other system in the form of a voice tag (e.g., Voice XML tag) for a service. The voice short-cut(s) may also be a "temporary" voice short-cut assigned to a recommended service, such as according to a hierarchy or priority of the recommendations. For example, the voice short-cut "one" or "1" can be temporarily assigned to a first recommended service of the subset, the voice short-cut "two" or "2" can be temporarily assigned to a second recommended service of the subset, and so forth. The maintenance and generation of voice short-cuts will be discussed in further detail below.

Accordingly, through the above-noted combination, a wireless device may be configured with multi-modal input functionality or control to enable a user to access preferred or desired services by voice command or other form of user input (e.g., keypad, touch-display, etc.), while reducing or minimizing the processing load and memory and other hardware requirements necessary to implement such functionality or control in a wireless device. Such an arrangement does not require the user to remember the exact service addresses, which are often complex and difficult to remember, to access desired services; reduces privacy concerns for the user in the access of services; and provides for service options which may be organized and accessed without requiring substantial effort on the part of the user. Such an arrangement further reduces voice recognition processing while increasing recognition reliability through reduction of the range of necessary voice short-cut comparisons.

In one exemplary embodiment, such a system and method are implemented through a portable wireless device including a recommendation engine, a voice recognition engine and a database of services accessible by the user. The recommendation engine recommends or determines a subset of services from a plurality of services to provide recommendations which are personal to and preferred by the user. The recommendation may be based on various user-related filter criteria (e.g., context) and, if desired, limited to the range of past used services of the user. These recommended services may then be audibly or visibly outputted to the user for selection thereof by voice or other form of user input, and such output may include information identifying the voice short-cut(s) for one or more or each of the recommended services.

For example, visual output of voice short-cut enabled services may be displayed in the form of an icon or other visual forms (e.g., URL address) to inform the user of the availability of such short-cuts so as to assist the user in effectively utilizing such short-cuts. This may also be accomplished by other output means, such as audio output.

Alternatively, the recommended services or voice short-cut enabled services may be transparent to the user, e.g., not output to the user. In such a case, determination of such recommended services may be triggered upon various events, such as periodically, at particular times/days/date, at particular locations, upon a manual command, upon a particular activity, etc. or a combination thereof.

In either case, the user may thereafter input a command by voice or other input forms to select a service to be accessed from the subset of recommended services. When the input is a voice command, the portable wireless device, via the voice recognition engine, processes the voice command to an appropriate a computer readable format or other data form readable by a speech decoder, compares the processed voice command data to voice short-cut(s) associated with the recommended services, and identifies the service with a voice short-cut matching the user's voice command. Thereafter, the portable wireless device, such as through its micro-browser, accesses the selected service automatically or upon a user command.

The recommendation engine may be configured to prioritize the recommendations or recommended services, and to compare the voice command data with voice short-cuts according to a priority of the voice short-cut(s) or associated recommended services. This is particularly significant where a voice command may match a plurality of recommended services. In such a case, the service with the higher priority is selected. Alternatively, in a situation where a voice command may match a plurality of recommended services, an indication of the matching recommended services, such as their voice short-cuts, may be outputted to the user for selection therefrom.

In another embodiment, the above system and method may be implemented through a distributed networked system in which various processing tasks and data maintenance may be distributed between a portable wireless device and one or more network elements, such as a network server, ad hoc or short-range wireless networked partner, and so forth. The tasks may be distributed in the following manner:

[1] The network server(s) or other network element may be configured to implement both the recommendation and voice recognition processing. For example, after initiation of the micro-browser by the user or other triggering event, the wireless device receives a voice command from the user and forwards the voice command data to the network server and other relevant information, such as user-related filter criteria (e.g., context) and/or information for determining such criteria. The network server determines a subset of recommended services from a plurality of services based on the user-related filter criteria. The network server then, via voice recognition processing, identifies a service therefrom with a voice short-cut matching the user's voice command. The network server then returns information corresponding to the identified service, such as the service's address (e.g., URL) or other service access information, to the wireless device for access thereof. Alternatively, the network server may act as an intermediary between the wireless device and the service provider of the identified service and access the identified service for the wireless device.

In another example, after initiation of the micro-browser by the user or other triggering event, the wireless device requests a service recommendation from a network server. The request may include other relevant information, such user-related filter criteria (e.g., context.) or information for determining such criteria. The network server receives the request along with any relevant information and determines a subset of recommended services from a plurality of services based on the user-related filter criteria. These recommendations are then sent to the wireless device which outputs, audibly or visibly, the availability of such recommended services through voice or other user input short-cuts.

The wireless device then receives the user's voice command and passes corresponding voice command data to the network server. The server then performs voice recognition processing on the voice command to identify a service (from the plurality of recommended services) with a voice short-cut matching the user's voice command. The network server then returns information corresponding to the identified service, such as the service's address (e.g., URL) or other service access information, to the wireless device for access thereof. Alternatively, the network server may act as an intermediary between the wireless device and the service provider of the identified service and access the identified service for the wireless device.

[2] The network server(s) may be configured to implement the recommendation processing with the wireless device performing the voice recognition processing. For example, after initiation of the micro-browser by the user or other triggering event, the wireless device requests recommendations from a network server. The request may include other relevant information, such as user-related filter criteria or associated information in determining such criteria. The network server receives the request and relevant information and determines a subset of recommended services from a plurality of services based on the user-related filter criteria. These selections are then sent to the wireless device, and the device outputs, audibly or visibly, the availability of such recommended services through voice or other user input short-cut.

The wireless device then receives the user's voice command and performs voice recognition processing of the voice command to identify a service (from the plurality of recommended services) with a voice short-cut matching the user's voice command. Thereafter, the wireless device, via its micro-browser or other platform, accesses the selected service automatically or upon the user command.

[3] The network server(s) or other network element may be configured to implement the voice recognition processing. For example, after the recommended services are audibly or visibly outputted to the user, the wireless device receives a voice command from the user and forwards the voice command data to the network server and possibly other relevant information, such the recommended services information and/or voice short-cuts (e.g., voice XML tags) for such services. The network server, via voice recognition processing, identifies a service (from the plurality of recommended services) with a voice short-cut matching the user's voice command. The network server then returns information concerning the identified service, such as the service's address (e.g., URL) or other service access information, to the wireless device for access thereof. Alternatively, the network server may act as an intermediary between the wireless device and the provider of the identified service and access the identified service for the wireless device.

In further embodiments, the maintenance and generation of voice short-cuts(s) for a particular digital service may be accomplished in various ways, for example, as follows:

[A] Address attributes, such as host name and service name, or other portions of the address attributes may be utilized as a voice short-cut of a digital service when performing voice recognition processing.

[B] Voice short-cuts may be generated from metadata associated with a particular service site. Metadata is often employed by search engines, service sites and/or other network entities to characterize or classify the content on a particular service site to facilitate user searches. Accordingly, one or more voice short-cuts may be generated for association with a particular service according to the metadata associated with that service, such as by identifying and selecting one or more words or terms from the metadata which aptly characterizes the service. This may be accomplished by manually examining the metadata associated with a service site, or through probability analysis in which the words or terms showing up a significant number of times or the greatest number of times is used as the voice short-cut.

[C] A voice tag registry or the like may be maintained by a network element, such as a server, which maintains a relational database of service addresses and their associated voice tags. Voice tag registry may be similar to domain name registry, in which voice tags may be uniquely defined for a particular service using a standard format, such as in XML. Through a central registry, a uniform standard may be achieved for voice tags or the like and their usage in enabling voice-access to associated services. A wireless device may request voice tags from the registry for the subset of recommended services prior to performing voice recognition processing. Alternatively, whenever a service site is accessed, the site may deliver the voice tag to the accessing device which can store the voice tag for future use.

Along similar lines, a service provider may predefine voice tags for its service addresses and provide such information to the wireless device or other network elements in communication with the wireless device to facilitate voice-based access to such service(s). For example, the service provider may embed voice tags in an XML message sent to the user's wireless device.

[D] A user may define, change or delete voice short-cuts for a particular service which are stored locally on the user's wireless device or at a remote location accessible by the wireless device.

[E] The wireless device generally may download predefined or generated voice short-cuts associated with services from a remote location, via a network. Such download may be performed when a new service is accessed by the user, at periodic intervals, upon a user request, or upon some other predetermined triggering event.

[F] Voice short-cut(s) may also be a "temporary" short-cut assigned to a recommended service, such as according to hierarchy or priority of the recommendations. For example, the voice short-cut "one" or "1" can be temporarily assigned to a first recommended service of the subset, the voice short-cut "two" or "2" can be temporarily assigned to a second recommended service of the subset, and so forth. Alternatively, the voice short-cut "A" can be temporarily assigned to a first recommended service of the subset, the voice short-cut "B" can be temporarily assigned to a second recommended service of the subset, and so forth. Temporary voice short-cuts may be employed together with a selection menu, whether displayed or audibly outputted, for enabling voice short-cut to recommended services.

[G] To specify a voice short-cut, voice tags may be used to categorize the voice short-cut for a particular service. For example, a voice short-cut may be tagged for a particular service in XML format ("voice XML tag"), e.g., <VOICE TAG>[voice-short cut]</VOICE TAG> to facilitate voice-access in a digital service environment, such as with Internet service, etc.

These and other exemplary embodiments will now be discussed in further detail below with reference to the Figures. Turning to FIG. 1, an exemplary network environment is provided in which a user, operating a portable wireless device 100, is able to employ multi-modal input forms, such as voice along with other user input forms, to access preferred digital services through device 100. This is accomplished through combination of a service recommendation engine and a voice recognition engine, each of which may be implemented locally at the portable wireless device or at a remote location, such as at a network server 140, to provide voice short-cuts to the user's preferred services.

The recommendation engine determines a subset of recommended services from a plurality of services based on user-related filter criteria (e.g., context, etc.) and the voice recognition engine processes voice commands by the user to compare and match the voice commands to voice short-cuts associated with the recommended services to enable user selection and access of a service from the recommended services by voice short-cut.

As shown, a network diagram illustrates an example of a relationship between the user's portable wireless device 100, a wireless access point 114, an infrastructure network 116, a network server 140, a voice tag registry 172 and a third party service provider 180 interconnected over the Internet 130. The user's wireless device 100 communicates over a radio link with the wireless access point 114, which is connected to a wireless network 116, which is connected to a protocol gateway 120. The gateway 120 is connected over the Internet 130 to the server 140.

The network 105 formed by the wireless device 100, wireless access point 114, and infrastructure network 116 can be implemented as a digital wireless wide area network (WAN), based on architectures such as Global System for Mobile Communication (GSM), IS-136 TDMA-based Digital Advanced Mobile Phone Service (DAMPS), Personal Digital Cellular (PDC), IS-95 CDMA-based cdmaOne System, General Packet Radio Service (GPRS) and broadband wireless architectures such as W-CDMA and Broadband GPRS. For more information on these digital wireless, wide area network architectures, see the book by Yi-Bing Lin, et al. entitled Wireless and Mobile Network Architectures, John Wiley & Sons, 2001. The network 105 can also be a short-range wireless system connected to a wide area landline infrastructure network such as the Internet 130. Short-range wireless systems include both wireless personal area network ("PAN") and wireless local area network ("LAN"). Both of these networks have the common feature of operating in unlicensed portions of the radio spectrum, usually either in the 2.4 GHz Industrial, Scientific, and Medical (ISM) band or the 5 GHz Unlicensed-National Information Infrastructure ("U-NII") band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. The Bluetooth Special Interest Group, Specification Of The Bluetooth System, Version 1.0B, Volumes 1 and 2, December 1999, describes the principles of Bluetooth device operation and communication protocols. Wireless local area networks generally operate at higher peak speeds of from 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPERLAN Standard, which operates in the 5 GHz U-NII band. For more information on wireless LANs, see the book by Jim Geier entitled Wireless LANs, Macmillan Technical Publishing, 1999. The network 105 formed by the wireless device 100, wireless access point 114, and infrastructure network 116 can use a wireless communications protocol, such as the Wireless Application Protocol (WAP), the I-Mode protocol, or the mobile IPv6 protocol.

The portable wireless device 100 may take the form of a processor-based wireless communication-enabled device, such as a wireless mobile telephone, pager, two-way radio, smartphone, personal communicator, laptop or notebook computer, wireless personal digital assistant (PDA) or the like. The portable wireless device 100 includes a plurality of output subsystems, such as a displayed browser 102 and a speaker 107, to provide for multi-modal output functionality and a plurality of user input subsystems, such as microphone 103, keypad 104, a touch-display and so forth, to provide for multi-modal input functionality. The input and output devices of the wireless device may be integrated into the device itself and/or may be in communication with the device over a wireless connection, such as short-range wireless line (e.g., infra-red, radio link, etc.)

The browser 102 may be partitioned, as desired, to have a main display area 102A and a voice short-cut indication display area 102B to display voice shortcut related information, such as in the form of an icon or other visual representation to notify the user of the availability of voice shortcuts to recommended services. Voice shortcut display area 102B may also display the textual/character expression of the voice shortcuts to assist the user in learning such shortcuts or accessing services in a hands-free environment. The voice shortcuts or indications thereof may also be audibly output via voice response unit 118 in combination with the speaker 107, likewise, to notify the user of the availability of voice shortcuts and to assist the user in learning such short-cuts or accessing services in a hands-free environment.

The portable wireless device 100 further includes various programs and databases, including the user's personal programs and databases, programs and databases associated with the conventional operation of the wireless device, and programs and databases to implement the multi-modal shortcut service access processes discussed herein. These programs and databases may include, for example, application programs 106, communication programs 108, service history log 110, current context state 111, recommendation algorithms or engine 112 to enable local and/or network-based service recommendations, voice recognition engine (VRE) 113, and voice tag generator 119 for generating voice tags or generally voice short-cuts. These programs may further include a voice response unit (VRU) 118 for converting data, such as text, to speech which can be outputted to the user via speaker 107.

Voice recognition engine 112 may employ various well-known voice recognition techniques, for example, speech or speaker ("speech") independent recognition such as employed in speech independent name dialers (SINDs). Such speech independent recognition engine generally includes basic components, such as a front end, a dictionary, an acoustic model and a speech decoder. The front end converts speech into a data form suitable for analysis by a speech decoder. The dictionary maintains a list of words or phrases recognizable by the system, and may take the form of the service history log 110 which may maintain voice tags for associated services or take any other form suitable to identify voice short-cuts for services available to the user. The acoustic model, in this example, may be an "isolated word" or "continuous" speech independent model based on Hidden Markov Modeling (HMM) to provide mathematical representations of the words or phrases the system can recognize. Finally, the speech decoder compares speech with the stored acoustic models to identify the most likely match between the speech and corresponding words or phrases in the dictionary.

While speech independent recognition is preferably employed when speech recognition is to be performed by the mobile device, other well-known speech recognition techniques, such as speech-dependent recognition may also be employed by the mobile device or network server.

The voice tag generator 119 is configured to provide generation of voice short-cuts, in the form of voice tags. The generator 119 may, for example, generate a voice tag for a particular service based on metadata associated with the services, such as metadata from the service provider, or other system (e.g., search engine provider). Generation of a voice tag may entail filtering or parsing the metadata to obtain a suitable phonetic expression (e.g., a phonetically expressible term) which preferably characterizes the service or the content of the service. For instance, the generator 119 may determine the number of occurrences of particular terms in the metadata associated with a service site, and select the term(s) with the greatest number of occurrences as the voice short-cut for that service. Alternatively, selection may be performed manually by an operator searching the metadata to select an appropriate term therefrom.

As further shown in FIG. 1, the portable wireless device 100 may also include a plurality of sensors for sensing the mobile user's ambient conditions. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The audio sensor 125 can be a microphone, for example, which can detect speech or environmental sounds. The positioning sensor can be, for example, a GPS receiver integrated in the device. The positioning sensor can also be, for example, a radio beacon triangulation sensor that determines the location of the wireless device by means of a network of radio beacons, base stations, or access points, as is described for example, in Nokia European patent EP 0 767 594 A2, entitled "Mobile Station Positioning System". These sensors provide inputs which are sampled by the wireless device 100 to sense the user's environment, and one or more of these sensor outputs may be utilized to infer a current context which may be used to provide recommendations to the user based on the user's environment. The portable wireless device 100 may perform context inference techniques locally, or may offload to the network server 140 some of the computationally intensive computing involved in context inference techniques.

For example, in one or more embodiments discussed herein, as the user carries about the wireless device 100, its sensors may automatically and continuously measure the geographic location and context of the device. The wireless device may periodically transmit the current context in a message over the wireless network to the network server 140. There are several types of messages, each of which may be distinguished by its own unique op code. An "op code" is generally an operational code or instruction or command which may be employed to inform or instruct other devices or network components, such as those discussed herein, of the operation to be performed.

When the wireless device sends a message containing the current context, the network server 140 parses the op code and responds with information corresponding to the op code, the information being related to the current context. If the op code indicates that the message is a spontaneous message which is automatically transmitted by the device 100, then the network server 140 may respond with information such as a service category menu, or information such as recommended services (along with their voice short-cuts) based on the current context, or prepaid advertising of local services related to the current context.

As shown in FIG. 1, the user's portable wireless device 100 further includes a service history log 110 or the like. The activities stored in the service history log 110 may be divided into two major categories: past recommendations made by the wireless device 110 and/or network server 140, and services including their voice short-cuts (e.g., voice tags) or equivalents thereof for voice recognition matching. The category of services may be broken into four sub-categories: past services used, prestored service preferences, special requested service requirements, services and their associated voice short-cuts. The term "activities", as used herein, may refer to any of these categories and sub-categories. The service history log 110 may store five component databases: [1] past recommendations and context, [2] past services used and context, [3] prestored service preferences, [4] special requested service requirements, and [5] services and voice short-cuts. An example is shown in FIG. 4 of the two component databases: [1] past recommendations and context and [2] past services used and context. The voice short-cuts may also be maintained along with the associated services in service log 110, such as in the form of a voice XML tag.

When implementing distributed processing with the network server 140, the wireless device 100 can automatically send messages with a unique op code designating that the message is an automatically transmitted message containing the device's past recommendations and context or past services used and context, in addition to the current context or other information for use in enabling voice short-cut access to recommended services. In one or more embodiments, the network server 140 may parse the op code and uses the device's past recommendations and context or past services used and context to find similar service recommendations in its database. The network server 140 then responds with information customized to the user's perceived interests, the information being related to the current context. While the above discusses one approach to recommending services, any user-related filter criteria may be employed to determine recommendations personal to the user.

The user of the wireless device 100 can also manually enter requests for menus and recommendations related to the current context. In any event, the wireless device 100 may then determine the service recommendations locally based on the current context and enable voice short-cut access to such recommended services.

Alternatively, the wireless device 100 may send messages with a unique op code designating that the message is a manual request by the user containing the device's past recommendations and context or past services used and context, in addition to the current context or other information for use in enabling voice short-cut access to recommended services. The network server parses the op code and uses the device's past recommendations and context or past services used and context to find similar recommendations in its database consistent with the user's manual request. The network server 140 then responds with information customized to the user's expressed interests, the information being related to the current context. While the above discusses one approach to recommending services, any user-related filter criteria (as discussed herein) may be employed to determine customized or personalized recommendations to the user.

The service history log 110 can accumulate data on past services used by the user of the device 100 in several ways. The service history log 110 can be programmed to capture on-line transactions and activities, such as ticket purchase information for services, access of a particular service as well as its sub-services, and so forth. The service history log 110 can also be programmed to monitor the dwell-time of the device at scheduled events and to draw the inference that the user is in fact engaged in such an event. The event and the current context and, if desired, associated voice short-cut(s) are then stored in the database [2] past services used and context, in the service history log 110.

While the portable wireless device 100 may be configured to perform the context, 010 recommendation and voice recognition processes alone, one or more or all of these processes can be offloaded to one or more other network elements, such as the network server 140. Accordingly, depending on which processes are offloaded, the network server 140 may include context inference engine 142, service and voice short-cuts database 143, voice tag generator 145 (such as voice tag generator 119 discussed above), recommendation algorithms or engine 166, voice recognition engine 167 and/or context-activity pairs database 192.

In one distributed system embodiment, the wireless device 100 provides recommendations to its user that are appropriate to the device's current environment by selecting an activity (e.g., a category or sub-category), pairing it with the current context result, and sending the context-activity pair to the network server 140. The network server 140 searches its database of recommendations using the context-activity pair, and returns recommendations to the user. While the portable wireless device 100 and the network server 140 may employ context-activity pairs to determine recommended services, other user-related criteria and processes may be employed to ascertain preferred services desired to be accessed by the user. As such, a relational database or look-up table containing information on services, voice short-cuts and user-related criteria can be maintained and updated accordingly to facilitate determination of recommendations and to enable voice short-cuts to the user's likely preferred services.

Various embodiments showing how the processes to enable voice short-cuts to preferred services may be distributed between the wireless device 100 and the network server 140 are discussed below with reference to FIGS. 2A through 2D.

Figure 2A:
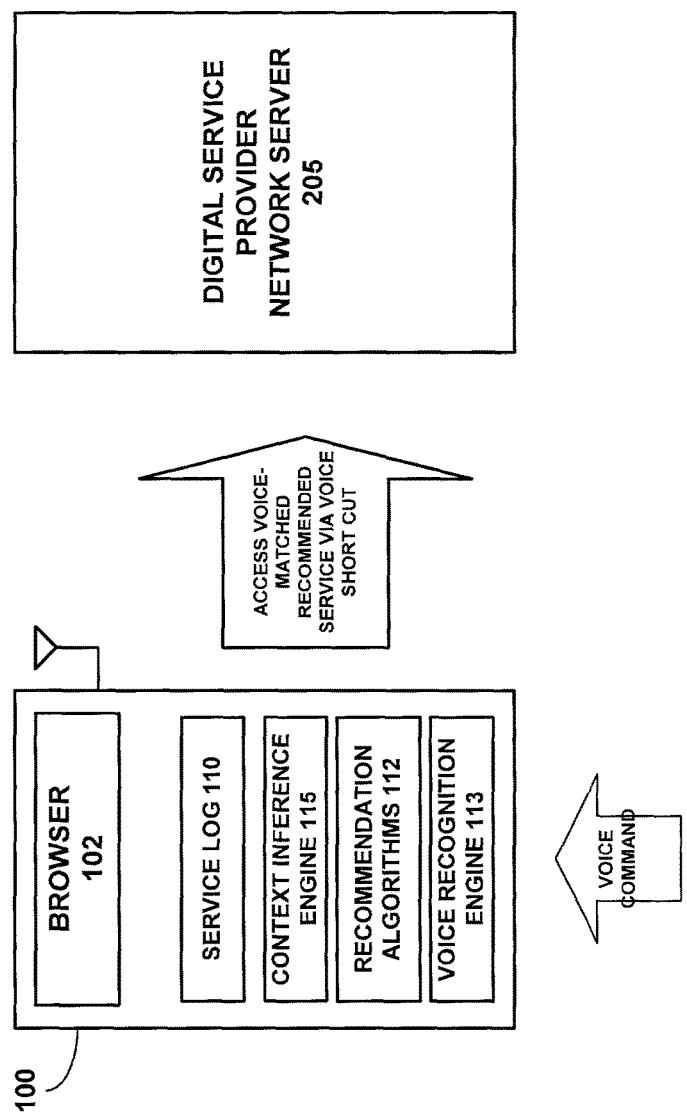
FIG. 2A illustrates a simplified overview of the user's portable wireless device configured to perform context determination, service recommendation and voice recognition so as to facilitate voice short-cut access to a recommended service in accordance with one exemplary embodiment.

FIG. 2A illustrates a simplified overview of the user's portable wireless device 100 configured to perform context determination, service recommendation and voice recognition so as to facilitate voice short-cut access to a recommended service in accordance with one exemplary embodiment. As shown, the portable wireless device 100 may include a context inference engine 115, recommendation algorithms or engine 112, voice recognition engine 113 and a database of services, such as service log 110, accessible by the user.

The portable wireless device 100, in combination with context inference engine 115, are configured to determine a current context based on the user's current context which, in turn, may be inferred through temporal information from an internal clock or from a network device, through sensory information from sensors of the device (e.g., location sensor, speed sensor, light sensor, sound sensor, etc.) such as a position of the user/device, through the user's activities, through the setting or profile of the user or user's device, and so forth. The portable wireless device 100, in combination with the recommendation engine 112, determine and recommend a subset of services from a plurality of services based on user-related filter criteria, such as the current context or other personal factors (e.g., service usage history—those services utilized the most by the user, etc.). To reduce the workload of the wireless device, the searchable range of services may be limited to past used services.

Once determined, these recommended services may then be audibly or visibly outputted to the user for selection thereof by voice or other form of user input, and such output may include information identifying the voice short-cut(s) for one or more or each of the recommended services. For example, visual output of voice short-cut enabled services may be displayed in the form of an icon or other visual forms (e.g., URL address) to inform the user of the availability of such short-cuts so as to assist the user in effectively utilizing such short-cuts. This may also be accomplished as well by other output means, such as audio output.

The user may thereafter input a command by voice or other input forms to select a service to be accessed from the subset of recommended services. When the input is a voice command, the portable wireless device 100, in combination with the voice recognition engine 113, process the voice command to an appropriate a computer readable format such as for use by a speech decoder in performing comparisons or matching, compare the processed voice command data to voice short-cuts or the like of the recommended services, and identify or select the service (from the subset of recommended services) with a voice short-cut matching the user's voice command. Thereafter, the portable wireless device 100, such as through its micro-browser 102, accesses the selected recommended service of service provider 205, automatically or upon a user command.

Figure 2B:
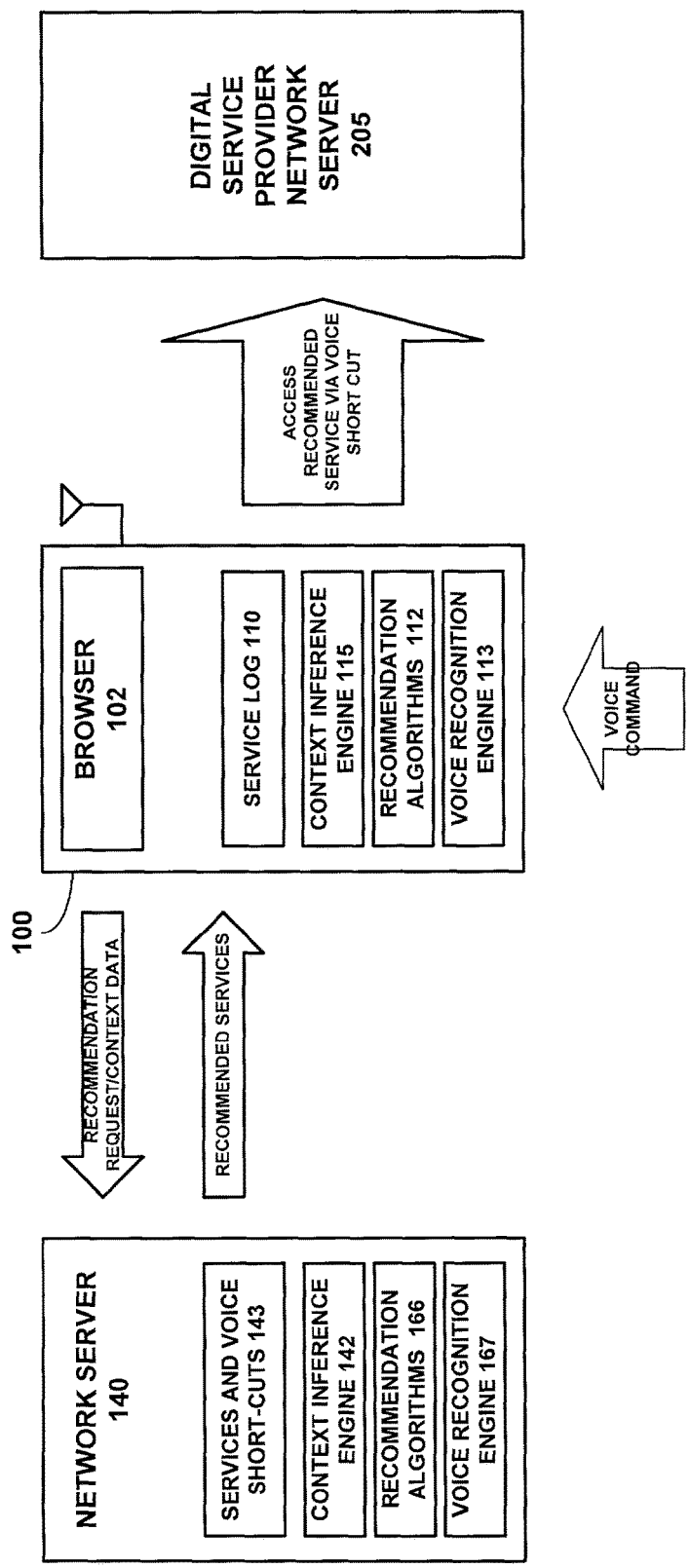
FIG. 2B illustrates a simplified overview of a distributed system in which the context determination and service recommendation processing are offloaded to a network element, such as a network server, and the user's portable wireless device performs voice recognition processing of a user's voice command so as to facilitate voice short-cut access to a recommended service in accordance with a further exemplary embodiment.

FIG. 2B illustrates a simplified overview of a distributed system in which the context determination and service recommendation processing are offloaded to a network element, such as the network server 140, and the user's portable wireless device 100 performs voice recognition processing of a user's voice command so as to facilitate voice short-cut access to a recommended service in accordance with a further exemplary embodiment. As shown, the network server 140 may include context inference engine 142, the database 143 of services and their voice short-cuts or the like, and the recommendation engine 166; and the portable wireless device 100 may include voice recognition engine 113.

In operation, after initiation of the micro-browser 102 by the user or upon some other triggering event, the portable wireless device 100 requests recommendations from the network server 140. The request may include other relevant information, such as user-related filter criteria or associated information in determining such criteria. The network server 140 receives the request and any relevant information and determines a subset of recommended services from a plurality of services based on the user-related filter criteria. These selections are then sent back to the wireless device 100, and the device outputs, audibly or visibly, an indication of the availability of such recommended services through voice or other user input short-cut. The voice short-cuts for the recommended services may be forwarded by the network server 140 or may be already stored locally for lookup on the portable wireless device 100.

The portable wireless device 100 receives the user's voice command and performs voice recognition processing of the voice command to identify a service (from the subset of recommended services) with a voice short-cut matching the user's voice command. Thereafter, the wireless device 100, such as via its micro-browser 102, accesses the selected service of service provider 205, automatically or upon the user command.

Figure 2C:
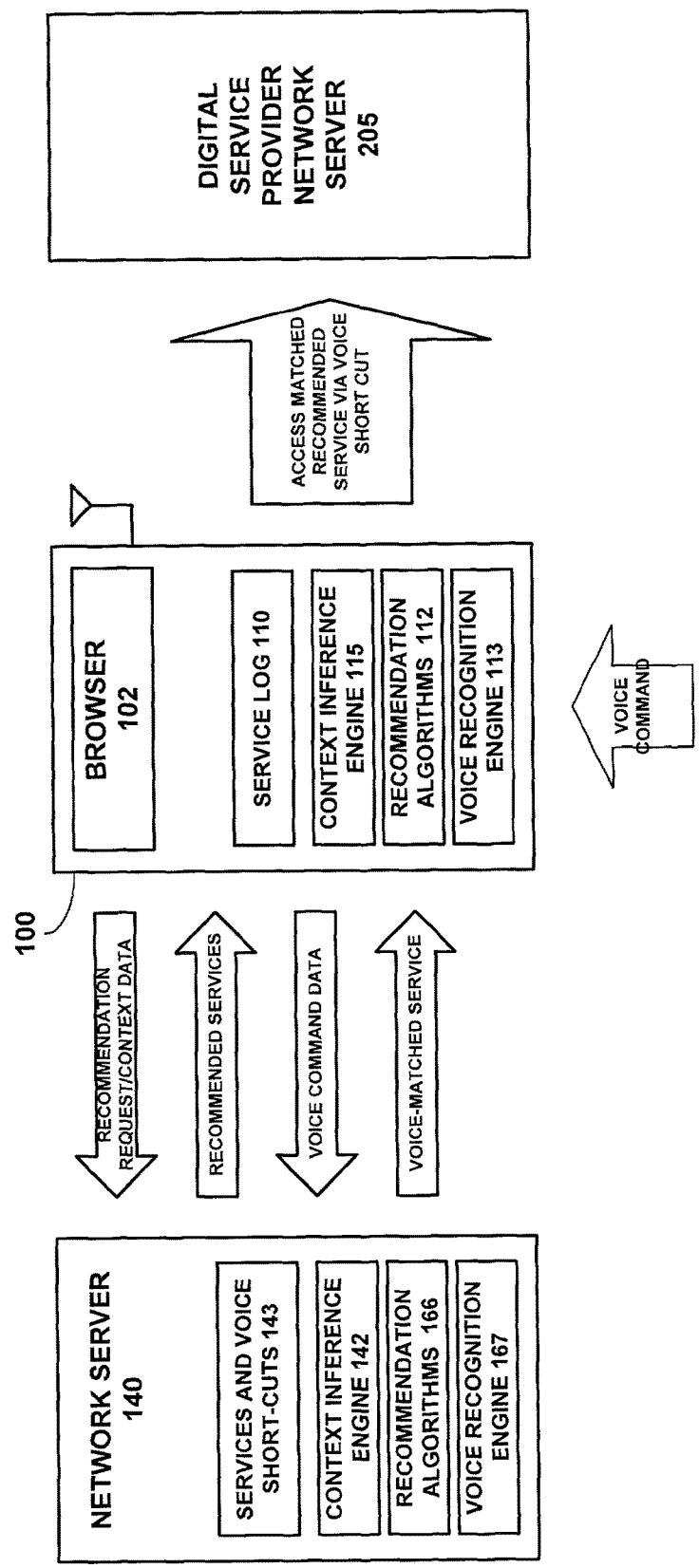
FIG. 2C illustrates a simplified overview of a distributed system in which the context determination, service recommendation and voice recognition processing are offloaded to a network element, such as a network server, so as to facilitate voice short-cut access to a recommended service in accordance with another exemplary embodiment.

FIG. 2C illustrates a simplified overview of a distributed system in which the context determination, service recommendation and voice recognition processing are offloaded to a network element, such as the network server 140, so as to facilitate voice short-cut access to a recommended service in accordance with another exemplary embodiment. As shown, the network server 140 may include the context inference engine 142 for determining a current context, the database 143 of services and their voice short-cuts or the like, the recommendation engine 166, and the voice recognition engine 167.

In one operational example, after initiation of the micro-browser 102 by the user or upon some other triggering event, the portable wireless device 100 may request service recommendations from the network server 140. The request may include other relevant information, such us user-related filter criteria or information for determining such criteria. The network server 140 receives the request and any relevant information, and determines a subset of recommended services from a plurality of services based on the user-related filter criteria. These selections are then sent back to the wireless device 100, and the device outputs, audibly or visibly, an indication of the availability of such recommended services through voice or other user input short-cuts.

The portable wireless device 100 then receives the user's voice command and passes corresponding voice command data to the network server 140 which performs voice recognition processing of the voice command to identify a service (from the subset of recommended services) with a voice short-cut matching the user's voice command. The network server 140 then returns information on the identified service, such as the service address (e.g., URL) of the service site operated by service provider 205 or other service access information, to the wireless device 110 for access thereof. Alternatively, the network server 140 may act as an intermediary between the portable wireless device 100 and the service provider 205 of the identified service and access the identified service for the wireless device.

In an alternative example, after initiation of the micro-browser 102 by the user or upon some other triggering event, the portable wireless device 110 receives a voice command from the user and forwards the voice command data to the network server 140, along with other relevant information, such as user-related filter criteria (e.g., context) and/or information for determining such criteria. The network server 140 determines a subset of recommended services from a plurality of services based on the user-related filter criteria. Thereafter, the server, via voice recognition processing, identifies a service (from the subset of recommended services) with a voice short-cut matching the user's voice command. The network server 140 then returns information on the identified service, which may include the service address (e.g., URL) of the service site operated by service provider 205, to the wireless device for access thereof. Alternatively, the network server may act as an intermediary between the portable wireless device 100 and the service provider 205 of the identified service and access the identified service for the wireless device.

Figure 2D:
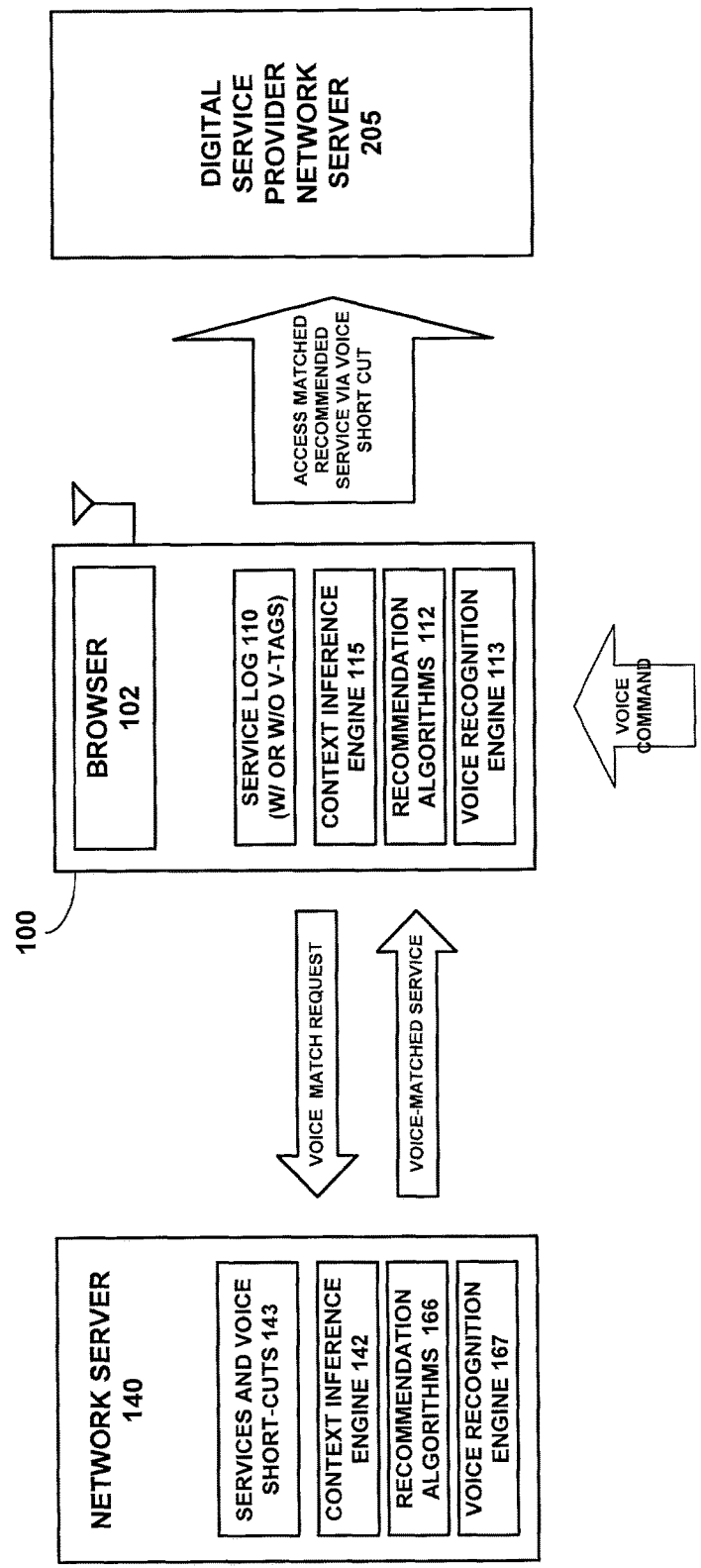
FIG. 2D illustrates a simplified overview of a distributed system in which the context determination and service recommendation processing are performed by the user's portable wireless device, and the voice recognition processing of a user's voice command is offloaded to a network element, such as a network server, so as to facilitate voice short-cut access to a recommended service in accordance with a further exemplary embodiment.

FIG. 2D illustrates a simplified overview of a distributed system in which the context determination and service recommendation processing are performed by the user's portable wireless device 100, and the voice recognition processing of a user's voice command is offloaded to a network element, such as the network server 140, so as to facilitate voice short-cut access to a recommended service in accordance with a further exemplary embodiment. As shown, the portable wireless device 100 may include a context inference engine 115, recommendation algorithms or engine 112, and a database of services and voice short-cuts thereto, such as service log 110; and the network server 140 may include the voice recognition engine 167.

In an operational example, the portable wireless device 100 determines recommended services based on user-related criteria and audibly or visibly outputs these recommendations to the user. The portable wireless device 100 then receives the user's voice command and forwards the voice command data to the network server 140 along with other relevant information, such us the information on the recommended services and/or voice short-cuts (e.g., voice tags) for such services.

The network server 140, through voice recognition processing, identifies a service (from the subset of recommended services) with a voice short-cut matching the user's voice command. The network server 140 then returns information on the identified service, which may include the service address (e.g., URL) of the service site operated by service provider 205, to the wireless device 110 for access thereof. Alternatively, the network server may act as an intermediary between the portable wireless device 100 and the service provider 205 of the identified service and access the identified service for the wireless device.

To facilitate ease of use as well as to explain various functions enabled on the portable wireless device 100, a Recommendation Web Services menu may be provided and displayed on the browser 102 of the device. An example of such a menu as well as other screen shots of recommended services will be discussed below with reference to FIGS. 3A through 3M.

Figure 3A:
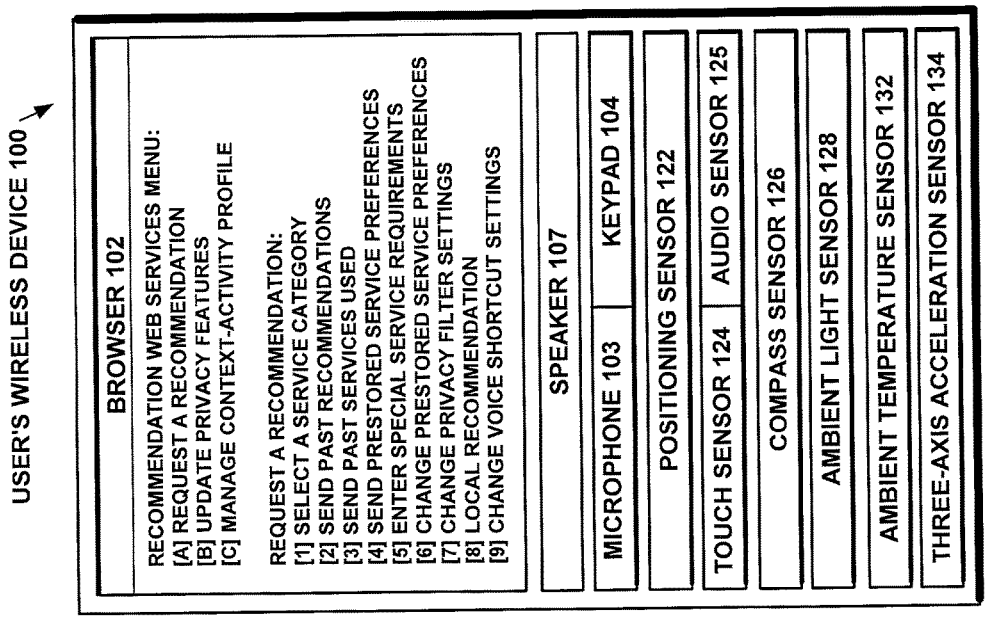
FIG. 3A illustrates an example of the user's wireless device displaying a RECOMMENDATION WEB SERVICES MENU.

In FIG. 3A, the user's portable wireless device 100 includes the browser 102 which displays the Recommendation Web Services menu, to enable the user to navigate through the cards or pages being displayed and to select options that are programmed by the application programs 106. The browser 102 of the user's wireless device 100 displays a recommendation web services menu. The recommendation web services menu may provide the user with the following options to select: (A) REQUEST A RECOMMENDATION; (B) UPDATE PRIVACY FEATURES; and (C) MANAGE CONTEXT-ACTIVITY PROFILE.

The REQUEST A RECOMMENDATION menu may display the following options: REQUEST A RECOMMENDATION:

[1] SELECT A SERVICE CATEGORY
[2] SEND PAST RECOMMENDATIONS
[3] SEND PAST SERVICES USED
[4] SEND PRESTORED SERVICE PREFERENCES
[5] ENTER SPECIAL SERVICE REQUIREMENTS
[6] CHANGE PRESTORED SERVICE PREFERENCES
[7] CHANGE PRIVACY FILTER SETTINGS
[8] LOCAL RECOMMENDATION
[9] CHANGE VOICE SHORT-CUT SETTINGS

Figure 4A:
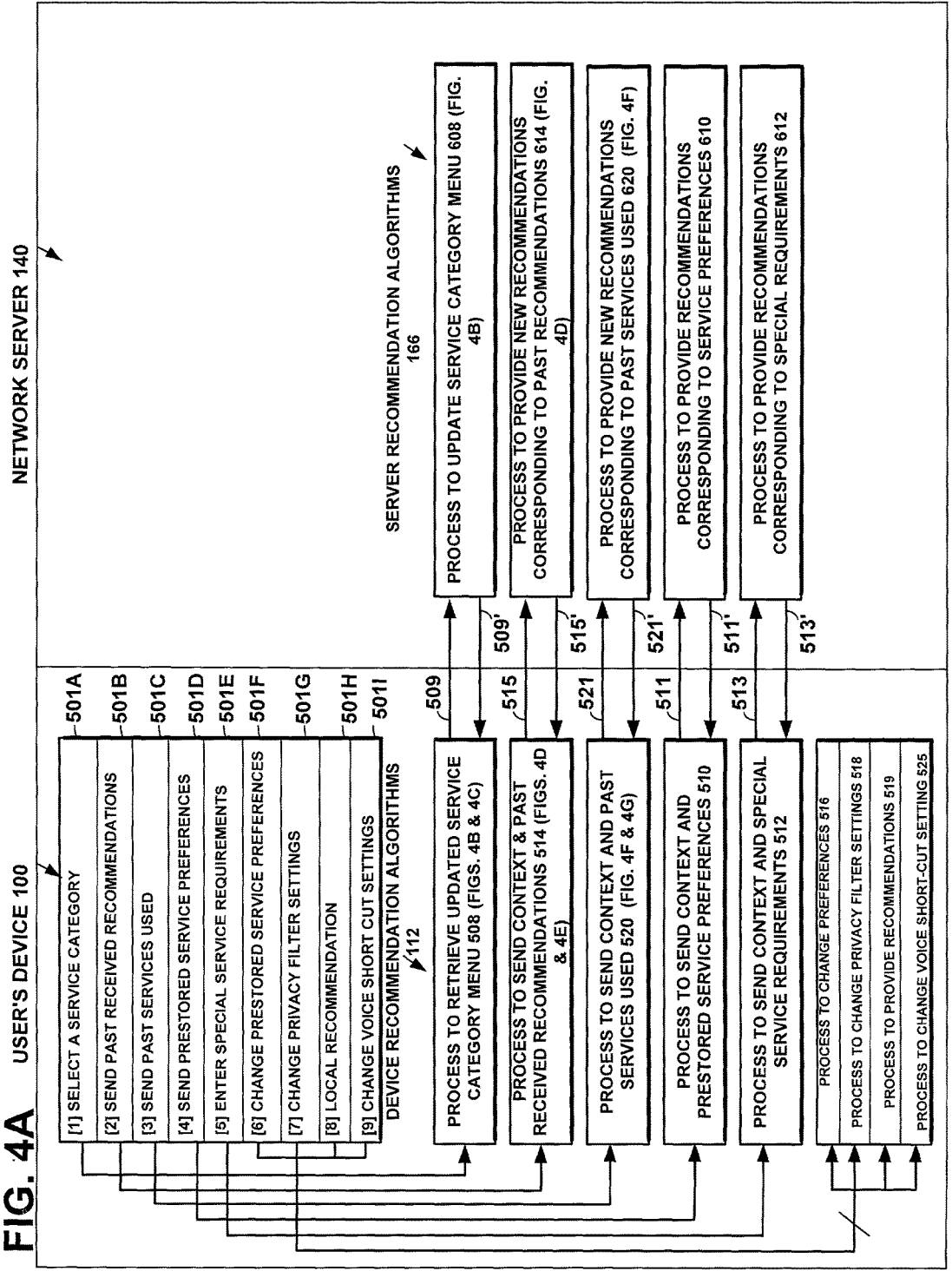
FIG. 4A is an exemplary network process diagram showing the interaction of the user's device 100 and the network server 140.

Reference to FIG. 4A illustrate an example of how processes to be implemented at the wireless device 100 or the network server 140 may be invoked through a menu selection, such as the menu of FIG. 3A. One or more of the processes to be discussed below, particularly the recommendation related processes, may alternatively be invoked upon initiation of browser 102, upon a user command, according to setting of the wireless device 100, or some other triggering event.

Figure 4B:
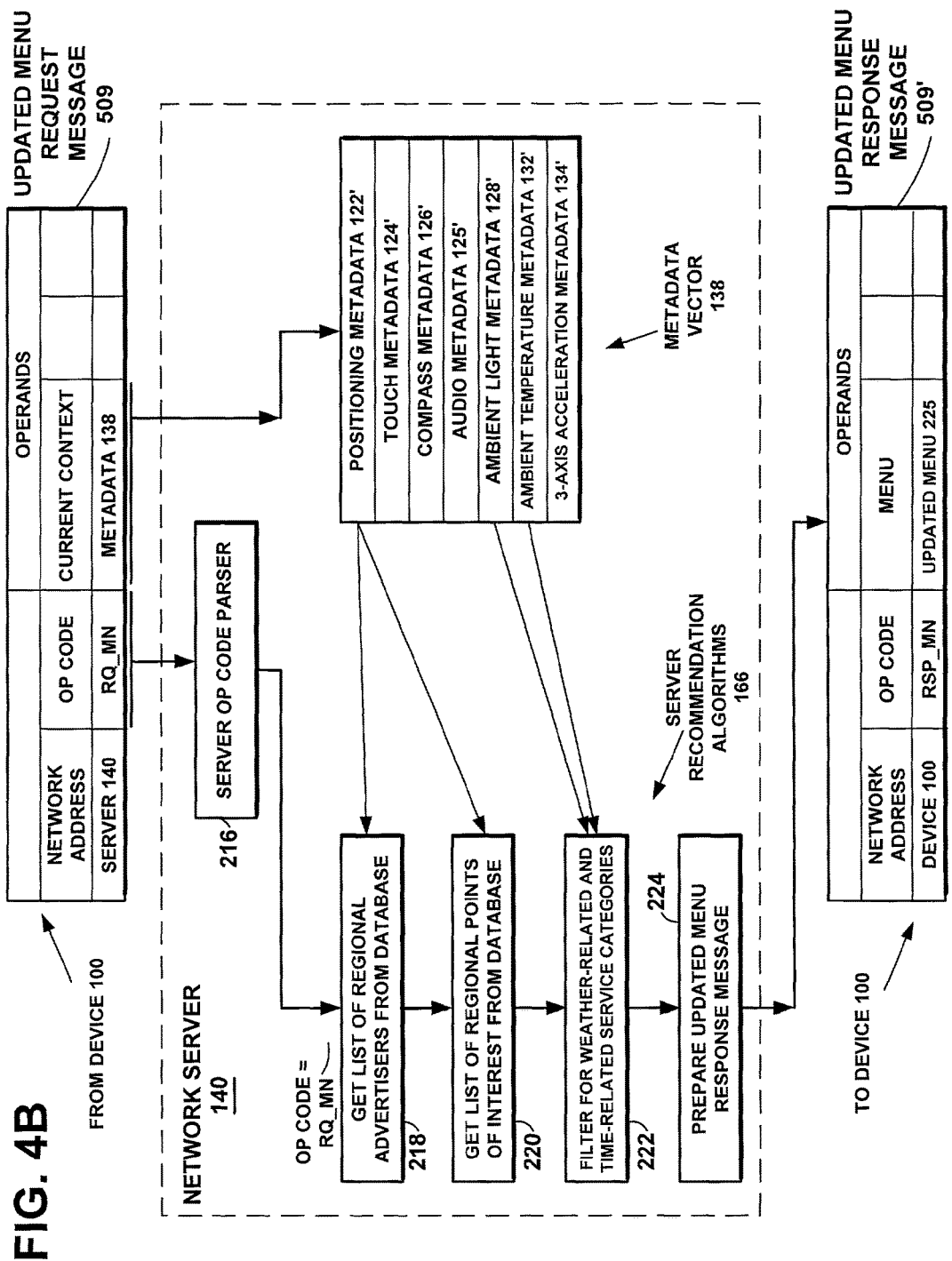
FIG. 4B is a flow diagram of an exemplary process in the network server 140 to respond to an updated menu request message from the wireless device 100, by compiling an updated menu which is returned to the wireless device 100.

As shown, the option 501A to [1] SELECT A SERVICE CATEGORY invokes process 508 in the user's device 100, to RETRIEVE UPDATED SERVICE CATEGORY MENU, as shown in FIGS. 4B and 4C. Process 508 sends updated menu request message 509 to process 608 in the network server 140, to UPDATE SERVICE CATEGORY MENU, as shown in FIG. 4B. The updated menu 225 (FIG. 3B) is returned in updated menu response message 509', as shown in FIGS. 4B & 4C. The updated menu 225 is displayed in the device's browser 102 in FIG. 3A. This same sequence of steps is automatically performed by the wireless device 100 and the network server 140 in response to the wireless device 100 automatically transmitting messages with a unique op code designating that the message is an automatically transmitted message.

The option 501B to [2] SEND PAST RECEIVED RECOMMENDATIONS invokes process 514 in the user's device 100, to SEND CONTEXT & PAST RECEIVED RECOMMENDATIONS, as shown in FIGS. 4D & 4E. Process 514 sends recommendation request message 515 to process 514 in the network server 140, to PROVIDE NEW RECOMMENDATIONS CORRESPONDING TO PAST RECOMMENDATIONS, as shown in FIG. 4D. The recommendations 250 are returned in recommendation response message 515', as shown in FIG. 4E. The recommendations 250 are displayed in the device's browser 102 in FIG. 3H. This same sequence of steps is automatically performed by the wireless device 100 and the network server 140 in response to the wireless device 100 automatically transmitting messages with a unique op code designating that the message is an automatically transmitted message.

Figure 3H:
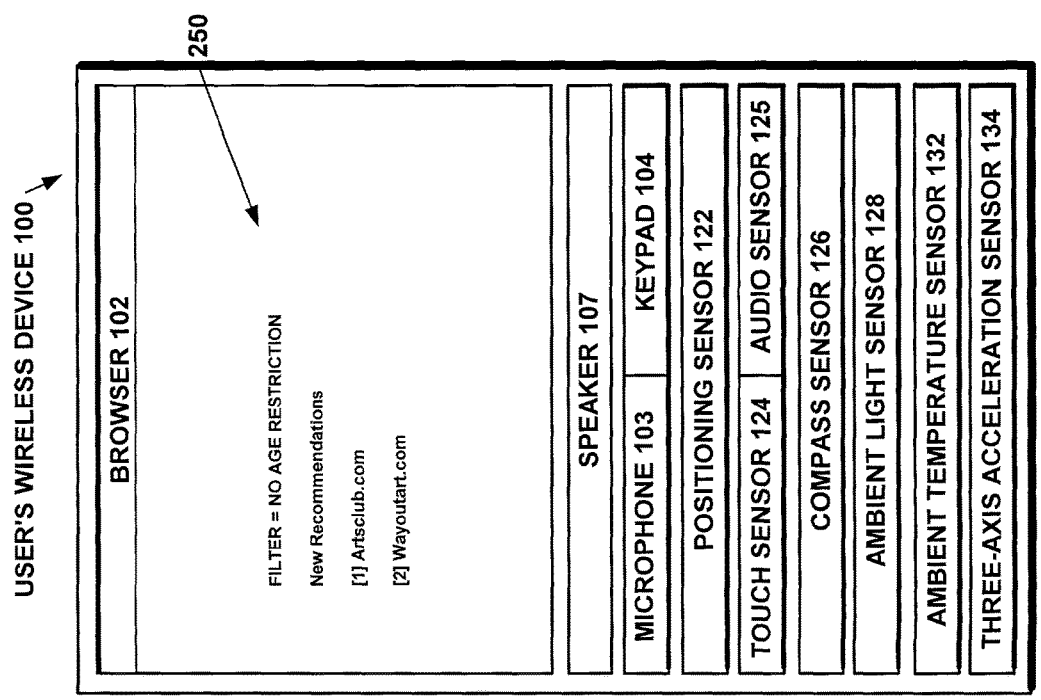
Figure 4G:
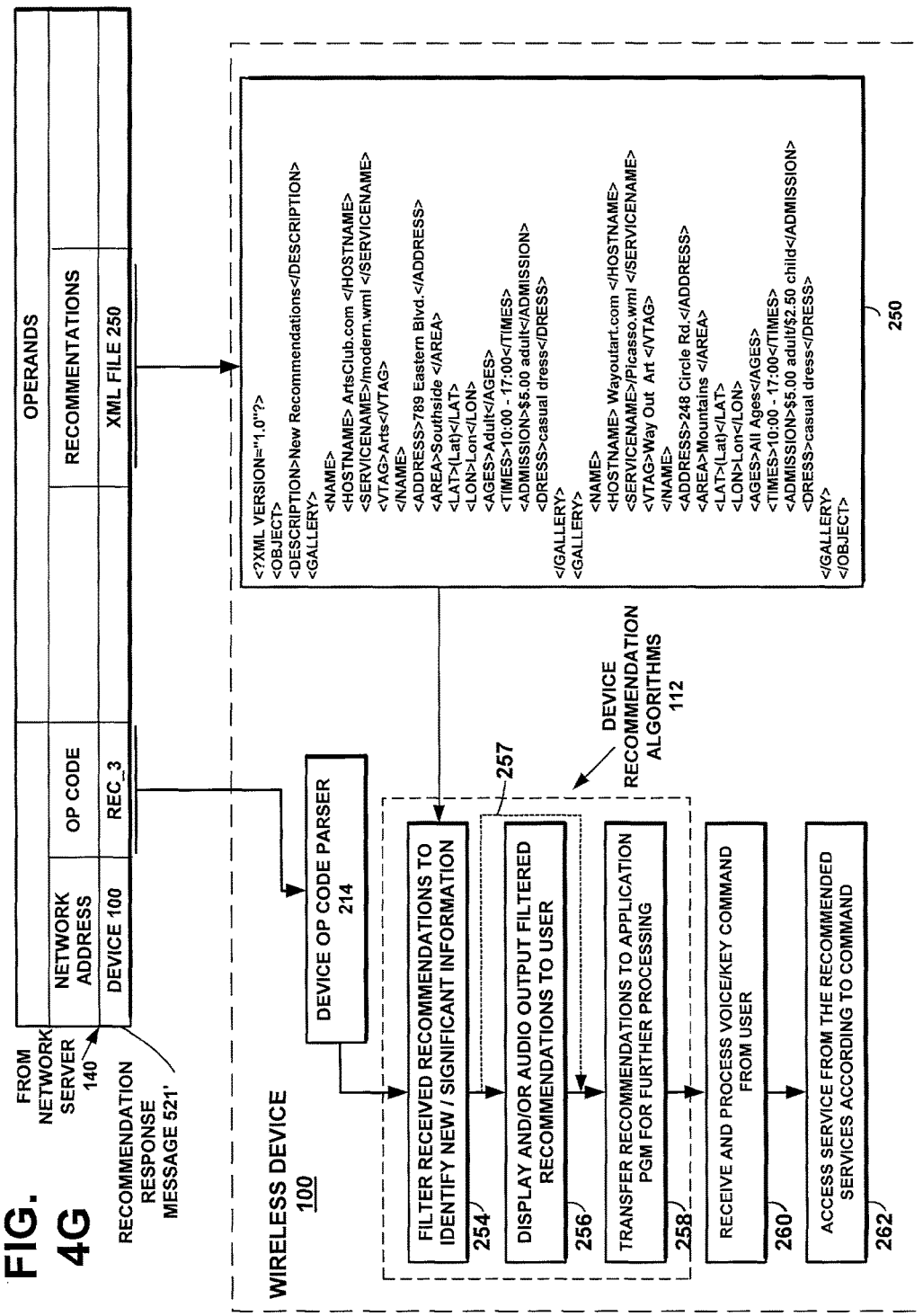
FIG. 4G is a flow diagram of an exemplary process in the wireless device 100 to filter the recommendations received in the recommendation response message and output the filtered recommendations on the device's browser.

The option 501C to [3] SEND PAST SERVICES USED invokes process 520 in the user's device 100, to SEND CONTEXT AND PAST SERVICES USED, as shown in FIGS. 4F & 4G. Process 520 sends recommendation request message 521 to process 620 in the network server 140, to PROVIDE NEW RECOMMENDATIONS CORRESPONDING TO PAST SERVICES USED, as shown in FIG. 4F. The recommendations 250 are returned in recommendation response message 521', as shown in FIG. 4G. The recommendations 250 are displayed in the device's browser 102 in FIG. 3H. This same sequence of steps is automatically performed by the wireless device 100 and the network server 140 in response to the wireless device 100 automatically transmitting messages with a unique op code designating that the message is an automatically transmitted message.

The option 501D to [4] SEND PRESTORED SERVICE PREFERENCES invokes process 510 in the user's device 100, to SEND CONTEXT AND PRESTORED SERVICE PREFERENCES in the prestored service preferences file 231, as shown in FIGS. 4D & 4F. An example of prestored service preferences is shown displayed in the browser 102 of FIG. 3D. Process 510 sends message 511 to process 610 in the network server 140, to PROVIDE RECOMMENDATIONS CORRESPONDING TO SERVICE PREFERENCES. The recommendations 250 are returned in message 521'.

The option 501E to [5] ENTER SPECIAL SERVICE REQUIREMENTS invokes process 512 in the user's device 100, to SEND CONTEXT AND SPECIAL SERVICE REQUIREMENTS. An example of special service requirements is shown displayed in the browser 102 of FIG. 3C. Process 512 sends message 513 to process 612 in the network server 140, to PROVIDE RECOMMENDATIONS CORRESPONDING TO SPECIAL REQUIREMENTS. The recommendations 250 are returned in message 521'.

The option 501F to [6] CHANGE PRESTORED SERVICE PREFERENCES invokes process 516 in the user's device 100, to CHANGE PRESTORED SERVICE PREFERENCES. An example of a menu to change prestored service preferences is shown displayed in the browser 102 of FIG. 3D.

The option 501G to [7] CHANGE PRIVACY FILTER SETTINGS invokes process 518 in the user's device 100, to CHANGE PRIVACY FILTER SETTINGS. An example of a menu to change privacy filter settings is shown displayed in the browser 102 of FIG. 3E.

The option 501H to [8] LOCAL RECOMMENDATION invokes process 519 in the user's device, to initiate LOCAL RECOMMENDATION, e.g., to determine service recommendations locally at the user's device. An example of a menu to initiate local recommendation is shown displayed in the browser 102 of FIG. 3F. The local recommendations may be determined from a database of [a] past used services or [b] downloaded services from a network server, such as server 140. An example of service recommendations displayed on the browser 102 is shown in FIGS. 3H through 3L.

The option 501I to [9] CHANGE VOICE SHORT-CUT SETTINGS invokes process 525 in the user's device to initiate CHANGE VOICE SHORT-CUT SETTINGS. An example of a menu to initiate change in voice short-cut settings is shown displayed in the browser of FIG. 3G. These settings may include [a] downloading voice tags from server 140, voice registry or other remote location, [b] adding, modifying and/or deleting voice tag for a particular service, [c] setting a language preference for voice tag (e.g., English, French, Japanese, etc.) to facilitate voice recognition processing, [d] setting voice tag output ON or OFF, and so forth. While the above are discussed for voice tags, these setting equally apply generally to voice short-cuts.

As the user carries about the wireless device 100, its sensors 122-134 continuously measure the geographic location and context of the device, which are compiled into a metadata vector 138 representing the current context. The wireless device 100 periodically transmits the current context in an updated menu request message 509, shown in FIG. 4B, over the wireless network 105 to the network server 140. The updated menu request message 509 includes the network address of the server 140, an op code value RQ_MN that designates the message as an updated menu request message, and an operand portion containing the current context. The network server 140 of FIG. 4B includes a server op code parser 216 that interprets the op code value RQ_MN as indicating that the message is an updated menu request message 509. In response, the server op code parser 216 invokes step 218 of the server recommendation algorithms 166. Step 218 gets from a database a list of services provided by regional advertisers corresponding to the current context of the device 100. Step 218 flows to step 220, which gets from a database a list of services provided by regional points of interest, such as galleries, monuments, museums, and the like, corresponding to the current context of the device 100. Step 220 flows to step 222, where the list of services provided by regional advertisers and the list of services provided by regional points of interest are filtered for weather related and time related service categories, eliminating those services that cannot be used by the user in the current context. For example, night baseball is eliminated, if the current context is daytime. Hiking a nature trail is eliminated if the current context is bad weather. Likewise, in a digital service scenario, electronic stock trading may be eliminated, if the current context is nighttime. Step 222 flows to step 224, where the updated menu message 509' is prepared. The updated menu message 509' includes the network address of the device 100, an op code "RSP_MN" that designates the message as an updated menu server response message, and operands. The operands include the updated menu 225. The updated menu 225 is returned to the device 100 in the updated menu response message 509', as shown in FIGS. 4B and 4C. This same sequence of steps is automatically performed by the wireless device 100 and the network server 140 in response to the wireless device 100 automatically transmitting messages with a unique op code designating that the message is an automatically transmitted message.

The device op code parser 214 in FIG. 4C interprets the op code value "RSP_MN" as indicating that the message is an updated menu server response 509'. In response, the device op code parser 214 invokes step 226 of the device recommendation algorithms 112. Step 226 stores and displays the updated menu 225 in the device's browser 102 in FIG. 3B.

The user can initialize the device 100 by entering special service requirements as shown in the browser 102 of FIG. 3C. Examples of special service requirements that can be stored in the service history log 110 of device 100 are:
  [a] AGE REQUIREMENT:
  ALL AGES/CHILD AGE RANGE/ADULTS ONLY
  [b] TIME OF DAY REQUIREMENT:
  EARLIEST/LATEST
  [c] MAX WALKING DISTANCE
  [d] PRICE RANGE
  [e] PREFERRED DRESS:
  CASUAL/DRESSY/FORMAL
  [f] HANDICAPPED FACILITIES:
  RAMPS/HAND RAILS/REST ROOMS.

Figures 3D, 3E:
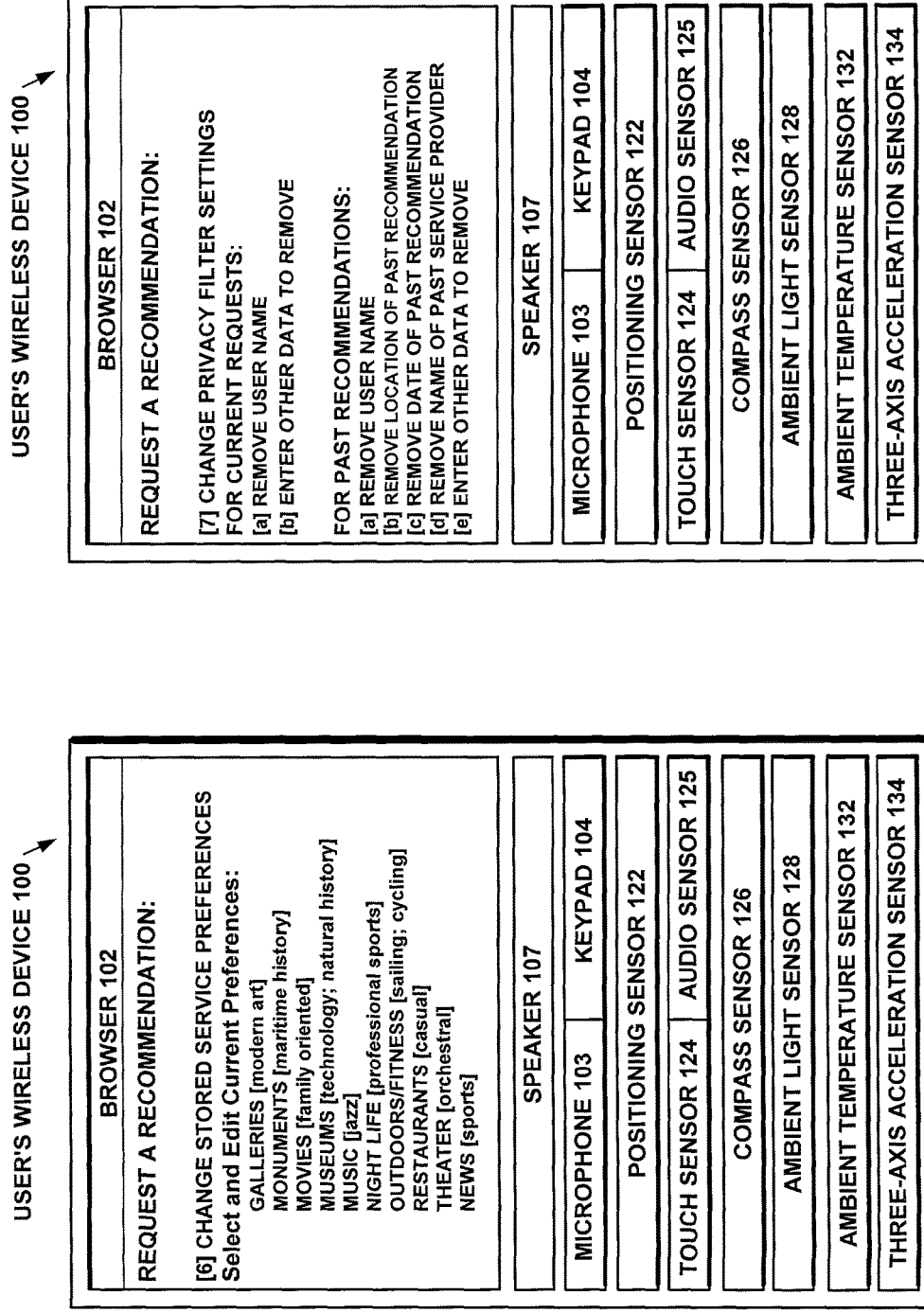
FIGS. 3D and 3E show an example of the user's wireless device displaying the CHANGE STORED SERVICE PREFERENCES sub-menu and the CHANGE PRIVACY FILTER SETTINGS sub-menu, respectively.
Figure 3G:
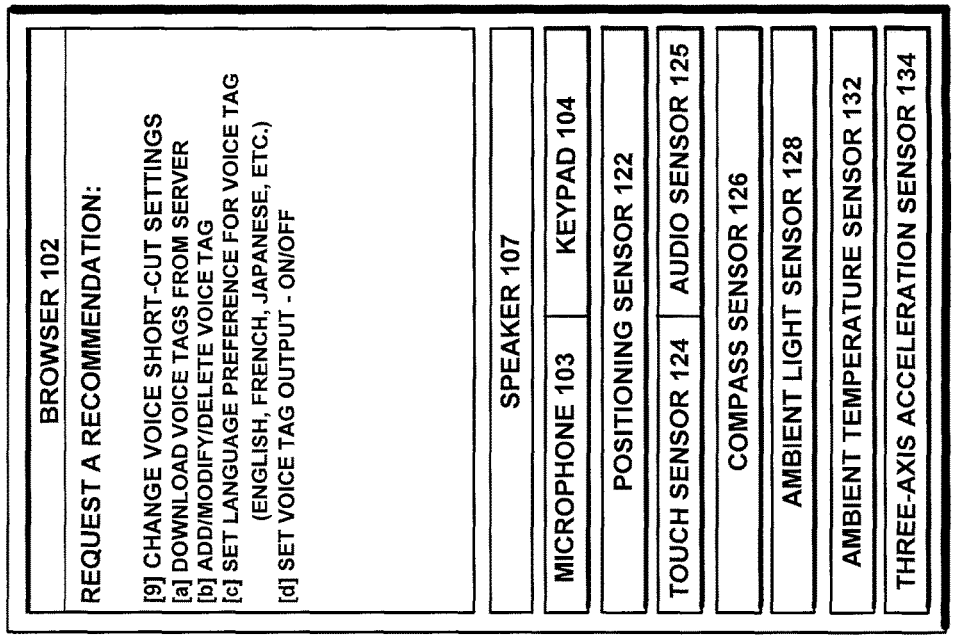
FIGS. 3F and 3G show an example of the user's wireless device displaying the LOCAL RECOMMENDATION sub-menu and the CHANGE VOICE SHORT-CUT sub-menu, respectively.
Figure 3F:
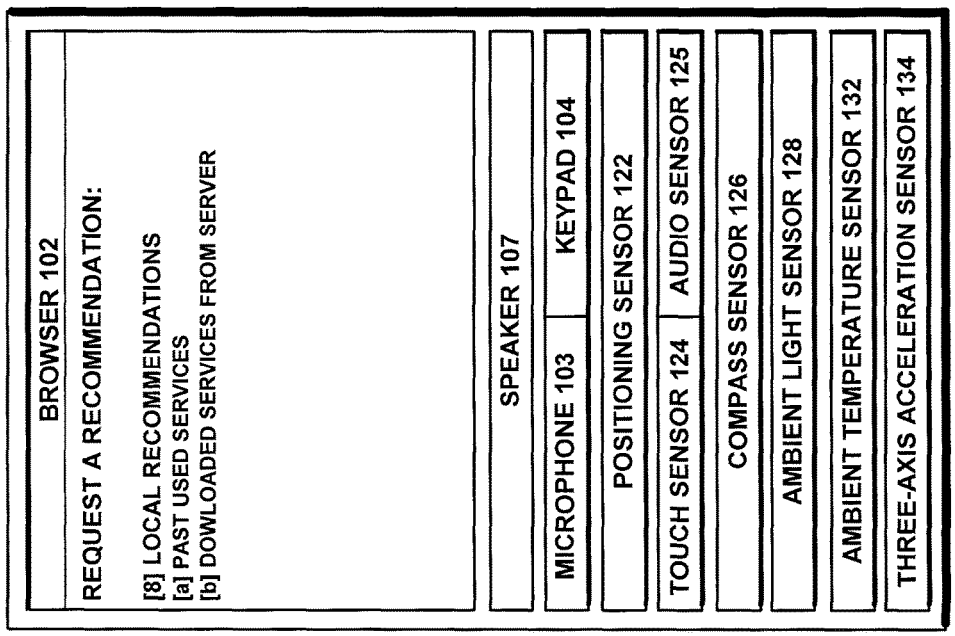
Figure 3I:
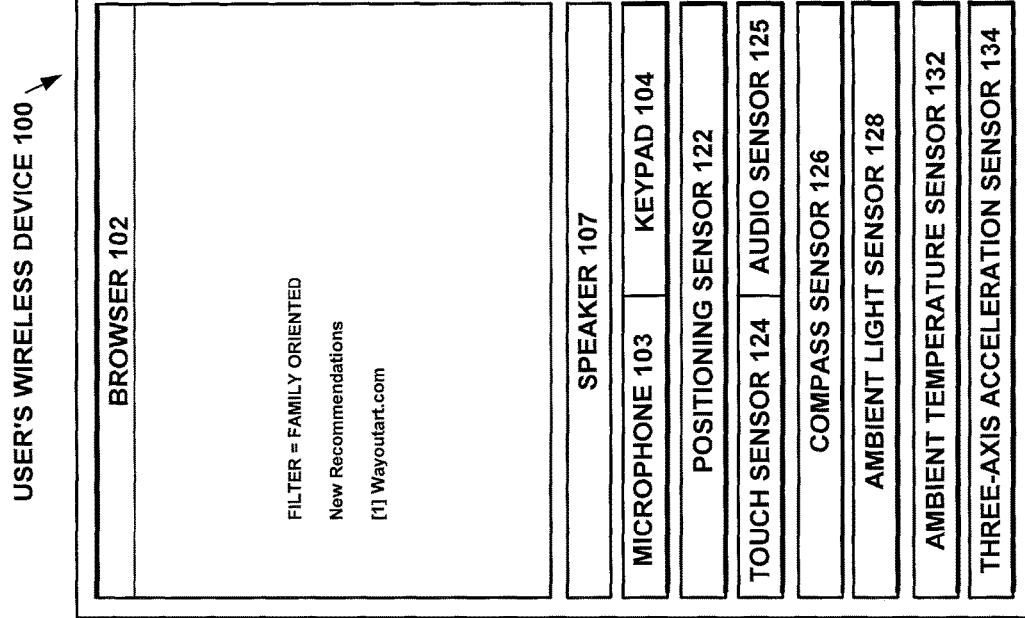
FIGS. 3H and 3I show an example of the user's wireless device displaying the recommendation results, for recommendations with no age restriction filter and for recommendations with a filter for family oriented subject matter, respectively.

The user can initialize the device 100 by entering stored service preferences, as shown in the browser 102 of FIG. 3D. Examples of stored service preferences that can be stored in the service history log 110 of device 100 are:
  GALLERIES [modem art]
  MONUMENTS [maritime history]
  MOVIES [family oriented]
  MUSEUMS [technology; natural history]
  MUSIC [jazz]
  NIGHT LIFE [professional sports]
  OUTDOORS/FITNESS [sailing; cycling]
  RESTAURANTS [casual]
  THEATER [orchestral]
  NEWS [sports]

The user can initialize the device 100 by entering privacy filter settings, as shown in the browser 102 of FIG. 3E. Privacy filter settings are used to remove the user's private information from the messages sent by the device 100 to the network server 140. Examples of privacy filter settings that can be stored in the device 100 are:
  FOR CURRENT REQUESTS:
  [a] REMOVE USER NAME
  [b] ENTER OTHER DATA TO REMOVE
  FOR PAST RECOMMENDATIONS:
  [a] REMOVE USER NAME
  [b] REMOVE LOCATION OF PAST RECOMMENDATION
  [c] REMOVE DATE OF PAST RECOMMENDATION
  [d] REMOVE NAME OF PAST SERVICE PROVIDER
  [e] ENTER OTHER DATA TO REMOVE The service history log 110 in the user's device 100 may store activities in five component databases: [1] past recommendations and context, [2] past services used and context, [3] prestored service preferences, [4] special requested service requirements, and [5] services and voice short-cuts. An example is shown in FIG. 4 of the two component databases: [1] past recommendations and context 227 and [2] past services used and context 235. The embodiment of the database shown in FIG. 4 uses extensible markup language (XML) files to provide a coherent view of the wide variety of data that can be used to characterize a contexts, services, recommendations, and voice short-cuts.

To specify the current context, XML tags are used to categorize each type of context data that characterizes the current context. Each unit context data is delineated by a beginning tag and an ending tag, forming an element. For example, the element "<TEMPERATURE>10 degrees Celsius</TEMPERATURE>" defines the category as temperature, and specifies the data as "10 degrees Celsius". As another example, the element "<LAT>38 degrees, 48 minutes North</LAT>" defines the category as geographic latitude, and specifies the data as "38 degrees, 48 minutes North". Another feature of XML is its ability to specify a hierarchy in the categories of data. For example, geographic location is normally specified as both a latitude and a longitude. The categories of data for latitude and longitude can be thought of as "child" categories within the category for geographic location. XML expresses this hierarchy as follows:

```
<LOCATION>
    <LAT>38 degrees, 48 minutes North</LAT>
    <LON>76 degrees, 38 minutes West</LON>
</LOCATION>
```

A typical specification of the context for an activity stored in the service history log 110 would be, for example:

```
<CONTEXT>
    <LOCATION>
        <LAT>38 degrees, 48 minutes North</LAT>
        <LON>76 degrees, 38 minutes West</LON>
        <ALT>150 meters</ALT>
    /LOCATION>
    <DATE>2001:01:31</DATE>
    <TIME>1200</TIME>;
    <TEMPERATURE>10 degrees Celsius</TEMPERATURE>
</CONTEXT>.
```

A typical specification of the voice short for service stored in the service history log 110 may be, for example:

```
<NAME>
    <HOSTNAME>HistoryMuseum.com</HOSTNAME>
    <SERVICENAME>/exhibits.wml/</SERVICENAME>
    <VOICETAG>History</VOICETAG>
</NAME>.
```

By expressing the context in the service history log 110 in XML, the stored expression is both human and machine readable, it defines the content, and it defines the hierarchical structure of the content. XML also separates the appearance of the content from the structure of the content, so that the content can be displayed in any format by using customized style sheets in each different type of display device. Extensible Stylesheet Language (XSL) can provide flexible document presentation, enabling the content of an XML file to be displayed on the large display screen of a personal computer, as well as in the browser 102. Messages exchanged between the wireless device 100 and the network server 140 can include XML files carried in the Simple Object Access Protocol (SOAP) messaging protocol or the SyncML synchronization protocol. For additional background on XML, see the book by Heather Williamson, XML: The Complete Reference, Osborne/McGraw-Hill, 2001.

Both the wireless device 100 and the network server 140 may be configured to interpret the tags of the XML elements in the XML file in the same way. This can be accomplished by incorporating the same XML tag parser in both the device recommendation algorithms 112 of the wireless device 100 and in the server recommendation algorithms 166 of the network server 140. In its simplest form, the XML tag parser can be a simple string comparison function that searches the XML file for XML tag strings, such as the beginning tag "<LOCATION>" and the ending tag "</LOCATION>". When it finds the a particular beginning tag, it gets the data located between the beginning tag and the ending tag and passes the data as "location data" to program subroutines that operate on location data. Such program subroutines include the database search routine in the server recommendation algorithms 166 in the server 140, that forms a query from the latitude and longitude data to search for recommendations for services in the database 192 having similar or related to the latitude and longitude values.

Another way for both the wireless device 100 and the network server 140 to interpret the tags of the XML elements in the XML file in the same way, is by means of a standard XML parser. The two principal, standard XML parsers are the Simple API for XML (SAX) event-based parser and the Document Object Model (DOM) tree-based parser. The principal difference between them is in the way the XML data is made available to the client application, such as the device recommendation algorithms 112. SAX is an event driven model, wherein the client application is continuously notified as the XML document features are recognized by the parser. As the SAX parser reads an XML file, it sends to the application program 112 information from the XML file in real time. Each time the parser sees a beginning tag, an ending tag, character data, or a processing instruction, it reports it to the client application. The entire XML file does not have to be read before acting on the data at the beginning of the file. The entire document does not have to reside in memory, which can be an advantage for the wireless device 100.

The Document Object Model (DOM) model parser is object based, on the other hand, wherein the entire XML document is parsed and stored as a hierarchical tree of objects that the client application can then randomly access. A document type definition (DTD) is available to both the wireless device 100 and in the network server 140, either being stored locally or at a server they can reference. A DTD is a set of declarations that specify the allowed order, structure, and meaning of the tags for a particular XML file. The XML file references the DTD that governs its order, structure, and meaning, at a specified location, such as the directory of the local filesystem, and its filename as a handle. Standard XML parsers are part of many operating systems now available. A DOM tree-based parser reads in the DTD and the XML file and converts the XML file into programming constructs accessible to the application logic. A document type declaration element must appear in the XML file to indicate the DTD to which the XML file complies and where to find it. It starts with "<DOCTYPE" and ends with ">". The example given below is DOCTYPE OBJECT "xml_directory\object.dtd">.

Each XML file begins with a processing instruction that gives information to an XML processor in both the wireless device 100 and the network server 140. It starts with "<?" and ends with ">". The example given below is <?XML VERSION="1.0"?>.

An example of a complete XML file specifying a past recommendation received by the device 100 and the context in which it was received, is shown in the following TABLE A, which is the XML file 227 taken from the service history log 110 of FIG. 4.

TABLE A

Example of an XML File Specifying a Past Recommendation

```
<?XML VERSION="1.0"?>
<DOCTYPE PAST_RECOMMENDATIONS_OBJECT
"xml_directory\object.dtd">.
<PAST_RECOMMENDATIONS_OBJECT>
    <DESCRIPTION>Past Recommendation</DESCRIPTION>
    <PLACE-EVENTS>Museums</PLACE-EVENTS>
<PAST_RECOMMENDATIONS>
    <NAME>
        <HOSTNAME>HistoryMuseum.com</HOSTNAME>
        <SERVICENAME>/exhibits.wml/</SERVICE NAME>
        <VOICETAG>History</VOICETAG>
    </NAME>
    <CONTEXT>
        <LOCATION>
            $<LAT>38 degrees, 48 minutes North</LAT>
            <LON>76 degrees, 38 minutes West</LON>
            <ALT>150 meters</ALT>
        </LOCATION>
        <DATE>2001:01:31</DATE>
        <TIME>1200</TIME>
        <TEMPERATURE>10</TEMPERATURE>
        <METAVECTOR>FF12AB34CD</METAVECTOR>
    </CONTEXT>
</PAST_RECOMMENDATIONS>
</PAST_RECOMMENDATIONS_OBJECT>
```

An abbreviated example of a corresponding document type definition (DTD) that specifies the allowed order, structure, and meaning of the tags for a past recommendation XML file, is shown in the following TABLE B. This is part of a file named "object.dtd" stored in the local filesystem directory named "xml_directory" in both the wireless device 100 and the network server 140. It illustrates, for example, that the PAST RECOMMENDATIONS element must include the NAME of the past recommended service, and the CONTEXT in which it was recommended. The NAME element must include the HOSTNAME, the SERVICENAME, and the VOICETAG. The CONTEXT element must include the LOCATION, the DATE, the TIME, the TEMPERATURE, and the METAVECTOR containing the metadata vector 138 characterizing the context of device. The LOCATION element must include latitude LAT, the longitude LON, and the altitude ALT of the device.

TABLE B

Abbreviated Example of a Document Type Definition (DTD)

```
<!ELEMENT PAST_RECOMMENDATIONS_OBJECT
(DESCRIPTION, PLACE-EVENTS, PAST_RECOMMENDATIONS)>
    <!ELEMENT PAST_RECOMMENDATIONS (NAME, SERVICE,
    CONTEXT)>
    <!ELEMENT NAME (HOSTNAME, SERVICENAME,
    VOICETAG)>
    <!ELEMENT CONTEXT (LOCATION, DATE, TIME,
TEMPERATURE, METAVECTOR)>
    <!ELEMENT LOCATION (LAT, LON, ALT)>
```

In a complete DTD for the XML file of TABLE A, the data elements, such as "<LAT>38 degrees, 48 minutes North</LAT>" would be specified in the DTD as "<!ELEMENT LAT (#PCDATA)>" to indicate that these elements are present and contain only data, and do not contain other elements.

Great flexibility is provided by the use of XML to define the data to be included in the files of the five component databases of the service history log 110: [1] past recommendations and context, [2] past services used and context, [3] prestored service preferences, [4] special requested service requirements and [5] services and voice short-cuts (e.g., voice tags). These XML files can be readily identified, accessed, and their elements parsed to obtain the relevant data pertaining to each category. The meaning of the data is assured by its location in a known element type. The XML files, themselves, can be included in the messages exchanged between the wireless device 100 and the network server 140. This can be seen in the following discussion of the process 514 in the wireless device 100 of FIG. 4C, to process the user's request or generally a request by the wireless device 100 for a recommendation by gathering XML files 227 of past received recommendations from the service history log 110 and pairing them with the current context of the device. The context-activity pair is then sent in a recommendation request message 515 to the network server 140.

In FIG. 3A, the user selects the option [2] SEND PAST RECEIVED RECOMMENDATIONS. Then, in FIG. 3B, the user selects the service category of "GALLERIES" from the service category menu 225. Then in FIG. 4C, step 228, the wireless device 100 receives the user's input and flows to step 230 to get the current context. The process then flows to step 232 to access the service history log 110 for XML files 227 of past received recommendations. The process then flows to step 234 to apply privacy filter settings 229 to the data in the XML files 227. For example, step 234 can remove any occurrence of the user's name, the location of past recommendations, the date of past recommendations, the name of past service providers, and the like. Then, the recommendation request message 515 is assembled. The recommendation request message 515 includes the network address of the server 140, an op code "RQ_REC_3" that designates the message as a recommendation request message, and the operands. The operands include the current context expressed in a separate field as the metadata vector 138, the past recommendation and context XML file 227', and the prestored service preferences XML file 231. The wireless device 100 then sends recommendation request message 515 to the network server 140, as shown in FIG. 4D.

FIG. 4D is a flow diagram of the process in the network server 140 to respond to the recommendation request message 515 from the device 100. The network server 140 of FIG. 4D includes the server op code parser 216 that interprets the op code value "RQ_REC_3" as indicating that the message is a recommendation request message 515. In response, the server op code parser 216 invokes step 240 of the server recommendation algorithms 166. Step 240 receives the metadata vector 138 from the message 515 and accesses or determines recommendations from the database 192 corresponding to the current context. The process may then flows to step 242, if desired, which searches through the accessed recommendations obtained from the database to find those similar to the past received recommendations 227' input from the message 515. The process then flows to step 244 which sorts the similar recommendations in accordance with the user's preferences 231, also received in the message 515. The user's preferences 231 is shown as the example XML file of TABLE C, as follows:

TABLE C

Example of an XML File Specifying User Preferences

<?XML VERSION="1.0"?>
<PREFERENCES_OBJECT>
    <DESCRIPTION>Preferences</DESCRIPTION>
    <GALLERIES>Modern Art</GALLERIES>
    <MONUMENTS>Maritime</MONUMENTS>
    <MOVIES>Family Oriented</MOVIES>
</PREFERENCES_OBJECT>

Other user preferences objects or combinations thereof instead of those shown above in Table C may also be employed, e.g., NEWS, etc.

The process then flows to step 246 which updates usage statistics and stores them in a database. The process then flows to step 248 which assembles the recommendation response message 515' and transmits it back to the wireless device 100. The recommendation response message 515' includes the network address of the wireless device 100, the op code "REC_3" that designates the message as a recommendation response message, and the operands. The operands include the recommendations XML file 250.

FIG. 4E is a flow diagram of a process in the wireless device 100 to filter the recommendations received in the recommendation response message and display the filtered recommendations on the device's browser. The device op code parser 214 in FIG. 4E interprets the op code value "REC_3" as indicating that the message is a recommendation response message 515'. In response, the device op code parser 214 invokes step 254 of the device recommendation algorithms 112. Step 254 filters the recommendations XML file 250 received in message 515'. The filtering identifies new or significant information in the recommendations XML file 250. This can be accomplished by comparing the recommendations XML file 250 with the past recommendations XML files 227 in the service history log 110. The process then flows to step 256 which displays the filtered recommendations to the user on the browser 102 shown in FIG. 3H. An XSL stylesheet can be used to display the desired content of the recommendations XML file 250 in the browser 102. FIG. 3H shows the result of a first filtering criterion of "FILTER=NO AGE RESTRICTION". The one of the two recommendations displayed in FIG. 3H has the characterization "Ages: Adult" (FIG. 4E). Alternately, if the filtering criterion were "FILTER=FAMILY ORIENTED" as provided in FIG. 3I, then only one of two potential recommendations is displayed, the displayed recommendation having the characterization "Ages: All Ages" (FIG. 4E). In the alternative to step 256, the recommendation process or recommended services may be transparent to the user of the wireless device 100, as shown by reference numeral 257.

The process then flows to step 258 which optionally transfers the recommendations 250 to the application programs 106 for further processing. This same sequence of steps is automatically performed by the wireless device 100 and the network server 140 in response to the wireless device 100 automatically transmitting messages with a unique op code designating that the message is an automatically transmitted message.

The process then continues to step 260 in which the wireless device receives the user's voice command and identifies the service (from the recommended services) with a voice short-cut matching the user's voice command. At step 262, the wireless device accesses the identified service. For example, the user may say the voice command "Arts" or any phonetic equivalent thereof to initiate access to the service Artsclub.com. As shown in FIG. 4E, the voice short for the recommended services may be received from the server 140 as voice tags in an XML file.

The recommendations XML file 250 providing two digital service recommendations for galleries, is shown as the example XML file of TABLE D, as follows:

TABLE D

Example of an XML File Specifying New Recommendations

```
<?XML VERSION="1.0"?>
<DOCTYPE RECOMMENDATIONS_OBJECT
"xml_directory\object.dtd">.
<RECOMMENDATIONS_OBJECT>
    <DESCRIPTION>New Recommendations</DESCRIPTION>
    <RECOMMENDATION>
        <NAME>
            <HOSTNAME>Artsclub.com</HOSTNAME>
            <SERVICENAME>[service name or
            extension]</SERVICENAME>
            <VOICETAG>Arts</VOICETAG>
        </NAME>
        <LOCATION>
            <ADDRESS>789 Eastern Blvd.</ADDRESS>
            <AREA>Southside </AREA>
            <LAT>(Lat)</LAT>
            <LON>Lon</LON>
        </LOCATION>
        <AGES>Adult</AGES>
        <TIMES>10:00-17:00</TIMES>
        <ADMISSION>$5.00 adult</ADMISSION>
        <DRESS>casual dress</DRESS>
    </RECOMMENDATION>
    <RECOMMENDATION>
        <NAME>
            <HOSTNAME>Wayoutart.com</HOSTNAME>
            <SERVICENAME>[service name or
            extension] </SERVICENAME>
            <VOICETAG>Way Out</VOICETAG>
        </NAME>
        <LOCATION>
            <ADDRESS>248 Circle Rd.</ADDRESS>
            <AREA>Mountains </AREA>
            <LAT>(Lat)</LAT>
            <LON>Lon</LON>
        </LOCATION>
        <AGES>All Ages</AGES>
        <TIMES>10:00-17:00</TIMES>
        <ADMISSION>$5.00 adult/$2.50 child</ADMISSION>
        <DRESS>casual dress</DRESS>
    </RECOMMENDATION>
</RECOMMENDATIONS_OBJECT>
```

An abbreviated example of a corresponding document type definition (DTD) that specifies the allowed order, structure, and meaning of the tags for a new recommendation XML file 250, is shown in the following TABLE E. This DTD is part of a file named "object.dtd" stored in the local filesystem directory named "xml_directory" in both the wireless device 100 and the network server 140. It illustrates, for example, that new RECOMMENDATIONS sent to the wireless device 100 must include NAME and LOCATION of the service, but it does not include the complete CONTEXT. The NAME must include HOSTNAME, SERVICENAME, VOICETAG; and the LOCATION must include ADDRESS, AREA, LAT, LON. The DTD can provide for optional data in the XML file, as well, by including other elements, such as "<ADMISSION>" and designating them with an asterisk "*" so that they are not necessarily required in each XML file. The same XML tag parser in both the device recommendation algorithms 112 of the wireless device 100 and in the server recommendation algorithms 166 of the network server 140, can search the XML file for optional XML tag strings, such as the beginning tag "<ADMISSION>" and the ending tag "</ADMISSION>", and if they are found, the XML tag parser gets the data located between the tags and passes it as "admission data" to program subroutines that operate on admission data.

TABLE E

Abbreviated Example of a DTD for New Recommendations

```
<!ELEMENT RECOMMENDATIONS_OBJECT (DESCRIPTION,
RECOMMENDATION)>
<!ELEMENT RECOMMENDATION (NAME, LOCATION,
ADMISSION*)>
<!ELEMENT NAME (HOSTNAME, SERVICENAME, VOICETAG)>
<!ELEMENT LOCATION (ADDRESS, AREA, LAT, LON)>
<!ELEMENT ADMISSION (#PCDATA)>
```

To enable the wireless device 100 to read the XML recommendations file 250 of TABLE D, a DOM tree-based parser in the device 100 reads in the DTD of TABLE E and the XML file 250 received from the network server 140. The DOM tree-based parser converts the XML file 250 into a hierarchical tree data structure enabling the data for each element to be accessible to the application programs 106 and recommendation algorithms 112.

This process also works in reverse in the network server 140 and enables the network server to construct the XML recommendations file 250. The DOM tree-based parser can read in the DTD of TABLE E and create the hierarchical tree data structure that serves as a template for the recommendation algorithm 166 in server 140. The recommendation algorithm 166 can then fill the nodes of the tree with recommendation data, such as ADDRESS data, AREA data, LAT data, and LON data. The DOM tree-based parser uses this newly created tree of data to create a corresponding XML recommendations file 250 of TABLE D, that conforms to the DTD of TABLE E. The recommendation algorithm 166 and the DOM tree-based parser, in effect, work together as a document generator. The Document Object Model (DOM) defines the characteristics of the XML file hierarchical tree data structure and an application programming interface (API) for manipulating it. A description of DOM is provided on the web site http://www.w3.org/TR/DOM-Level-2-Core/. For additional information on the Document Object Model and the XML file hierarchical tree data structure, see the book by Elliotte Harold, et al, entitled XML In A Nutshell, O'Reilly & Associates, 2001.

In an alternate embodiment, the wireless device uses the SAX event-driven parser and the network server 140 uses the DOM tree-based parser. This arrangement confers the advantage of requiring a smaller memory allocation for the SAX parser in the wireless device 100 and yet it provides the capability of the DOM parser to construct the XML recommendations files 250 in the network server 140.

In another alternate embodiment, Extensible Hypertext Markup Language (XHTML) can be used to display, if desired, in the wireless device 100 the recommendations and/or voice tags of files 250 in step 256 which are received from the network server 140. XHTML is a hybrid between HTML and XML specifically designed for network device displays. A subset of XHTML is XHTML Basic, which defines a document type that is rich enough to be used for content authoring and precise document layout, yet can be shared with wireless mobile devices 100 with small screens, such as PDAs and cell phones. XHTML Basic is the mobile adaptation of XHTML, and includes everything in XHTML except those capabilities, such as frames, that are not appropriate for devices with small screens. XHTML Basic is an XML-based standard, which allows the automatic parsing and transcoding of content through the use of Extensible Stylesheet Language Transformations (XSLT), part of the XSL style sheet language for XML. XSLT provides a language for transforming XML documents into other XML documents. Using XSLT, a system can automatically transform the same XML content into multiple markup languages depending on the browser 102. Through such transformations, content can be created for one type device and automatically transformed to appear on another type device. For example, the network server 140 can create its recommendations once in XML and use XSLT to dynamically convert it to XHTML Basic and HTML for presentation on mobile wireless devices 100.

XHTML Basic can used with cascading style sheets (CSS) to describe how documents are presented on screen in the browser 102. Through the use of CSS, document authors can control the presentation of documents without sacrificing device independence. The use of well-known standard HTML tags avoids storing multiple versions of content. The network server 140 does not need to provide for extra overhead for transcoding required to prepare content for an array of different markup languages. CSS enables a document author to specify the presentation of an application once for each type of device, by means of a corresponding style sheet. If the presentation needs to be changed at any time, the change is made once in the style sheet and the modification is dynamically reflected throughout all the pages in the network server 140. CSS separates the content of the document from the presentation. This allows creating browser-specific versions of the same content simply by creating a corresponding style sheet for each browser type. Then, when a user requests a page at the wireless device 100, the network server 140 server identifies the requesting device and returns the content with a link to the appropriate style sheet. The style sheet is downloaded once and cached by the browser 102 for use with subsequent pages, which speeds the rendering of all pages received from the network server 140. CSS enables every aspect of the appearance of the document, such as positioning, fonts, text attributes, borders, margin alignment, and flow, to be defined in the style sheet. A change to any aspect of the document's appearance needs to be made only once. CSS also gives carriers greater control over the look and feel of the services they provide through their wireless portal. The operator can use XHTML Basic to define a default style sheet for all devices it supports, which will ensure a basic look and feel consistent for all devices 100.

FIG. 4F is a flow diagram of the process in the network server 140 to respond to the recommendation request message 521 from the device 100. FIG. 4F differs from FIG. 4D by showing how to find database recommendations that are similar to the past services used by the wireless device 100, instead of being similar to the past recommendations received by the device. The network server 140 of FIG. 4F includes the server op code parser 216 that interprets the op code value "RQ_REC_4" as indicating that the message is a recommendation request message 521. In response, the server op code parser 216 invokes step 240 of the server recommendation algorithms 166. Step 240 receives the metadata vector 138 from the message 521 and accesses recommendations from the database 192 corresponding to the current context. The process then flows to step 243 which searches through the accessed recommendations obtained from the database to find those similar to the past services used XML file 235' input from the message 521. The process then flows to step 244 which sorts the similar recommendations in accordance with the user's preferences 231, also received in the message 521. The process then flows to step 246 which updates usage statistics and stores them in a database. The process then flows to step 248 which assembles the recommendation response message 521' and transmits it back to the wireless device 100. The recommendation response message 521' includes the network address of the wireless device 100, the op code "REC_3" that designates the message as a recommendation response message, and the operands. The operands include the recommendations XML file 250, which preferably include the service address of the recommended services (e.g., host name, service name) and one or more associated voice tags.

FIG. 4G is similar to the flow diagram of FIG. 4E, of the process in the wireless device 100 to filter the recommendations received in the recommendation response message and output, audibly or visually, the filtered recommendations on the device's browser. The process displays the filtered recommendations to the user on the browser 102 shown in FIG. 3I. This same sequence of steps is automatically performed by the wireless device 100 and the network server 140 in response to the wireless device 100 automatically transmitting messages with a unique op code designating that the message is an automatically transmitted message.

Another example is when the user requests a location-based recommendation with the device 100. As discussed above, FIG. 4 shows the service history log 110 has accumulated data on past services used by the user of the device 100 and the contexts of those past services. The recommendation algorithms 112 automatically filters the service history log 110 and selects past services used by the user of the device 100 and the contexts of those past services, treating them as context-activity pairs. It is not necessary that these pairs of selected past services used and past contexts be related to the current context of the device 100. Two examples of these past pairs of selected past services used and past contexts are numbered [10] and [11] as follows:

[10] "location=xyz1; service=www.newsservice.com/ . . . /news.wml",
and
[11] "location=xyz2; service=www.stockquotes.com/ . . . /quotes.wml".

The device 100 then sends these two automatically selected past pairs to the network server 140. The recommendation algorithms 112 filter out any reference to the user's ID before sending the pairs to the server. Then, device 100 then sends the current context "location=xyz3" to the network server 140. The current context "xyz3" can represent the airport, for example. When the network server 140 receives the two example past pairs of selected past services used and past contexts, it stores them in its database 192. Past pairs such as these can be accumulated from many users as recommendation resource in the database 192 for use by many other users. Examples of nine other past pairs previously accumulated in database 192 from other users are:

[1] "location=xyz3; service=www.airlines1.com/ . . . /timetables.wml",
[2] "location-xyz3; service=www.airlines2.com/ . . . /timetables.wml",
[3] "location=xyz3; service=www.airlines3.com/ . . . /timetables.wml",
[4] "location=xyz3; service=www.weatheronline.com/ . . . /weather.wml",
[5] "location=xyz4; service=www.horoscope1.com/ . . . /stars.wml", -continued

[6] "location=xyz4; service=www.horoscope2.com/ . . . /stars.wml",
[7] "location--xyz5; service=www.emailservice1.com/ . . . /mail.wml",
[8] "location=xyz5; service=www.emailservice2.com/ . . . /mail.wml", and
[9] "location=xyz5; service=www.emailservice3.com/ . . . /mail.wml".

The network server 140 compares the current context "location=xyz3" the past contexts of past pairs previously accumulated in database 192. There are four matches:

[1] "location=xyz3; service=www.airlines1.com/ . . . /timetables.wml",
[2] "location=xyz3; service=www.airlines2.com/ . . . /timetables.wml",
[3] "location=xyz3; service=www.airlines.3com/ . . . /timetables.wml", and
[4] "location=xyz3; service=www.weatheronline.com/ . . . /weather.wml".

The network server 140 sends a list of the four past services used (by others) taken from the list of the four matches, as four recommendations to the user's device 100. The four recommendations are:

[1] service=www.airlines1.com/ . . . /timetables.wml",
[2] service=www.airlines2.com/ . . . /timetables.wml",
[3] service=www.airlines.3com/ . . . /timetables.wml", and
[4] service=www.weatheronline.com/ . . . /weather.wml".

The recommendation algorithms 112 in the user's device can filter these four recommendations received from the server, if desired. The filtered recommendations are then output, audibly or visually, to the user and one or more of these recommendations can be selected by voice command or other input mechanism. Alternately, the recommendations may be transparent to the user of the wireless device 100. The user's selected recommendations and the current context "location=xyz3" are then stored in the service history log 110. For example, if the user selects by voice command or other user input means:

[2] service=www.airlines2.com/ . . . /timetables.wml", then this recommendation and the current context "location=xyz3" are stored in the service history log 110.

While the above discusses an example of location-based recommendations, recommendations may similarly be determined based on various user filter criterion which infer a context. As discussed herein, these factors may include temporal variables (e.g., time, date, day of the week, daytime/nightime, etc.), device settings (e.g., profile of the wireless device or the user), and so forth.

Figure 4H:
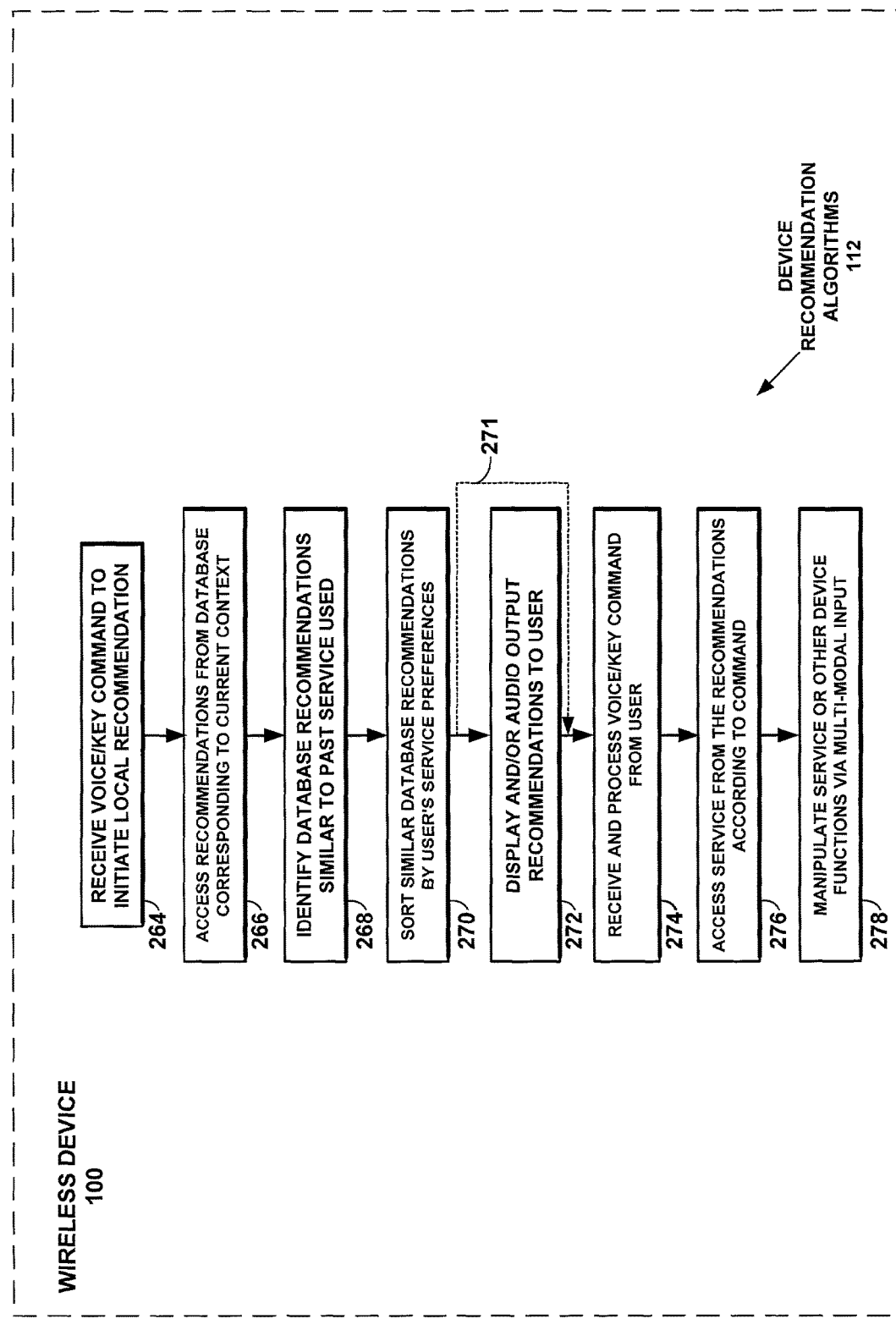
FIG. 4H is a flow diagram of an exemplary process in the wireless device 100 to determine recommended services and to enable access to such services via voice short-cut.

FIG. 4H is a flow diagram of an exemplary process in the wireless device 100 to determine recommended services, via recommendation algorithms 112, and to enable access to such services via voice short-cut. The process commences at step 264 in which a voice or key command is received to initiate local recommendation process, such as menu item [8] LOCAL RECOMMENDATION of FIG. 3A. Recommendation processing may also be initiated by other manual control by the user, or automatically upon various triggering events (e.g., location, temporal variables, periodically, specific user activity such as accessing a particular Internet site or service, and so forth).

The wireless device 100 then accesses recommendations from database corresponding to a current context at step 266, and identifies database recommendations similar to past service used at step 268. At step 270, the wireless device 100 sorts similar database recommendations by user's service preferences.

Thereafter, at step 272, the wireless device 100 audibly or visibly outputs the service recommendations to the user. The process continues at step 274 with the wireless device 100 receiving a voice command (or other user input command). In the event of a voice input, the wireless device 100 performs voice recognition on the voice command to identify the service (from the subset of recommended services) with a voice short-cut matching the voice command, at step 274. At step 276, the wireless device 100 accesses the identified service. Further browsing of the service or control of the device via multi-modal user input can be processed at step 278.

Figure 4I:
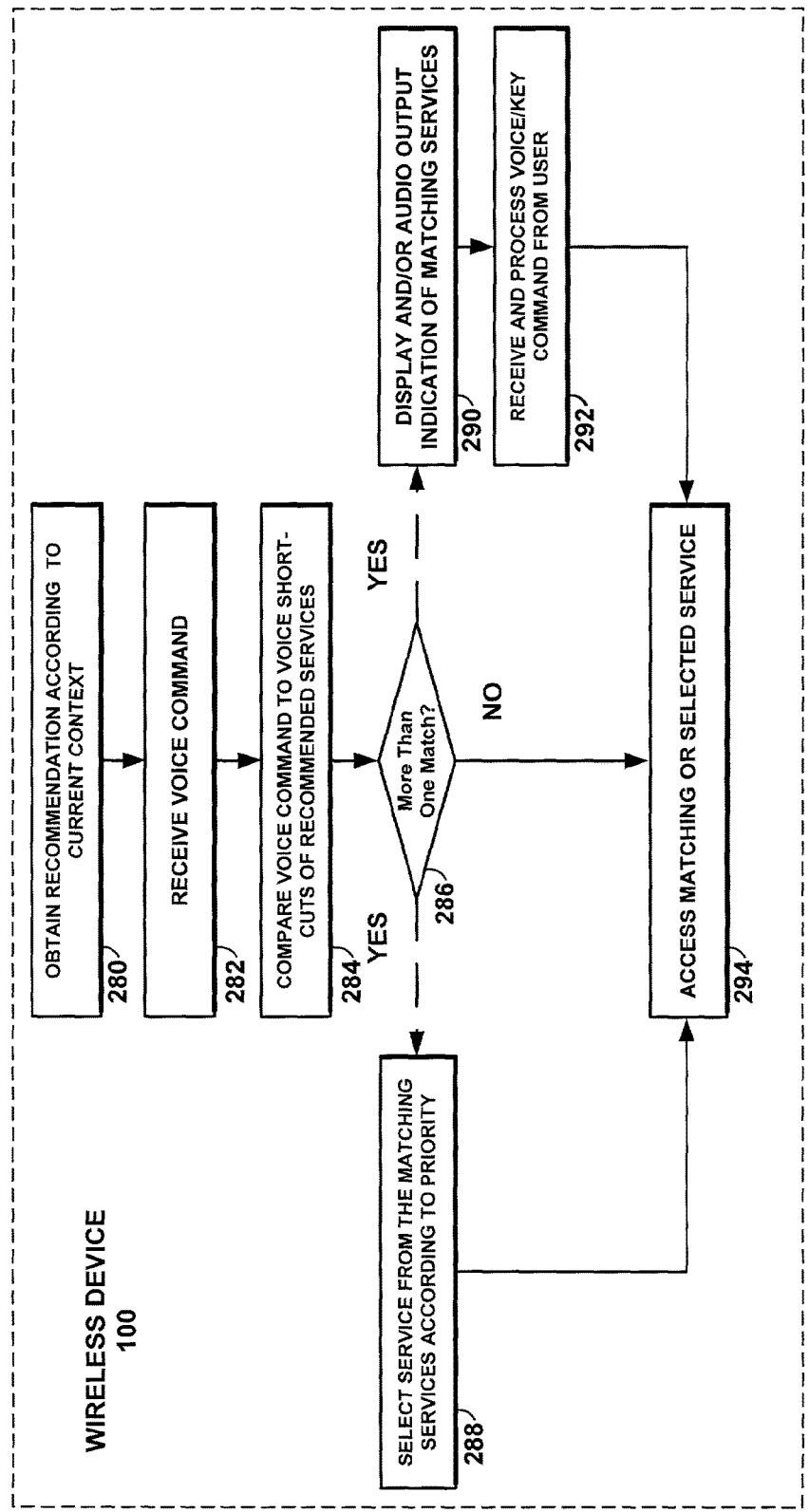
FIG. 4I is a flow diagram of an exemplary process in the wireless device 100 to resolve multiple service matching issues either by priority or by allowing the user to select from the plurality of matched services.

FIG. 4I is a flow diagram of an exemplary process in the wireless device 100 to resolve multiple service matching issues either by priority or by allowing the user to select from the plurality of matched services. The process commences at step 280 in which the wireless device 100 obtains a recommendation of services, which may also include prioritizing the recommended services. The priority of a service may be based on numerous factors, such as according to a weight given to the services based on a particular context which may correlate to the level of usage in a particular context. For example, in the "work" context (e.g., the user is in the Office), the user typically utilizes recommended service-1 more than recommended service-2 so that service-1 is provided a higher priority than service-2, and so forth.

At step 282, the wireless device 100 receives a voice command from the user. At step 284, the wireless device 284 compares the voice command to the voice short-cuts of the recommended services. At step 286, the wireless device determines whether there are more than one service matches or only one service match. If there is only one service match, then that service is accessed. If there is no match or the matching probability of all the voice short-cuts are below are threshold, then the voice command is ignored and the wireless device 100 is reset to receive the voice command again. The threshold may be adjusted to adjust the sensitivity of the decoding, as desired.

Otherwise, if a plurality of services are matched, then in one alternative the process proceeds to step 288 in which a service is selected from the matching services according to the priority of the services. For example, the matching service with the highest priority is selected. At step 294, the wireless device 100 accesses the selected service.

Alternatively, the process may proceed to step 290 in which an indication of the matching services is outputted to the user. The indication may take the form of the voice short-cuts for the matching services. At step 292, the wireless device 100 receives and processes the user selection (e.g., by voice/key command), and at step 294 accesses the selected service.

Figure 5:
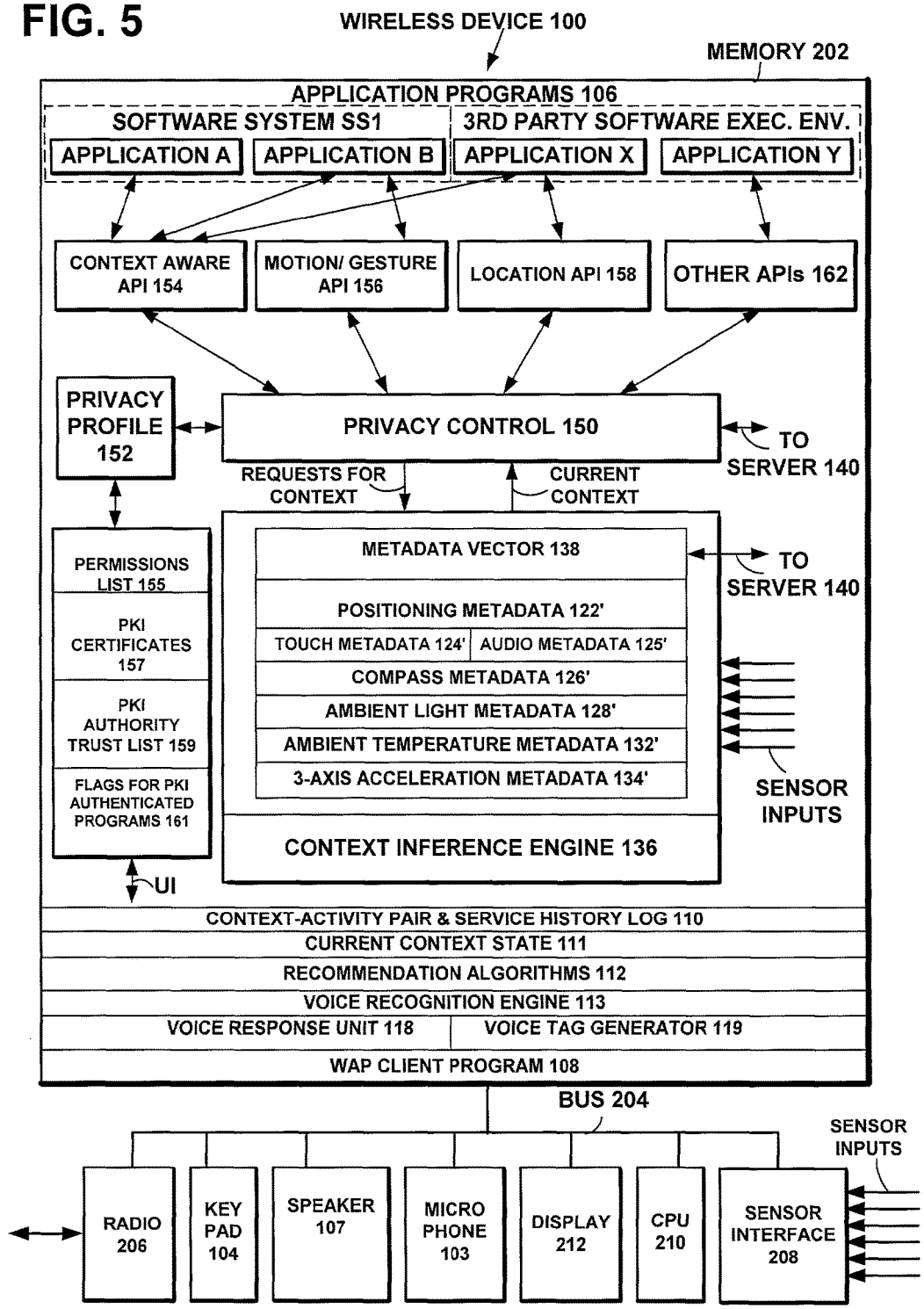
FIG. 5 is a functional block diagram of an example of the wireless device 100, showing its various components and programs.

Turning now to FIG. 5, a functional block diagram is shown of the wireless device 100, with its various components and programs. The memory 202 of the wireless device 100 is connected by means of the bus 204 to the keypad 104, the radio 206, the speaker 107, the microphone 103, the sensor interface 208, the central processor 210, and the display 212 which displays the browser 102. The input and output devices may be physically connected to other components of the wireless device 100, such as the processor across the bus 204, or at least one of the input device (e.g., the voice input device) and the output device (e.g., the display device) may interact with the processor or other components of the wireless device 100 across a wireless short-range link. For example, the input device and the output device may be different ones.

The memory 202 stores the context-activity pair and service history log 110, which is shown in greater detail in a first example in FIG. 4. The memory 202 also stores the current context state 111 which includes a description of the environment of the wireless device 100 at the present time. As will be discussed further below, the characterization of the environment of the wireless device 100, may involve one or more variables (e.g., location, temporal variables, user and device profile, sensory input(s), etc.) and may include generation of the metadata vector 138 which includes information relating to the sensor signals input from the sensors at the current time. Also included in the memory 202 are recommendation algorithms 112, voice recognition engine 113, voice response unit 118, voice tag generator 119 and WAP client program 108, some of which will be discussed further below. Memory 202 also stores other information, such as the user or device profiles.

Context Sensitive Web Services

In addition or alternative to the context inference techniques (such as based simply on temporal variables, position variables, device or user profile, etc.) employed in the recommendation operation, the wireless device 100 may be configured with a more complex context determination scheme, referred herein as sensitive web services feature, to enable a mobile phone or wireless PDA to use context inference techniques to sense the user's environment and in response, to provide recommendations to the user that is appropriate to the user's environment and that can be accessed by the user's voice command or other form of user input. In the distributed network embodiment, the feature offloads some of the computationally intensive computing necessary in context inference techniques, recommendation techniques and/or voice recognition techniques from the mobile user's wireless device to a server and to web sites on the Internet.

The context sensitive web services feature may also maintain a personal profile of the mobile user's personal preferences in an online server or web site. The mobile user is provided with the ability to control access by application programs in the wireless device, to the user's private data. The context sensitive web services feature provide the mobile user with the ability to control any access to the user's profile by the online server or web site, particularly where processing is offloaded from the wireless device to other network elements.

The mobile user's wireless device is equipped with a context inference engine for providing an awareness of the mobile user's context to application programs, including third party applications. Since the processing power and storage capacity is limited in typical wireless devices, the computational load and storage requirements of the context inference engine are distributed to a context inference server capable of processing the context data. This equally holds true in various embodiments in which other processing tasks, such as service recommendation and voice recognition to enable voice-based access to recommended services, are offloaded to network elements.

The feature also enables the mobile user to control which application programs in the wireless device are granted access to the user's private context information. A privacy control block in the wireless device grants or revokes access by application programs to the private context information, based on the mobile user's preferences stored in a privacy profile. The same privacy control and privacy profile is extended to the context inference server, thereby enabling the extension of the user's privacy control to any web server connected to the context inference server. The feature thus enables building an infrastructure for context sensitive applications and services within the wireless device and the server, while providing to the mobile user control over the privacy user's context information.

The Recommendation Web Services menu displayed by the browser 102 in FIG. 3A is rendered by the WAP client program under the control of the application programs 106, which are shown in FIG. 5.

FIG. 5 is a functional block diagram of the wireless device 100, showing its various components and programs. The wireless device 100 has context sensitive applications A, B, X, and Y, either downloaded, or in firmware. The wireless device 100 does not need to utilize external functionality in the network for the initial sampling and digitization of the sensor inputs. The sampled and digitized values of the sensor inputs are POSITIONING METADATA 122', TOUCH METADATA 124' AUDIO METADATA 125', COMPASS METADATA 126', AMBIENT LIGHT METADATA 128', AMBIENT TEMPERATURE METADATA 132', and THREE-AXIS ACCELERATION METADATA 134'. The sampled and digitized values of the sensor inputs are loaded into a metadata vector 138.

FIG. 5 shows the memory 202 of the wireless device 100, connected by the bus 204 to the keypad 104, the radio 206, the speaker 107, the microphone 103, the sensor interface 208, the central processor (CPU) 210, and the display 212. The memory 202 stores programs which are sequences of executable instructions which, when executed by the processor 210, carry out the methods of the features discussed herein. The memory 202 stores the WAP client program 108, the context inference engine 136, the privacy control 150, the privacy profile 152, the context aware API 154, the motion/gesture API 156, the location API 158, and other APIs 162. The context inference engine 136 processes the metadata vector 138 to produce the current context. Application programs 106 stored in the memory 202 include the application programs A and B which are part of the software system SS 1, and the application programs X and Y which are contained in the execution environment "Exec.Env."

If sufficient computational power and storage capacity are available in the wireless device 100, further processing of the metadata vector 138 can take place in the context inference engine 136, toward the objective of producing the result of an inferred current context. However, if at some point in the computation, the context inference engine 136 needs the processing power or storage capacity available at the network server 140, the metadata vector 138 is sent from the wireless device 100 to the context inference engine 142 in the network server 140 of FIG. 6. The context inference engine 142 in the network server 140 can perform the required processing on the metadata vector 138 and then return it to the context inference engine 136 in the wireless device 100 for completion of the an inferred current context result. Alternately, the context inference engine 142 in the network server 140 can complete the required processing and then return the resultant inferred current context to the wireless device 100.

FIG. 5 shows the architecture of a wireless device with support for context awareness. The context awareness is built on top of sensory information received from various types of sensors physically located in the handset shown in FIG. 1. The sensors shown include POSITIONING SENSOR 122, TOUCH SENSOR 124, AUDIO SENSOR 125, COMPASS SENSOR 126, AMBIENT LIGHT SENSOR 128, AMBIENT TEMPERATURE SENSOR 132, and THREE-AXIS ACCELERATION SENSOR 134. The sensors can also be located in accessory-like phone covers or in a wireless accessory such as a Bluetooth enabled device. The sensors may also be located in the environment such as in the user's rooms or vehicles. Also, the time duration of use of a phone and other available information can be used along with sensor data in context awareness services. Such other information may include other user-related filter criteria, such as temporal variables, the device or user profile, and so forth.

FIG. 5 shows sensor data received from the sensors 122, 124, 125, 126, 128, 132, and 134 is processed by Context Inference Engine 136 which then feeds the data through various APIs 154, 156, 158, and 162 to application programs A, B, X, and Y. The application programs may register themselves at the Application Programming Interface 154 to receive current context or changes in the context. This enables context sensitivity in the application programs.

FIG. 5 shows "native" application programs A and B which are executed in a first software system SS1 of the wireless device 100. The term "Software System" is used here for any environment with execution capability. This first software system may be proprietary or based on a commercially available real-time operating system, such as NOS, ISA, EPOC, JAVA, or WAP. Third party application programs X and are executed within an execution environment. This execution environment may limit the system capabilities available for the application programs, such as access to APIs (fixed, not dynamic behavior).

FIG. 5 shows the mobile user's privacy control feature. The privacy control feature enables the user to designate which application programs are granted access to the context awareness APIs 154 to utilize the current context information produced by the context inference engine 136. All requests or registrations by application programs A, B, X, and Y to have access to the Context Inference Engine 136, must first go through the Privacy Control block 150. Privacy Control block 150 uses the user's security data check stored in the Privacy Profile 152 to grant access rights to the requesting application programs. The user controls the granting of access rights by means of the user's security data input by the user through the user interface. The user's security data includes permissions list 155, Public Key Infrastructure (PKI) certificates 157, PKI trusted authority trust list 159, and flags set by the user for those application programs that have been authenticated by the PKI procedures, data set 161. The user can, if desired, be provided with the capability of updating the user's security data. Access might be granted to an application program based on its digital signature, which is a part of the system applications, or other means known in the art. It is also possible to provide a separate system-wide Privacy User Interface to the privacy control 150, which can be employed by the mobile user to set the privacy policies and to alert the mobile user that an application program is attempting to register to receive the user's private context awareness information. The privacy control 150 and Privacy Profile 152 enable the mobile user to grant, deny, or revoke access, to grant access for a limited time, or to require an application program to always request registration before the user grants access.

In FIG. 5, the Context Inference Engine 136 in the wireless device 100 makes inferences from all the sensor inputs based on where the wireless device is located by the mobile user. For instance the inferred current context of the device 100 may be "IN THE USER'S POCKET", when a certain set of sensors input a specific combination of signals having a specific value range. As an example, the resulting inference of the current context by the Context Interference Engine 136 could be expressed in XML language format as follows:

```
<Context Inference Engine in Device>
    <device placement>pocket</device placement>
    <User Interface state>sleep mode</User Interface state>
    <device location> in elevator 5 building 1 floor 2</device location>
    <API active actions> meeting starting on floor 3 room 322</API active actions>
</Context Inference Engine in Device>.
```

The Context Inference Engine 136 in the wireless device 100 can perform the context inference process with any of several methods. Different input information from the sensors can be weighted according to their relative value of importance appropriate for each environment condition or situation to be analyzed. Each sensor has it's own weight value. Alternatively, the weight values for each sensor for each environment condition can be learned from training sessions using, for example artificial neural networks (ANNs), self-organizing maps (SOMs), decision trees, fuzzy rule-based systems, or model-based systems such as Hidden Markov Modeling (HMM). Combinations of two or more of the alternate methods can be used, depending on the application.

The Context Inference Engine 136 can continuously adapt its weights through adaptive and continuous learning methods, where the user teaches the wireless device 100 new environment conditions and names them. Hidden Markov Modeling (HMM) can be used, for example, to implement an adaptive and continuous learning method for the Context Inference Engine 136. Alternately, the wireless device 100 can be programmed to spontaneously recognize a changed scene by comparing it with known scenes. The user can teach the wireless device new environmental conditions and name them, using the adaptive and automatic learning capability of neural networks. Adaptive and continuous learning methods are computationally intensive and are appropriate candidates to place on the network server 140, which assists the wireless device 100, as discussed below.

The field of context inference has applied the principles of automated pattern recognition to processing diverse types sensor inputs. Speech recognition has been applied to processing speech signals and handwriting recognition has been applied to processing hand force and accelerometer signals. In the field of robotics, image recognition has been applied to processing digitized still and motion images, mechanical location recognition has been applied to processing laser and sonar range finder signals, and mechanical motion recognition to has been applied to processing inertial, acceleration, and heading signals. In the field of prosthetic devices, touch recognition has been applied to processing tactile sensor signals. In the field of medicine, automated diagnostic programs recognize various pathologies by processing bio-electric field signals, as well as the more traditional pulse, respiration rate, and body temperature signals. These diverse sensor signal recognition processes have the common feature that an initial training stage is conducted where sampled signals are equated with a statistical model for those signals.

The principles of automated pattern recognition for these diverse sensor inputs are exemplified by the techniques for recognizing speech patterns. A common technique used in speech recognition is Hidden Markov Modeling (HMM). The term "Hidden" refers to the probabilistic and not directly observable events which underlie a speech signal. HMM speech recognition systems typically use realizations of phonemes which are statistical models of phonetic segments having parameters that are estimated from a set of training examples. Models of words are made by chaining or linking appropriate statistical models of phonetic segments. The statistical models serve as standards which are to be matched with the unknown voice signals to be recognized.

Recognition of unknown voice signals requires sampling and digitizing the speaker's spoken phonemes. These digitized phonemes are then processed into data suitable for analysis by a speech coder. The data is then compared with the standard statistical models of phonemes. The most likely matches are then the inferred speech recognition result.

Recognition consists of finding the most likely path through the set of word models for the input speech signal. HMM speech-dependent recognition decoding systems first need to be trained through an iterative process. The system must be exposed to training examples or words of a particular speaker's voice. A training word is analyzed to generate a framed sequence of acoustic parameters or statistical models. A valid or "good" recognition occurs when the most likely path through the set of word models for the training word results in recognizing the correct training word.

Some useful references discussing the principles of Hidden Markov Models are: Rabiner, L. R., "A tutorial on hidden Markov models and selected applications in speech recognition", Proceedings of the IEEE, volume 77, number 2, 1989, pages 257-286. Rabiner, L. R. and Juang, B. H., "An introduction to hidden Markov models", IEEE ASSP Magazine, January 1986, pages 4-15.

Fraser, Andrew M. and Dimitriadis, Alexis, "Forecasting Probability Densities by Using Hidden Markov Models with Mixed States", Time Series Prediction: Forecasting the Future and Understanding the Past, Addison-Wesley, editor Weigend, Andreas S. and Gershenfeld, Neil A., 1994.

Charniak, Eugene, Statistical Language Learning, MIT Press, Cambridge, Mass., 1993.

To illustrate how Hidden Markov Modeling (HMM) can be extended beyond speech recognition, an example is given here for touch recognition. In the training stage for touch recognition, tactile sensor signals are input from touching a tactile transducer to a rough texture, such as for example sandpaper. The tactile sensor signals are transformed into a statistical model of the input signal. The statistical model is stored as a standard in a computer memory under the handle "rough_texture". To expand the range of sensor signals that are included in the model for "rough_texture", several training sessions can be conducted, each with a different direction or pressure for touching the sandpaper, resulting in several different samples of the statistical model. The set of samples of the statistical model are stored as a standard under the handle "rough_texture". Other training sessions are conducted with a smooth texture, such as glass. The tactile sensor signals input from touching the tactile transducer to the smooth texture are transformed into a statistical model of the input signal and stored as a standard under the handle "smooth_texture". Later, in the recognition mode, an unknown object is touched by the tactile transducer resulting in a sample tactile sensor signal. Recognition of unknown touch signals requires sampling and digitizing the touch transducer's signals. These digitized sensor signals are then processed into metadata. The metadata is then compared with the standard statistical models of "rough_texture" and "smooth_texture". The most likely match is then the inferred touch recognition result.

Combinations of two or more types of sensors can have their signals combined into an input metadata vector that characterizes a composite sampling event. The composite sampling event can be recognized using the principles of Hidden Markov Modeling (HMM). An example composite sampling event can be the state of the health and fatigue of the user of a wireless device 100. For example, a wireless device 100 can be equipped with a tactile transducer which outputs tactile sensor signals in response to the hand force and pulse rate of the user who is gripping the wireless device 100. The wireless device 100 can be equipped with a temperature sensor which outputs body temperature signals in response to the user gripping the wireless device 100. Hidden Markov Modeling (HMM) can be used to recognize a force/temperature input metadata vector that characterizes the combination of the hand force and the temperature sensor signals resulting from a sampling event. A composite sampling event in this example can have an extended duration so that the force sensor can transduce the pulse rate of the user over a period of time.

In the training stage, the tactile sensor signals and the force sensor signals are output while the user is in a condition of good health and resting normally. The tactile sensor signals and the force sensor signals are combined into a force/temperature input metadata vector which is transformed into a statistical model of the input signals. The statistical model is stored as a standard in the computer memory of the wireless device 100 under the handle "good health_resting_normally". Other training sessions are conducted with the user in different states of health and fatigue. For example, the user may be training the wireless device 100 while working late at night at the office. The tactile sensor signals and the force sensor signals resulting from holding the wireless device 100, are combined into a force/temperature input metadata vector for the user in the condition of being in good health but fatigued. The force/temperature input metadata vector is transformed into a statistical model of the input signals and stored as a standard under the handle "good_health_fatigued".

Later, in the recognition mode, as the user holds the wireless device 100, the tactile sensor signals and the force sensor signals are sampled. The Health/Fatigue_State recognition consists of sampling and digitizing the touch transducer's signals. These digitized sensor signals are then processed into a metadata vector. The metadata vector is then compared with the standard statistical models of handle "good_health_resting_normally" and "good_health_fatigued". The most likely match is then the inferred touch recognition result.

In accordance with the feature, this recognition result can be used by the recommendation engine in the wireless device 100 or the server 140, to determine recommended services from a plurality of services. For example, the recommendation engine can process the recognition result, and in response, identify a subset of recommended services according to the health state or other inferred state of the user. One problem with automatic recognition programs is that they are either relatively large or they call databases that are relatively large in comparison to the memory capacity of the wireless device 100.

Returning to FIG. 1, the relationship is shown between the network server 140, the Universal Description, Discovery and Integration (UDDI) registry 170, and a plurality of web site servers 160. UDDI is a defacto standard for an Internet-based registry. The UDDI registry 170 enables the network server 140 to discover new web sites for services and businesses on the Internet. Once such services and businesses are identified by the UDDI registry 170 to the network server 140, then the server 140 must apply the mobile user's cached privacy profile 144 in FIG. 6, in order to prevent unauthorized access of the user's private data by application programs on the newly discovered web sites.

Voice tag registry 172, in a similar fashion, may enable discovery of voice tags, or generally voice short-cuts, for various digital services on the Internet.

Figure 5A:
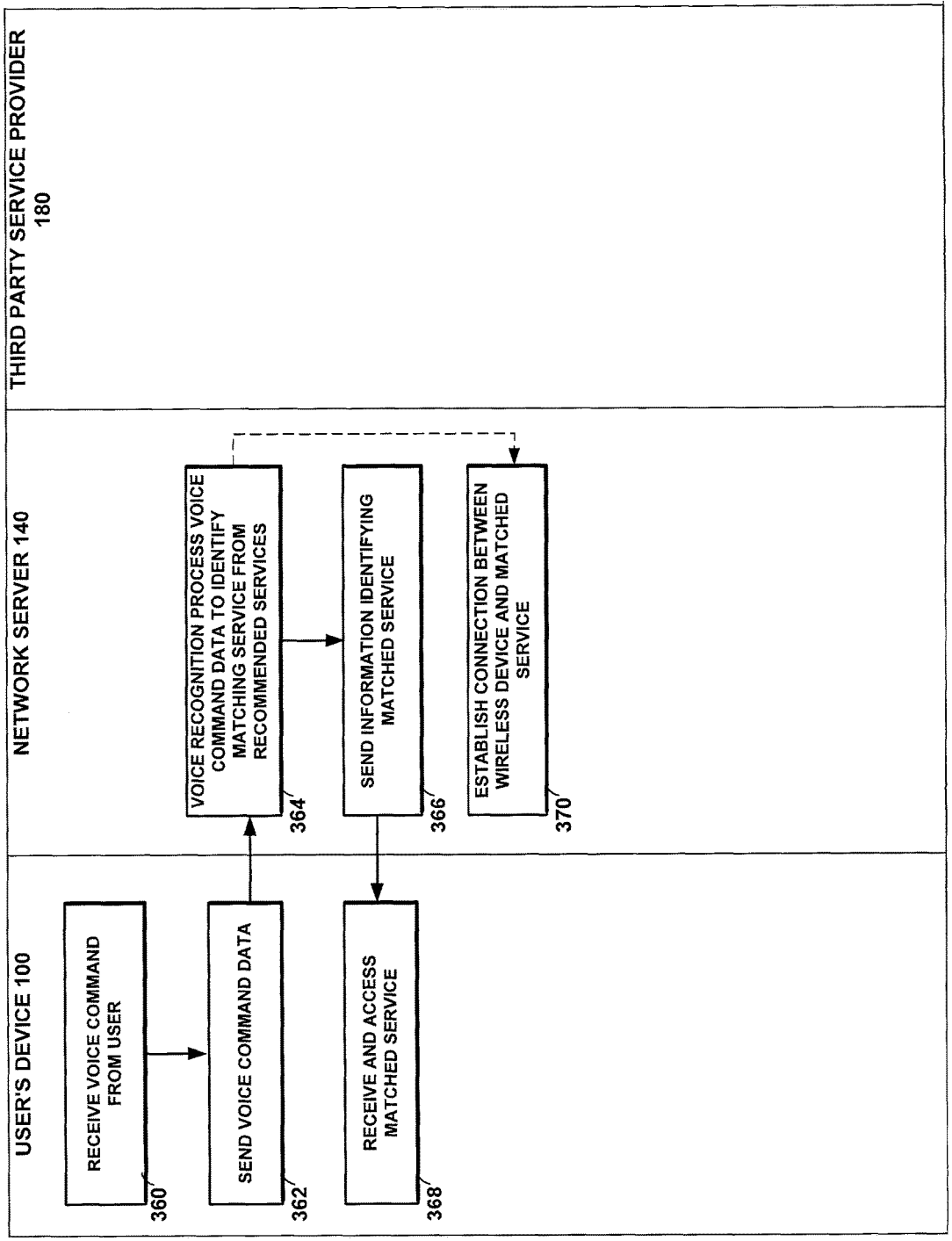
FIG. 5A is an exemplary network process flow diagram of the interaction of the wireless device 100 and network server 140 in which voice recognition processing of the user's voice command to select a service to access from the recommended services is performed by the network server 140.

FIG. 5A is an exemplary network process flow diagram of the interaction of the wireless device 100 and network server 140 in which voice recognition processing of the user's voice command to select a service to access from the recommended services is performed by the network server 140. At step 360, the wireless device 100 receives a voice command from the user. At step 362, the voice command data is sent to the network server 140 which performs voice recognition processing on the voice data to identify a matching service from the recommend services. At this point, the network server 140, in step 366, can send an indication identifying the matched service to the wireless device 100 which then accesses the matched service at step 368. Alternatively, the network server 140 can establish a connection between the wireless device 100 and the service provider of the matched service.

Figure 6:
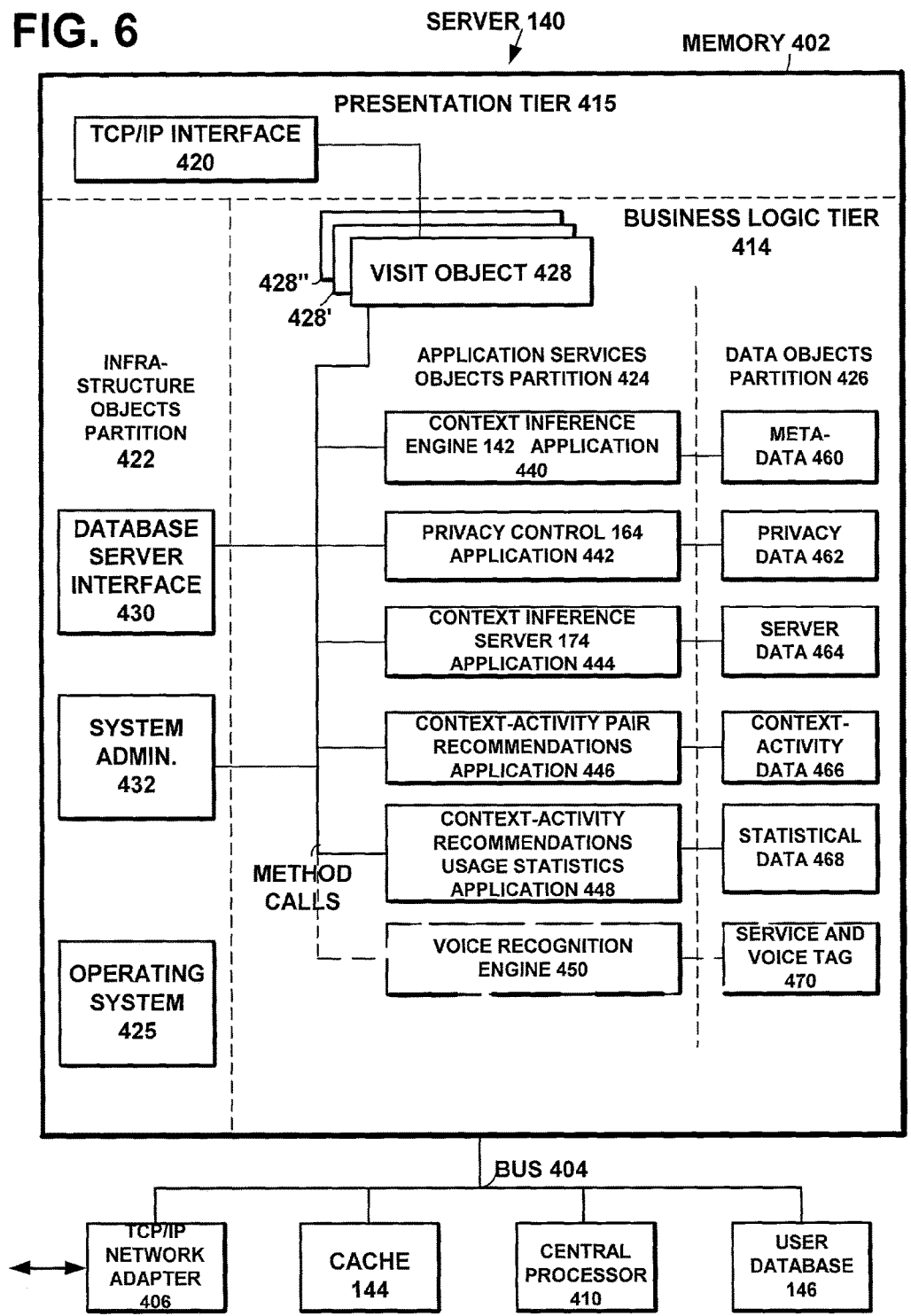
FIG. 6 is a functional block diagram of an example of the network server 140, showing the memory storing the application services software programs needed to perform various operations, such as service recommendations and voice recognition.

FIG. 6 is a functional block diagram of the network server 140, showing the memory 402 storing the application services software programs needed to perform the operations of the feature. The memory is connected by the bus 404 to the cache 144, user database 146, TCP/IP network adapter 406, and central processor 410. The memory 402 stores programs which are sequences of executable instructions which, when executed by the processor 410, carry out the methods of the feature.

In FIG. 6, the functional components of an exemplary network server 140 are shown arranged as an object model. The object model groups the object oriented software programs into components that perform the major functions and applications in network server 140. The object model for memory 402 of network server 140 employs a three-tier architecture that includes presentation tier 415, infrastructure objects partition 422, and business logic tier 414. The object model further divides business logic tier 414 into two partitions, application objects partition 422 and data objects partition 426.

Presentation tier 415 retains the programs that manage the device interfaces to network server 140. In FIG. 6, presentation tier 415 includes network interface 420. A suitable implementation of presentation tier 415 may use Java servlets to interact with WAP protocol gateway 120 via the hypertext transfer protocol ("HTTP"). The Java servlets ran within a request/response server that manages the exchange of messages between WAP protocol gateway 120 and network server 140. A Java servlet is a Java program that runs within a Web server environment. A Java servlet takes a request as input, parses the data, performs logic operations, and issues a response back to WAP protocol gateway 120. The Java runtime platform pools the Java servlets to simultaneously service many requests. Network interface 420 accepts request messages from WAP protocol gateway 120 and passes the information in the request to visit object 428 for further processing. Visit object 428 passes the result of that processing to network interface 420 for transmission back to the WAP protocol gateway 120. Network interface 420 may also use network adapter 406 to exchange data with another user device.

Infrastructure objects partition 422 retains the programs that perform administrative and system functions on behalf of business logic tier 414. Infrastructure objects partition 422 includes operating system 425, and an object oriented software program component for database server interface 430, and system administrator interface 432.

Business logic tier 414 in FIG. 6 includes multiple instances of visit object 428, 428', 428". A separate instance of visit object 428 exists for each network interface 420 session. Each visit object 428 is a stateful session object that includes a persistent storage area from initiation through termination of the session, not just during a single interaction or method call. The persistent storage area retains information associated with the session.

When WAP protocol gateway 120 sends a metadata vector 138 message to network server 140, the message is sent to network interface 420 to invoke a method that creates visit object 428 and stores connection information as a state in visit object 428. Visit object 428 may, in turn, invoke a method in context inference engine 142 application 440 to perform a context inference on the metadata vector and return a current context result.

When WAP protocol gateway 120 sends a privacy control data 150' message to network server 140, the message is sent to network interface 420 to invoke a method that creates visit object 428 and stores connection information as a state in visit object 428. Visit object 428 may, in turn, invoke a method in privacy control 164 application 442 to update the cached privacy profile 144.

When WAP protocol gateway 120 sends a context-activity pair message 190 to network server 140, the message is sent to network interface 420 to invoke a method that creates visit object 428 and stores connection information as a state in visit object 428. Visit object 428 may, in turn, invoke a method in context-activity pair recommendations application 446. Application 446 compares four types of activities in the context-activity pairs received from the wireless device 100, with the recommendations in the database 192: [1] past recommendations, [2] past services used, [3] prestored service preferences, and [4] special requested service requirements. Application 446 may, in turn make a method call to context-activity recommendations usage statistics application 448.

When WAP protocol gateway 120 sends a metadata vector message of the user's voice command to network server 140, the message is sent to network interface 420 to invoke a method that creates visit object 428 and stores connection information as a state in visit object 428. Visit object 428 may, in turn, invoke a method in voice recognition engine 167 application 450 to perform voice recognition on the metadata vector and return a selected service indication identifying the recommend service corresponding to the user's voice command.

A description of server programming applications developed with Enterprise Java Beans is provided in the book by Ed Roman entitled Mastering Enterprise Java Beans, published by John Wiley and Sons, 1999. A description of the use of an object model in the design of server applications is provided in the book by Matthew Reynolds entitled Beginning E-Commerce, Wrox Press Inc., 2000, (ISBN: 1861003986). Java servlets and the development of web site servers is described in the book by Duane K. Fields, et al. entitled Web Development with Java Server Pages, published by Manning Publications Co., 2000.

Example Wireless Application Protocol (WAP) Embodiment

The user's Wireless Application Protocol (WAP)-enabled portable wireless device 100 accesses a small file called a deck which is composed of several smaller pages called cards which are small enough to fit into the display area of the device's browser 102. The small size of the browser 102 and the small file sizes accommodate the low memory constraints of the portable wireless device 100 and the low-bandwidth constraints of a wireless network 116. The cards are written in the Wireless Markup Language (WML) which is specifically devised for small screens and one-hand navigation without a keyboard. The WML language is scaleable from two-line text displays on the browser 102 of a cellular telephone, up through large LCD screens found on smart phones and personal communicators. The cards written in the WML language can include programs written in WMLScript, which is similar to JavaScript, but makes minimal demands on memory and CPU power of the device 100 because it does not contain many of the unnecessary functions found in other scripting languages.

The Nokia WAP Client Version 2.0 is a software product containing the components necessary to implement the WAP client on the wireless device 100. These components include a Wireless Markup Language (WML) Browser, WMLScript engine, Push Subsystem, and Wireless Protocol Stack. The Nokia WAP Client is a source-code product that can port and integrate into wireless devices such as mobile phones and wireless PDAs. Application programs 106 stored in the wireless device 100 interact with the WAP Client to implement a variety of communications applications. Details of the Nokia WAP Client Version 2.0 can be found in the online paper: Nokia WAP Client Version 2.0. Product Overview, Nokia Internet Communications, 2000, www.nokia.com/corporate/wap.

The WAP Client includes the Wireless Public Key infrastructure (PKI) feature, providing the infrastructure and the procedures required for authentication and digital signatures for servers and mobile clients. Wireless PKI is a certificate-based system that utilizes public/private key pairs associated with each party involved in a mobile transaction. Wireless Identity Module (WIM) is a security token feature of the WAP Client, which includes security features, such as the public and private keys and service certificates, needed for user authentication and digital signatures. Additionally, it has the ability to perform cryptographic operations to encrypt and decrypt messages.

The WAP protocol gateway 120 links the Internet 130 and the wireless network 1116. The WAP protocol gateway 120 includes the Wireless Public Key infrastructure (PKI) feature to help provide a secure Internet connection to the wireless device 100. The WAP protocol gateway 120 enables the WAP-enabled wireless device 100 to access Internet applications such as headline news, exchange rates, sports results, stock quotes, online travel and banking services, or to download distinctive ringing tones.

The user's WAP-enabled portable wireless device 100 communicates with the wireless access point 114 and can exchange messages for distances up to several kilometers. The types of wireless networks 116 supported by the WAP standard include Cellular Digital Packet Data (CDPD), Code-Division Multiple Access (CDMA), Global System for Mobile Communications (GSM), Time Division Multiple Access (TDMA), GPRS, 3G-Broadband, and the like.

The overall process of communication between the user's WAP-enabled wireless device (the client) 100, through the WAP protocol gateway 120, to the server 140 resembles the way Web pages are served on the Internet using the HyperText Transfer Protocol (HTTP) or World Wide Web protocol:

[1] The user presses a phone key on the user's device 100 related to the Uniform Resource Locator (URL) of the server 140.

[2] The user's device 100 sends the URL, via the wireless access point 114 and the wireless network 116, to the gateway 120 using WAP protocols.

[3] The gateway 120 translates the WAP request into an HTTP request and sends it over the Internet 130 to the server 140, via Transmission Control Protocol/Internet Protocol (TCP/IP) interfaces.

[4] The server 140 handles the request just like any other HTTP request received over the Internet. The server 140 either returns a WML deck or a HyperText Markup Language (HTML) page back to the gateway 120 using standard server programs written, for example in Common Gateway Interface (CGI) programs, Java servlets, or the like.

[5] The gateway 120 receives the response from the server 140 on behalf of the user's device 100. If the response is an HTML page, it gets transcoded into WML if necessary. Then the WML and WMLScript coding is encoded into a byte code that is then sent to the user's device 100.

[6] The user's device 100 receives the response in the WML byte code and displays the first card in the deck on the browser 102 to the user.

In FIG. 1, the protocol gateway 120 includes a WAP protocol stack organized into five different layers. An application layer is the wireless application environment, which executes portable applications and services. A session layer is the wireless session protocol, which supplies methods for the organized exchange of content between client/server applications. A transaction layer is the wireless transaction protocol, which provides methods for performing reliable transactions. A security layer is the wireless transport layer security, which provides authentication, privacy, and secure connections between applications. The transport layer is the wireless datagram protocol, which shelters the upper layers from the unique requirements of the diverse wireless network protocols, such as CDPD, CDMA, GSM, etc. Additional information about the WAP standard and the WAP protocol stack can be found in the book by Charles Arehart, et al. entitled, Professional WAP, published by Wrox Press Ltd., 2000 (ISBN 1-861004-04-1).

Figure 7A:
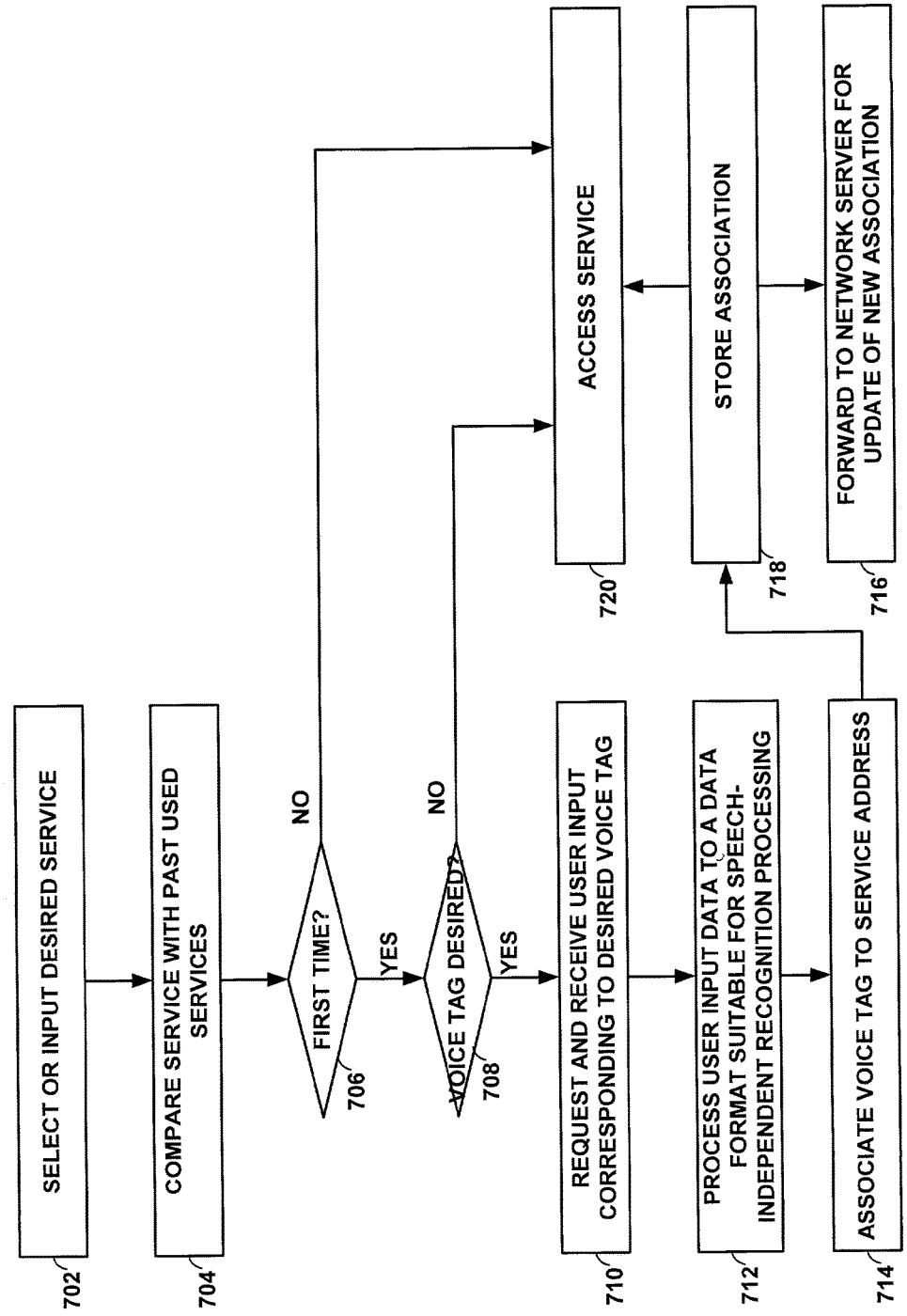
FIG. 7A is an exemplary process flow diagram by which the user is afforded the opportunity to define voice tags for services accessed for the first time.

FIG. 7A is an exemplary process flow diagram by which the user is afforded the opportunity to define voice shortcuts, such as voice tags, for services accessed for the first time on the wireless device 100. The process commences at step 702 in which the user selects or inputs a desired service, such as via URL address. The wireless device 100 compares the service with past used services at step 704 and determines whether this is the first time the service has been accessed at step 706. If not, the wireless device 100 proceeds to step 720 and accesses the service. If so, the wireless device 100 determines whether the user wishes to voice tag the service at step 708. For example, the wireless device 100 may prompt the user with a YES or NO request.

If the user does not wish to voice tag the service, the process proceeds to access the service at step 720. If the user desires to voice tag the service, the process proceeds to step 710 and requests and receives a user input corresponding to the desired voice tag. For speech independent voice recognition, this user input may simply be a word or phrase inputted by key command. At step 712, the wireless device 100 processes the input data to computer readable data suitable for use in comparison in voice recognition processing. At step 714, the wireless device 100 associates the inputted word or phrase, i.e., voice short-cut, to the service or service address. At step 718, the wireless device 100 stores this association in a database, such as the service history log 110 or a dictionary, to enable future use thereof as a voice short-cut to the service. The process then continues to step 720 in which the service is accessed. The wireless device may further at a step 716 send the association to the network server 140 to update the server on the new association.

Figure 7B:
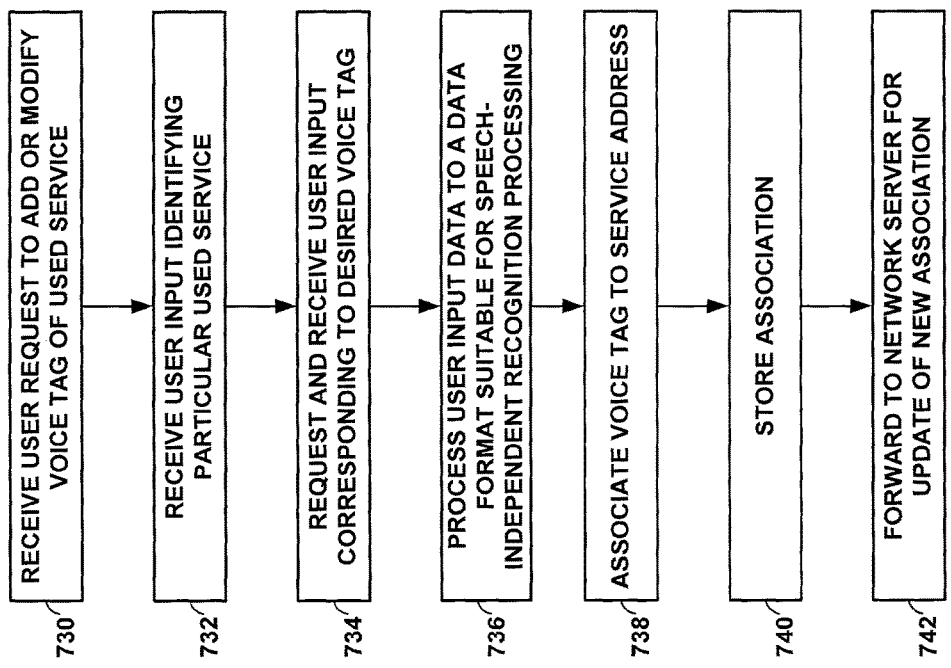
FIG. 7B is an exemplary process flow diagram by which the user is afforded the opportunity to add or modify voice tags for accessible services.

FIG. 7B is an exemplary process flow diagram by which the user is afforded the opportunity to add or modify voice short-cuts, such as voice tags, for accessible services. The process commences at step 730 in which the wireless device 100 receives a request from the user to add or modify a voice tag for a past used service. At step 732, the wireless device 100 receives a user input identifying the particular used service. The process proceeds to step 734 and requests and receives a user input corresponding to the desired voice tag. For speech independent voice recognition, this user input may simply be a word or phrase inputted by key command. At step 736, the wireless device 100 processes the input data to computer readable data suitable for use in comparison in voice recognition processing. At step 738, the wireless device 100 associates the inputted word or phrase, i.e., voice short-cut, to the service or service address. At step 740, the wireless device 100 stores this association in a database, such as the service history log 110 or a dictionary, to enable future use thereof as a voice short-cut to the service. The process then continues to step 742 in which the wireless device 100 sends the association to the network server 140 to update the server on the new association.

Figure 7C:
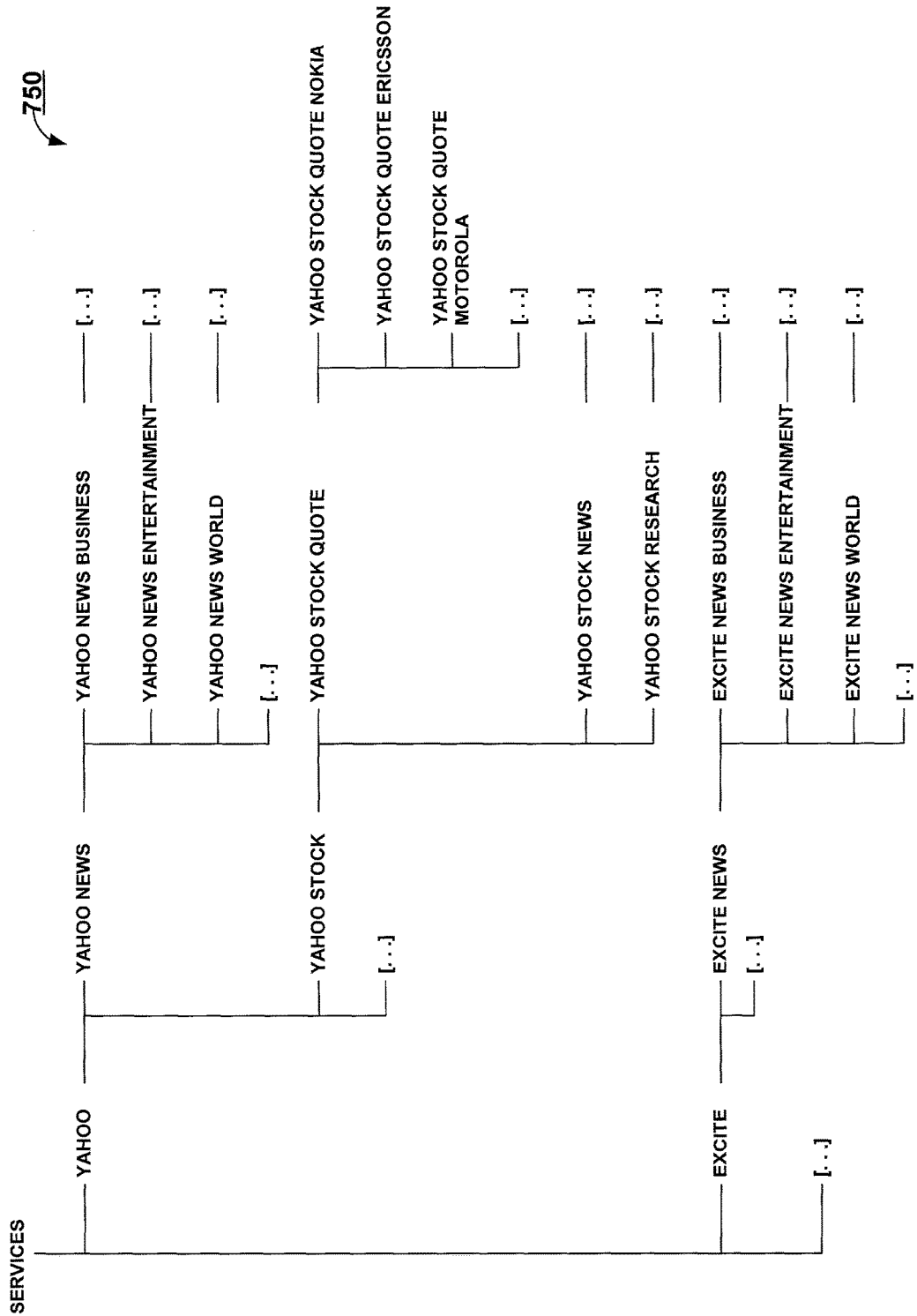
FIG. 7C is an exemplary database or data structure in a tree format showing the different hierarchical levels of service/sub-service along with their voice short-cuts.

FIG. 7C is an exemplary database or data structure 750 showing the different hierarchical levels of service/sub-service in relations to their voice short-cuts in a tree format. As shown, the voice short-cuts may change depending on the level of the service, such as the current level of services requested or already requested. For example, the voice short-cuts on a first level of service in which "news" is requested would be different than the voice short-cuts on a different level of service, e.g., in which "stock" has already been requested. Accordingly, the voice short-cuts (or recommended services) may change based on which service or level of service is currently being used or requested. The available voice short-cuts change, e.g., are narrowed, according to the branch/sub-branch of the services being requested and, thus, vary according to the level of service.

Voice Short-Cut Example #1

An operational example of wireless device 100 employing, locally or remotely, a service recommendation subsystem in combination with voice recognition subsystem is discussed below with reference to FIGS. 1 and 3J through 3L. A user initiates a browsing operation via the browser 102 to trigger a recommendation process to be performed locally at the wireless device 100 or remotely at network server 140. In either case, a subset of recommended digital services are determined from a plurality of digital services (which may be quite a large set) based on user-related filter criteria, such as a current context. The subset of recommended services reflects those services the user would likely desire, preferably with a high probability, in the current context.

For instance, a user, such as a business person, operating his or her wireless device 100 between 11:00 AM-2:00 PM or on Wall St. or during the daytime or at a temperature between 15° C.-25° C. or at a speed between 0-50 kph or a combination thereof may be provided with the following recommended services:

Host: wap.yahooMobile.com
Services (address):
world news (/news/world.wml)
business news (/news/business.wml)
F1 news (/sports/f1/news.wml)
Host: wap.business.com
Services (address):
on-line news (/online.wml)
main news (/index.wml)
stock quotes: Nokia (/stocks/quotes.pl?ticker=NOK)
Host: wap.fl-forum.com
Services (address):
news (/news.wml)
results (/results.wml)
table (/table.wml)
Host: wap.weatherOnLine.com:
Services:
Helsinki tomorrow (/forecast.pl?city=Hel sinki&day=+ 1).

The recommended services may be outputted, audibly and/or visibly, in a menu form (if desired) to the user, or may be transparent to the user (e.g., not outputted). Thereafter, the user gives the following voice browsing command (host, service): "fl-forum, news". The voice recognition engine identifies the host and service commands by comparing the commands to the limited set of most probable host and service alternatives and informs the browser 102 which service should be loaded, e.g., wap.fl-forum.com/news.wml.

Figure 3J:
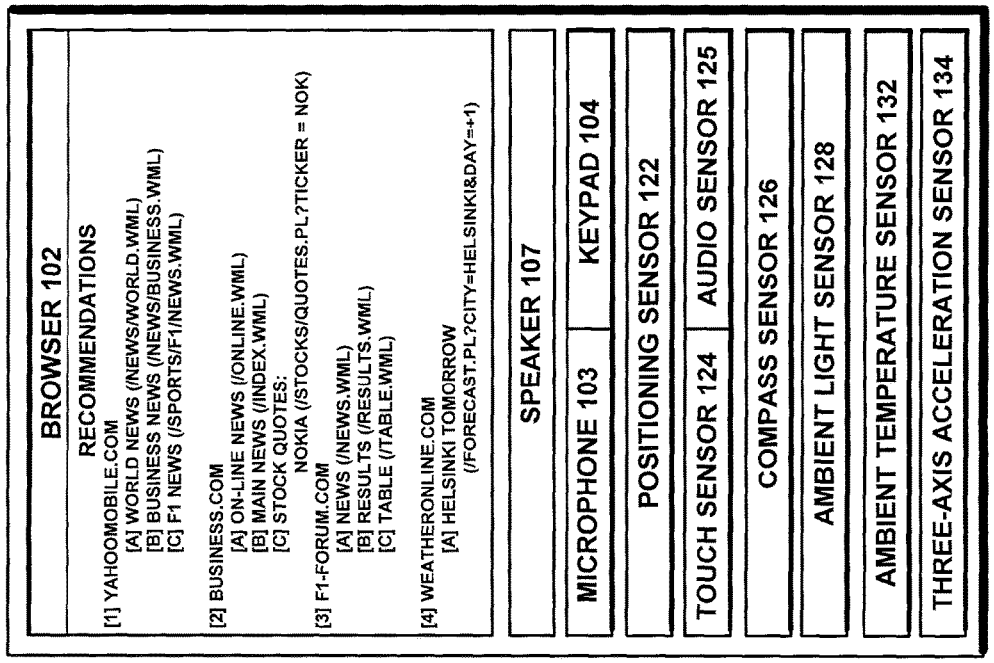
FIG. 3J shows an example of the user's wireless device displaying recommendation results in a menu form.

One example of such a menu is shown in FIG. 3J in which both the host and service names are displayed for selection by the user. Another example of such a menu is shown in FIGS. 3K and 3L in which FIG. 3K shows an initial menu of the host names of the recommended services and FIG. 3L shows a subsequent menu of the service name of the selected host name. In this example, the user may access the home page of a service site by an initial voice command, and then browse the service extensions of the site through addition voice commands. Such an arrangement provides a multi-layered voice-access arrangement to reduce further the range of voice short-cuts to be processed, as well as providing multi-modal input functionality in initial service access and subsequent browsing.

The voice recognition can be performed without voice tags or optionally the voice recognition task can be made easier by pre-loading voice tags from the appropriate services. Voice tags can be used by the voice recognition engine to identify the spoken host and service commands. The number of alternatives presented to the voice recognition engine by the recommendation sub-system depends on the capability of the voice recognition engine. In some cases, the alternatives presented to the voice recognition engine could include all the services the user has ever visited. The recommendation sub-system may also attach prior service access probabilities for each service.

Voice Short-Cut Example #2

In a further example, a voice command may match multiple voice short-cuts to different recommended services. In such a case, wireless device 100 may provide the user with a list of matching short-cuts from which the user can select the correct short-cut to access the desired service.

For instance, a user operating a wireless device 100 has been actively checking stock quotes for the following three stocks: Nokia, Ericsson, Motorola. The voice short-cuts for these prior services may be the following (or possibly the corresponding phonetic expression):

Yahoo stock quote Nokia
Yahoo stock quote Ericsson
Yahoo stock quote Motorola

The user inputs a voice command, "Yahoo stock quote", to the wireless device 100. Since the voice command matches partly with three different short-cuts, the wireless device 100 outputs, visually or audibly, a list of matching short-cuts to the user, as follows:

Yahoo stock quote Nokia
Yahoo stock quote Ericsson
Yahoo stock quote Motorola

The identification of the short-cuts identifies the recommended services and, as importantly, allows the user to become familiar with the voice short-cuts for various services.

Thereafter, the user may select a correct or desired alternative from the list of matching short-cuts, and obtains the selected service. The user may make the selection via voice command, key command or other well-known user input command. For example, the user may employ the voice command, "Nokia" or "Yahoo stock quote Nokia", to obtain the stock quote for Nokia from the Yahoo site, or may enter a key command corresponding to desired service from the list.

In another example, the user has been actively checking, via the wireless device 100, the following web pages:
Yahoo news business
Yahoo news world
Yahoo news entertainment
Excite news business
Excite news world The user inputs a voice command, "news", to the wireless device 100. Since the voice command matches partly with five different short-cuts, the wireless device 100 outputs, visually or audibly, a list of matching short-cuts to the user, as follows.
Yahoo news business
Yahoo news world
Yahoo news entertainment
Excite news business
Excite news world Alternatively, if the user inputs a voice command, "Yahoo news", the wireless device 100 may output, visually or audibly, a list of three matching short-cuts to the user as follows:
Yahoo news business
Yahoo news world
Yahoo news entertainment In another alternative, if the user inputs a voice command, "news business", the wireless device 100 may output, visually or audibly, a list of two matching short-cuts to the user as follows:
Yahoo news business
Excite news business Accordingly, in the situation in which a voice command matches a plurality of the recommended services, the wireless device 100 may be configured to output an indication of the matched services for selection by the user. The indication of the matched services may take the form of voice short-cuts corresponding thereto.

Although a specific embodiment of the feature has been disclosed, it will be understood by those having skill in the art that changes can be made to the specific embodiment without departing from the spirit and the scope of the feature.

Although specific embodiments of the invention have been disclosed, it will be understood by those having skill in the art that changes can be made to that the specific embodiments without departing from the spirit and the scope of the invention.

What is claimed is:

1. A method comprising:
   determining a current context based on current environment of a user's wireless device sensed by one or more sensors and at least one of a selected profile of the wireless device or user profile from an online server or web site;
   recommending to the user through the wireless device a subset of services, the subset dynamically selected from a plurality of services on a server in response to the current environment sensed by the one or more sensors and the profile of the wireless device or user;
   assigning to each recommended service of the subset at least one voice short-cut, each voice short-cut in the form of a voice tag based, at least in part, on metadata associated with the recommended service or a service provider of the recommended service,
   wherein the at least one voice short-cut is assigned according to a hierarchy or a priority of said each recommended service;
   determining that a voice command by the user corresponds to a plurality of said each recommended service; and
   upon a determination that the voice command by the user corresponds to a plurality of said each recommended service, selecting a service to be accessed via the voice command based on the hierarchy or the priority of said each recommended service.

2. The method of claim 1, wherein the at least one voice short-cut is temporarily assigned to said each recommended service.

3. The method of claim 1, wherein the current environment of the user's wireless device is sensed by the one or more sensors periodically, at particular times, at particular days, at particular dates, at particular locations, upon a manual command, upon particular activities, or a combination thereof.

4. An apparatus comprising:
   at least one processor; and
   at least one memory including computer program code,
   the at least one memory and the computer program code configured to, with the at least one processor, cause the apparatus to perform at least the following,
      determine a current context based on current environment of a user's wireless device sensed by one or more sensors and at least one of a selected profile of the wireless device or user profile from an online server or web site;
      recommend to the user through the wireless device a subset of services, the subset dynamically selected from a plurality of services on a server in response to the current environment sensed by the one or more sensors and the profile of the wireless device or user;
      assign to each recommended service of the subset at least one voice short-cut, each voice short-cut in the form of a voice tag based, at least in part, on metadata associated with the recommended service or a service provider of the recommended service;
      wherein the at least one voice short-cut is assigned according to a hierarchy or a priority of said each recommended service;
      determine that a voice command by the user corresponds to a plurality of said each recommended service; and
      upon a determination that the voice command by the user corresponds to a plurality of said each recommended service, select a service to be accessed via the voice command based on the hierarchy or the priority of said each recommended service.

5. The apparatus of claim 4, wherein the at least one voice short-cut is temporarily assigned to said each recommended service.

6. The apparatus of claim 4, wherein the current environment of the user's wireless device is sensed by the one or more sensors periodically, at particular times, at particular days, at particular dates, at particular locations, upon a manual command, upon particular activities, or a combination thereof.

7. A system comprising:
   an apparatus, the apparatus comprising at least one processor and at least one memory including computer program code,
   the at least one memory and the computer program code configured to, with the at least one processor, cause the apparatus to perform at least the following,
      determine a current context based on current environment of a user's wireless device sensed by one or more sensors and at least one of a selected profile of the wireless device or user profile from an online server or web site;
      recommend to the user through the wireless device a subset of services, the subset dynamically selected from a plurality of services on a server in response to the current environment sensed by the one or more sensors and the profile of the wireless device or user;
      assign to each recommended service of the subset at least one voice short-cut, each voice short-cut in the form of a voice tag based, at least in part, on metadata associated with the recommended service or a service provider of the recommended service,
      wherein the at least one voice short-cut is assigned according to a hierarchy or a priority of said each recommended service;
      determine that a voice command by the user corresponds to a plurality of said each recommended service; and
      upon a determination that the voice command by the user corresponds to a plurality of said each recommended service, select a service to be accessed via the voice command based on the hierarchy or the priority of said each recommended service.

8. The system of claim 7, wherein the at least one voice short-cut is temporarily assigned to said each recommended service.

9. The system of claim 7, wherein the current environment of the user's wireless device is sensed by the one or more sensors periodically, at particular times, at particular days, at particular dates, at particular locations, upon a manual command, upon particular activities, or a combination thereof.

* * * * *